(12) United States Patent
Gifford et al.

(10) Patent No.: US 10,926,527 B2
(45) Date of Patent: Feb. 23, 2021

(54) 3D PRINTER SYSTEMS AND METHODS

(71) Applicants: Karl Joseph Dodds Gifford, Norcross, GA (US); Tai Dung Nguyen, Fremont, CA (US); Tue Nguyen, Fremont, CA (US)

(72) Inventors: Karl Joseph Dodds Gifford, Norcross, GA (US); Tai Dung Nguyen, Fremont, CA (US); Tue Nguyen, Fremont, CA (US)

( * ) Notice: Subject to any disclaimer, the term of this patent is extended or adjusted under 35 U.S.C. 154(b) by 826 days.

(21) Appl. No.: 15/464,348

(22) Filed: Mar. 21, 2017

(65) Prior Publication Data
US 2017/0266885 A1 Sep. 21, 2017

Related U.S. Application Data

(60) Provisional application No. 62/310,816, filed on Mar. 21, 2016.

(51) Int. Cl.
B29C 64/209 (2017.01)
B33Y 50/02 (2015.01)
B33Y 10/00 (2015.01)
B33Y 30/00 (2015.01)
B29C 64/321 (2017.01)
B29C 64/118 (2017.01)

(52) U.S. Cl.
CPC ............ *B33Y 50/02* (2014.12); *B29C 64/118* (2017.08); *B29C 64/209* (2017.08); *B29C 64/321* (2017.08); *B33Y 10/00* (2014.12); *B33Y 30/00* (2014.12)

(58) Field of Classification Search
CPC ......... B33Y 50/02; B33Y 10/00; B33Y 30/00; B29C 64/321; B29C 64/118; B29C 64/209
See application file for complete search history.

(56) References Cited

U.S. PATENT DOCUMENTS

2007/0003656 A1* 1/2007 LaBossiere ............ B33Y 30/00 425/375
2014/0159273 A1* 6/2014 Koop ..................... B33Y 30/00 264/129

* cited by examiner

Primary Examiner — Joseph S Del Sole
Assistant Examiner — John Robitaille
(74) Attorney, Agent, or Firm — Tue Nguyen

(57) ABSTRACT

A print head comprising two shafts disposed in opposite sides of a filament to drive the filament to a heated chamber for delivering a molten material. The shafts are actively driven, for example, by two independent motors. The two shaft configuration of the print head can improve a control of the filament movement rate, especially for soft filament materials.

16 Claims, 36 Drawing Sheets

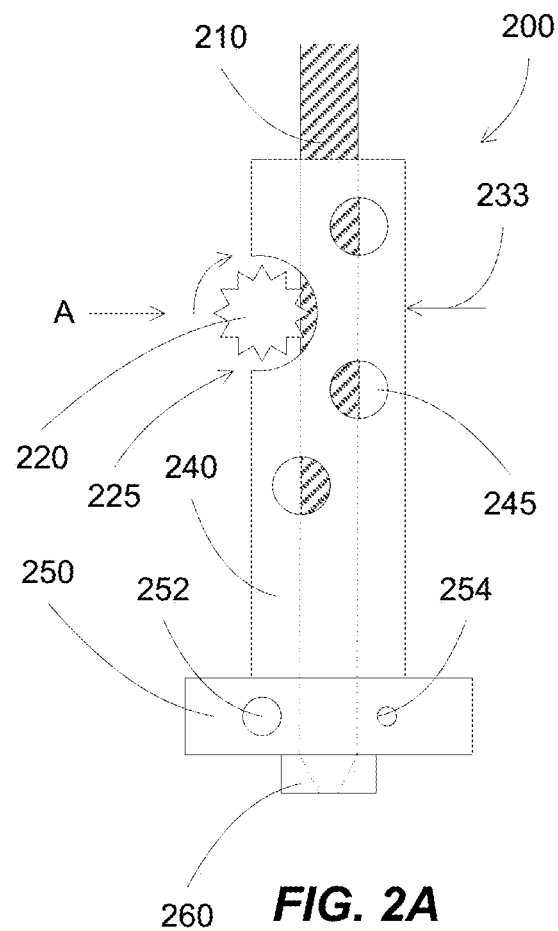
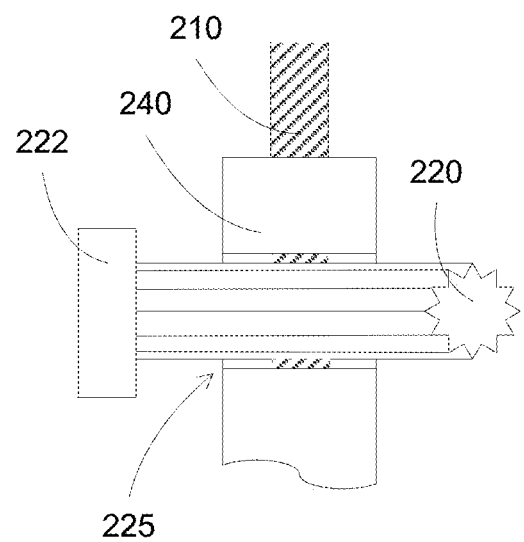
FIG. 2A
FIG. 2B
View A
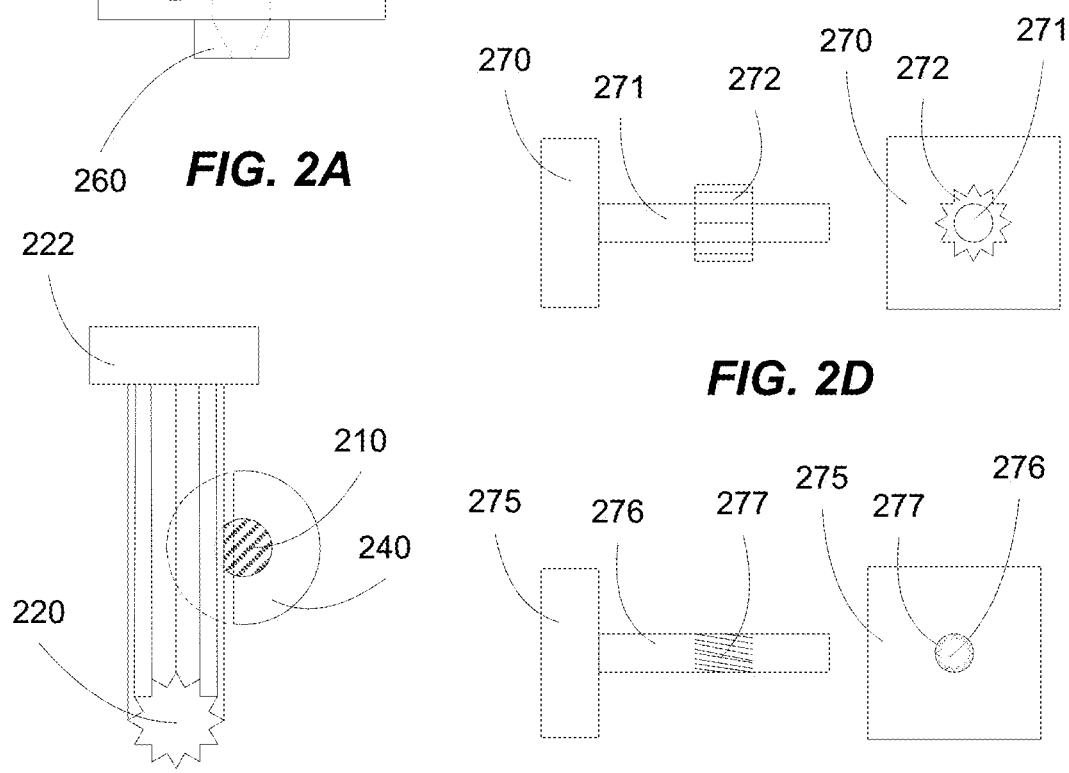
FIG. 2C
FIG. 2D
FIG. 2E

Guiding a filament between a filament driving assembly and a filament heating assembly
300

*FIG. 3A*

Providing a hollow conduit for accepting a filament
320

↓

Forming a cut in the conduit for passing a filament driving assembly, wherein the filament driving assembly is coupled to the filament for driving the filament along the conduit
330

*FIG. 3B*

Using a hollow conduit to guide a filament with a filament driving assembly driving the filament along the conduit
350

*FIG. 3C*

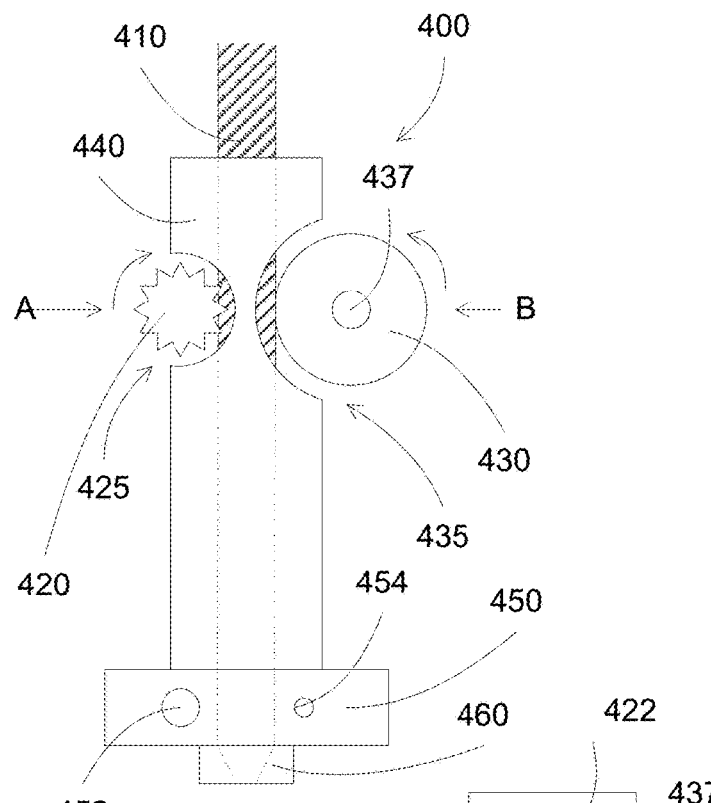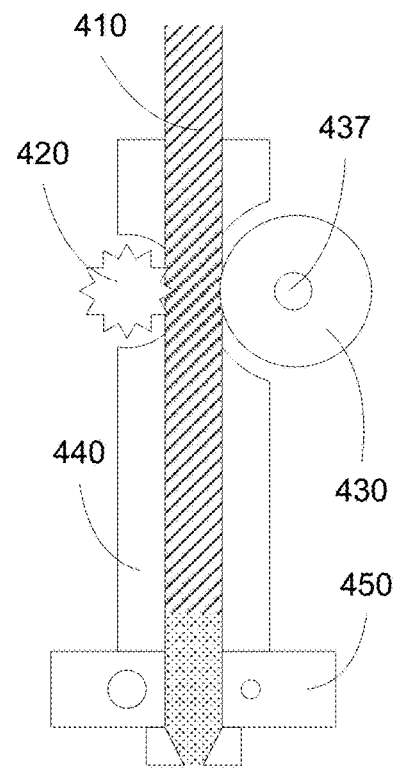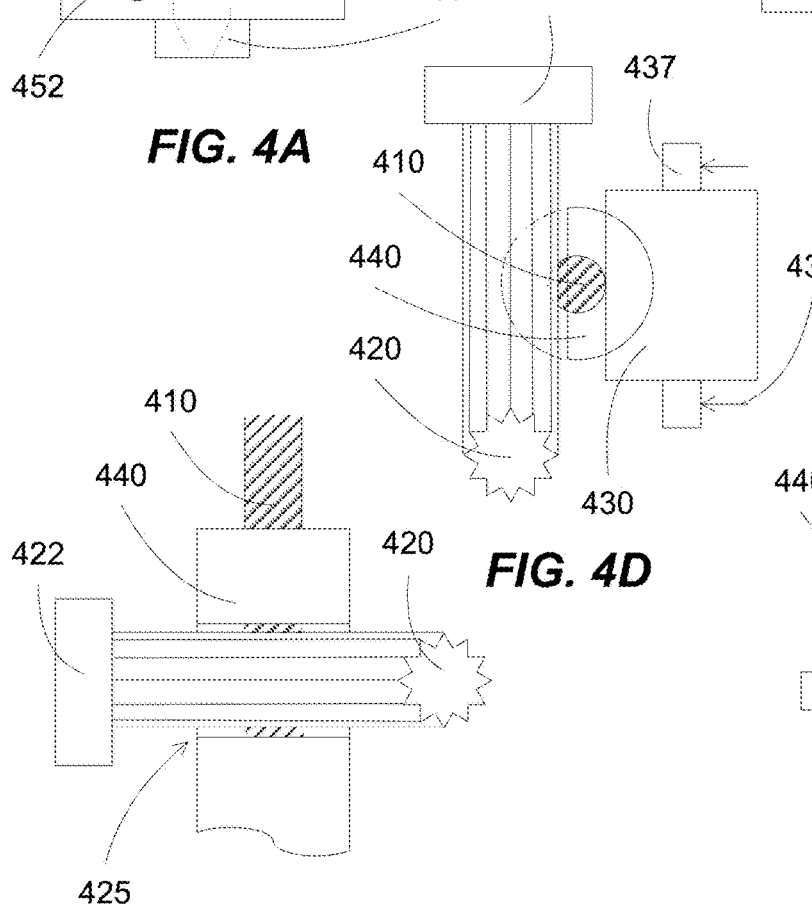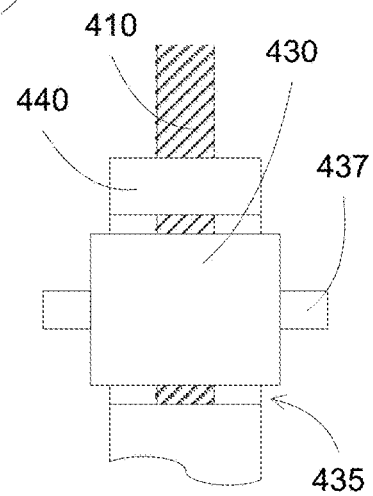
FIG. 4A
FIG. 4B
FIG. 4D
FIG. 4C - View A
FIG. 4E - View B

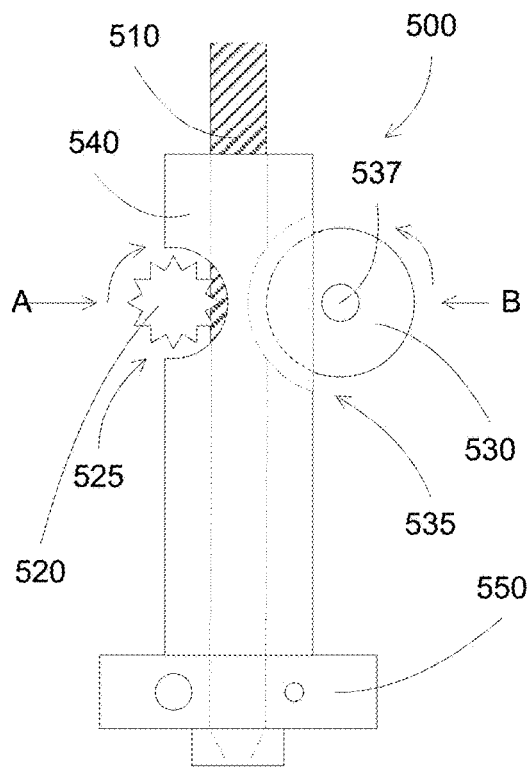
FIG. 5A
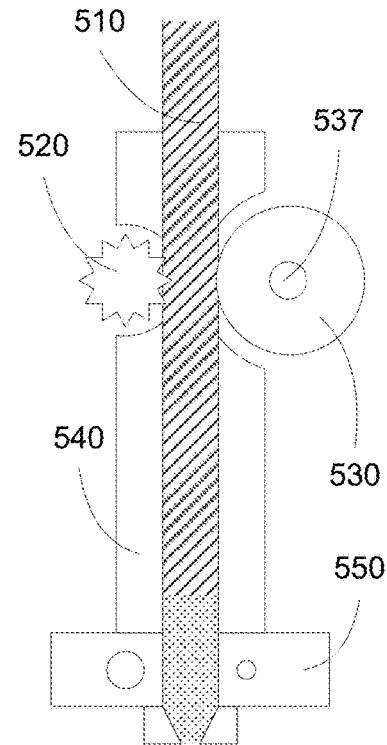
FIG. 5B
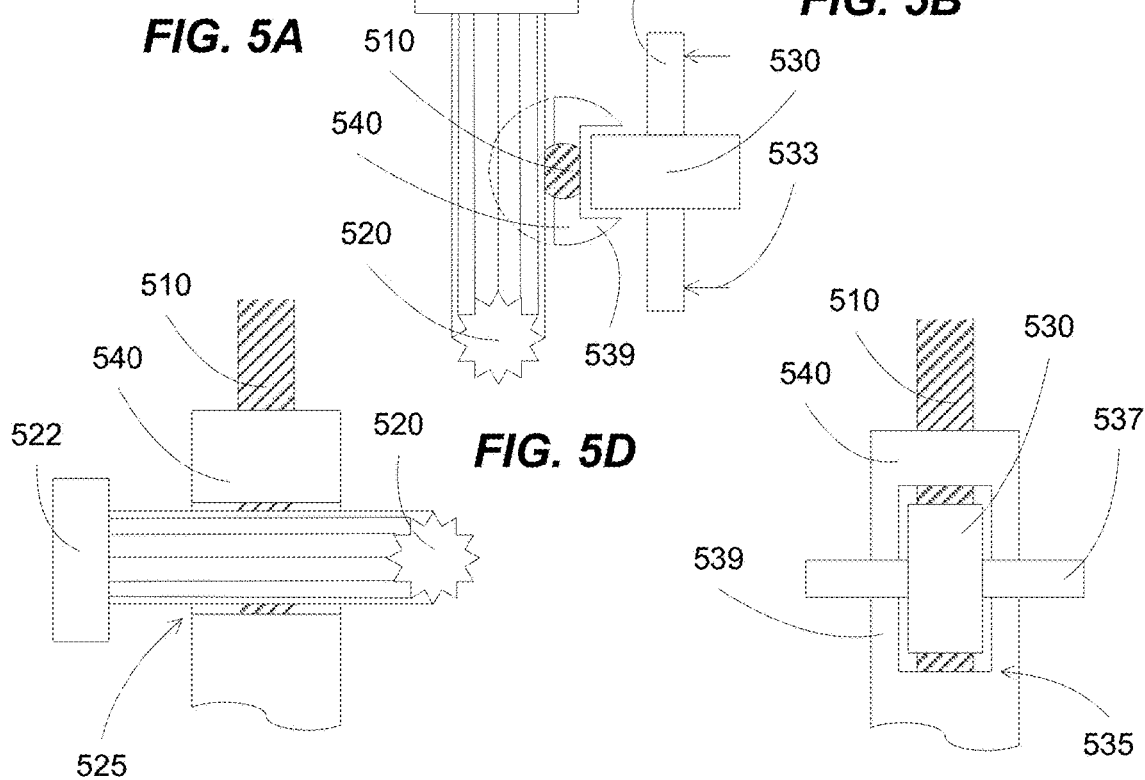
FIG. 5D
FIG. 5C - View A
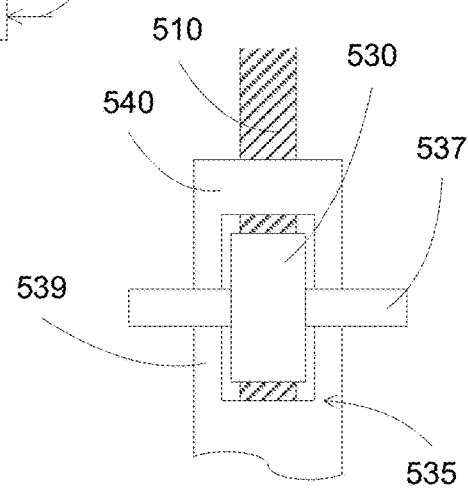
FIG. 5E - View B

Providing a hollow conduit for accepting a filament
600

Forming a first cut in the conduit for passing a filament driving assembly, wherein the filament driving assembly is coupled to the filament for driving the filament along the conduit
610

Forming a second cut in the conduit for passing a rolling assembly, wherein the rolling assembly is coupled to the filament for rolling the filament along the conduit
620

Pushing the rolling assembly toward the filament
630

Wherein the roller assembly is optionally configured to be constrained by the conduit
640

*FIG. 6*

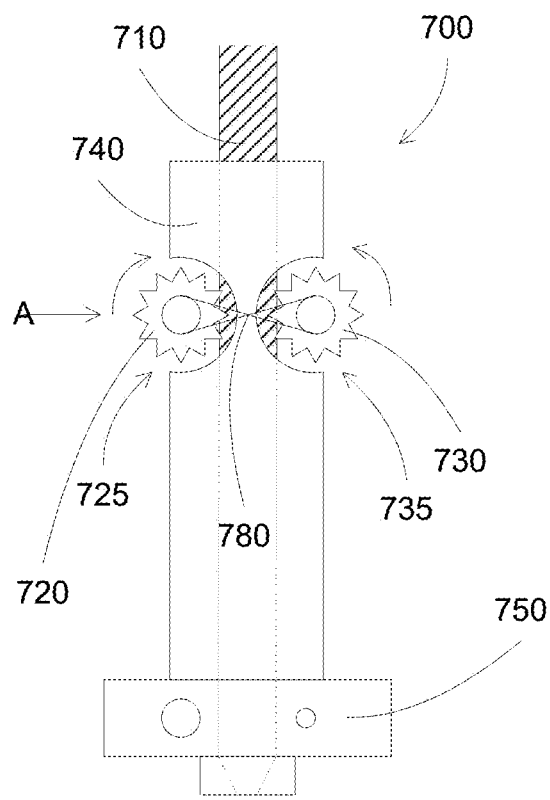
FIG. 7A
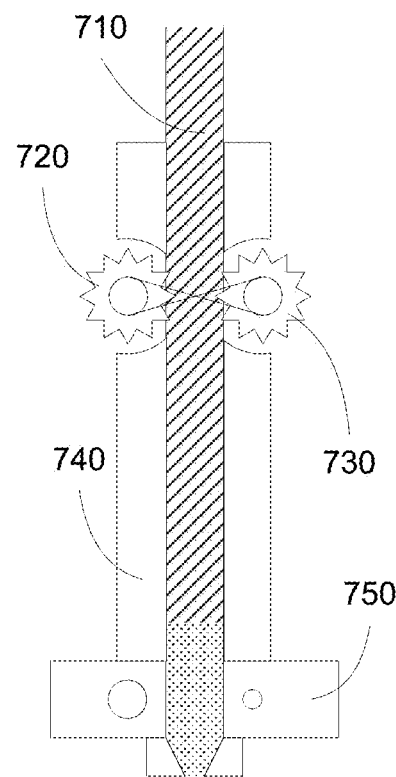
FIG. 7B
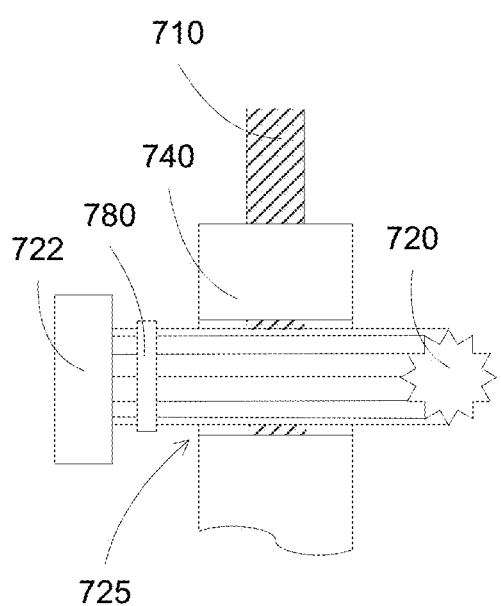
FIG. 7C - View A
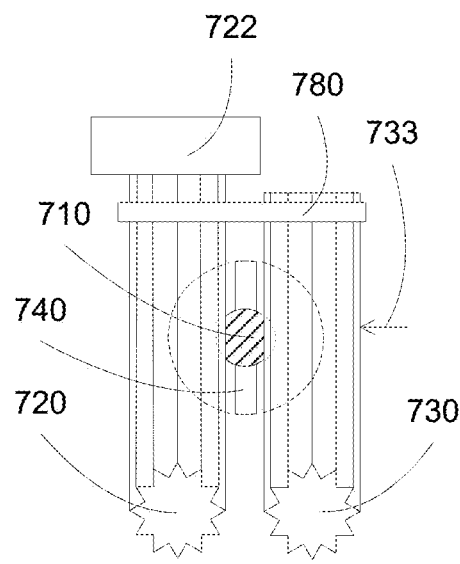
FIG. 7D

Actively driving a filament in two or more locations
800

FIG. 8A

Providing a hollow conduit for accepting a filament
820

Forming a first cut in the conduit for passing a first filament driving assembly, wherein the first filament driving assembly is coupled to the filament for driving the filament along the conduit
830

Forming a second cut in the conduit for passing a second filament driving assembly, wherein the second filament driving assembly is coupled to the filament for driving the filament along the conduit
840

Coupling the first filament driving assembly with the second filament driving assembly, the coupling is configured so that the filament driving assemblies are configured to drive the filament in a same direction
850

FIG. 8B

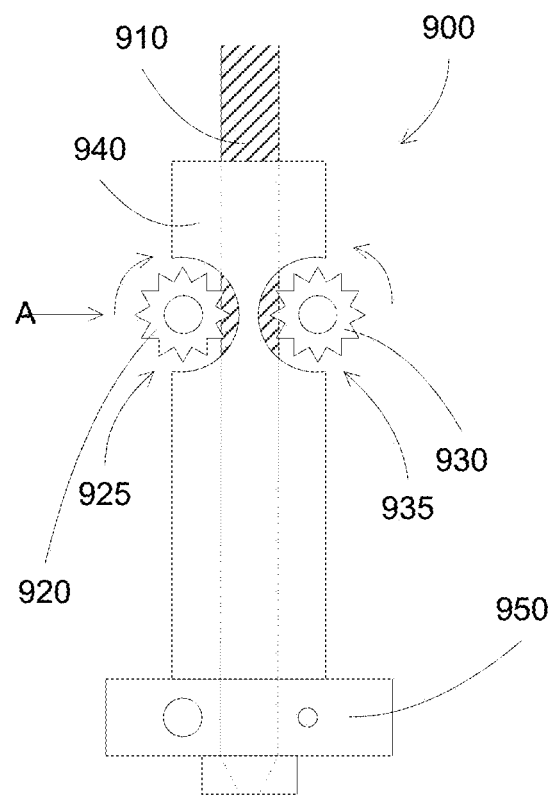
FIG. 9A
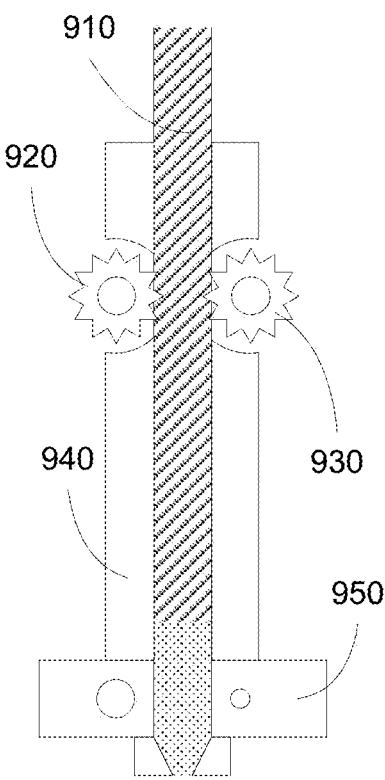
FIG. 9B
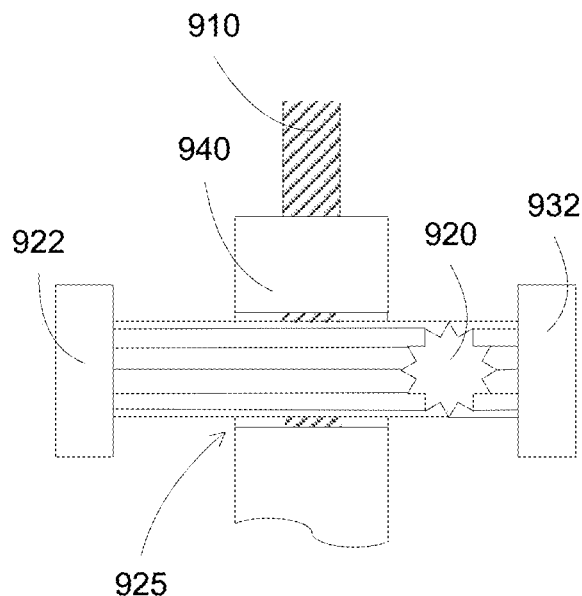
FIG. 9C - View A
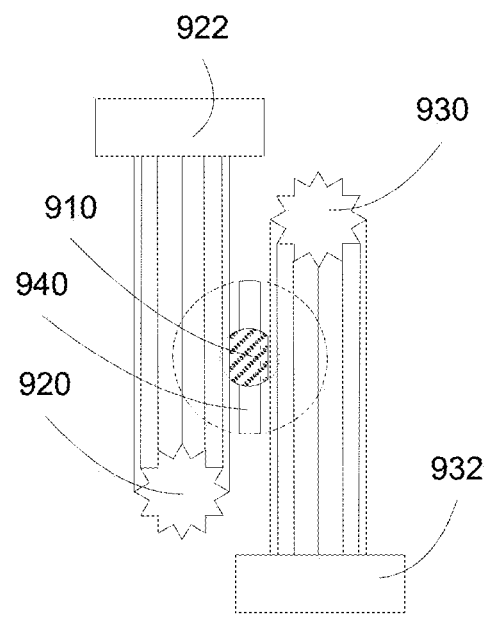
FIG. 9D

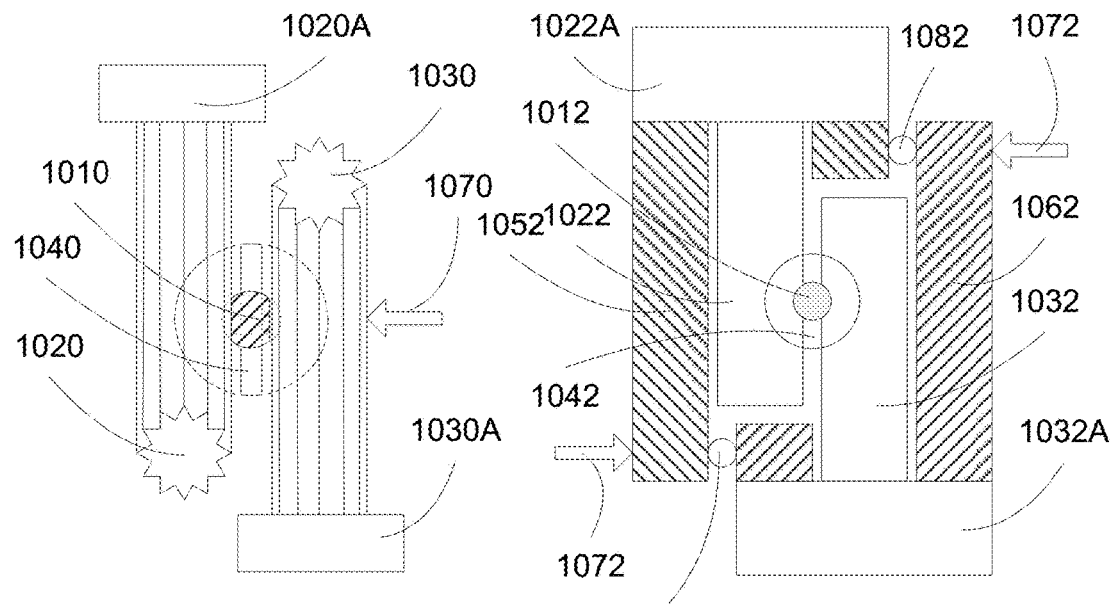
FIG. 10A
FIG. 10B
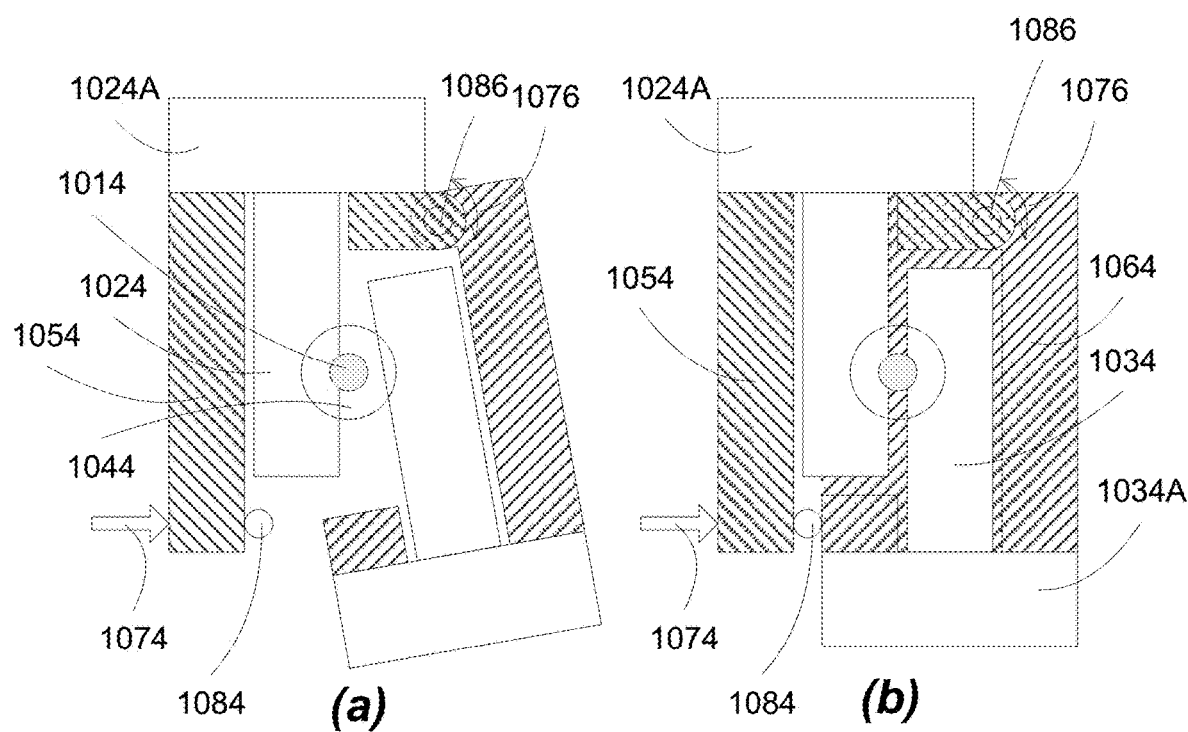
FIG. 10C

Actively driving a filament in two or more locations using two independent movement mechanisms
1100

FIG. 11A

Providing a hollow conduit for accepting a filament
1120

Forming a first cut in the conduit for passing a first filament driving assembly, wherein the first filament driving assembly is coupled to the filament for driving the filament along the conduit
1130

Forming a second cut in the conduit for passing a second filament driving assembly, wherein the second filament driving assembly is coupled to the filament for driving the filament along the conduit, wherein the first filament driving assembly is independent of the second filament driving assembly
1140

Optionally adjusting a position of the first filament driving assembly with respect to the second filament driving assembly
1150

FIG. 11B

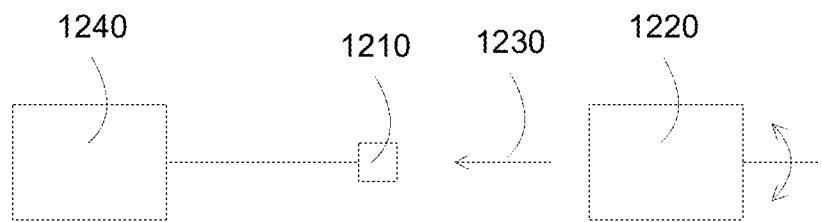
FIG. 12A
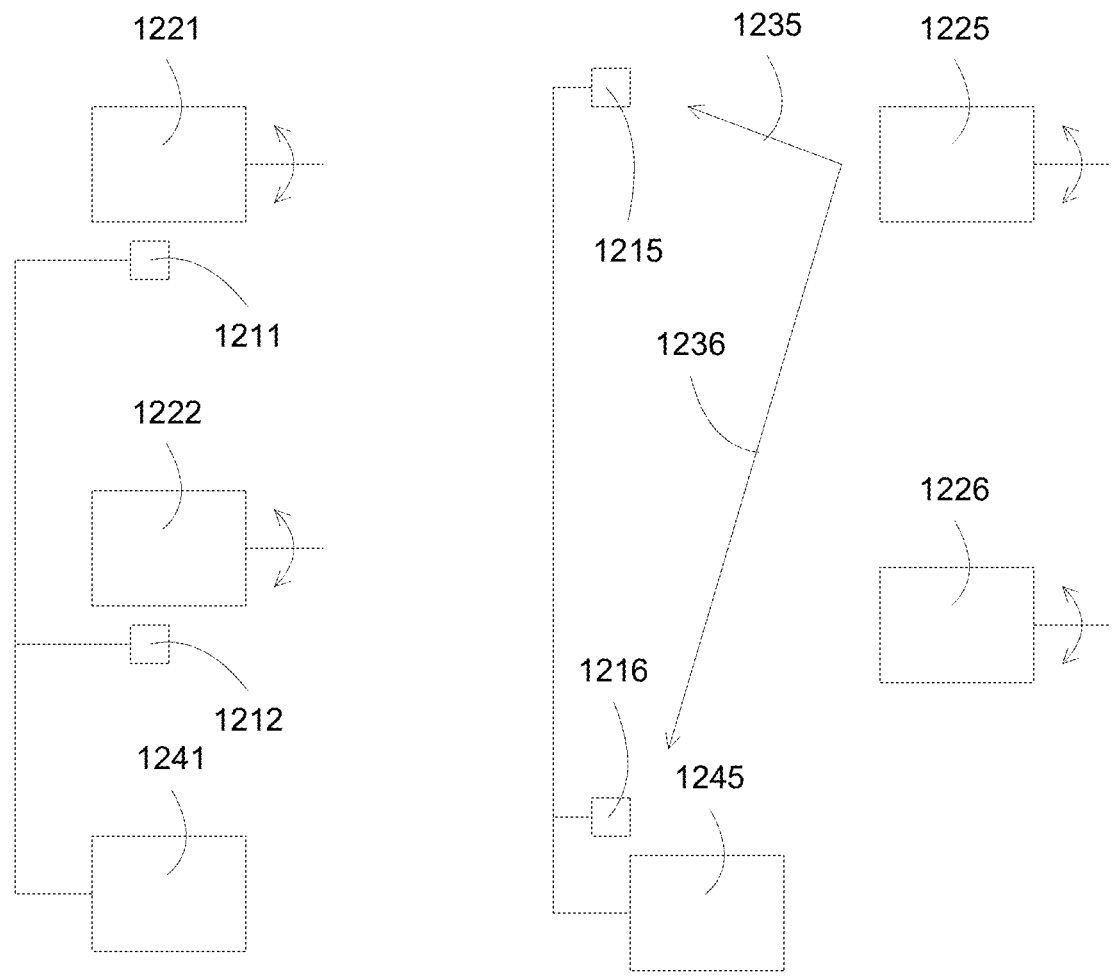
FIG. 12B  FIG. 12C

Sensing an acoustic signal from a movement assembly
1300

Detecting an operation condition of the movement assembly
1310

FIG. 13A

Sensing an acoustic signal
1330

Determining a movement assembly that emits the acoustic signal
1340

Adjusting an operation condition of the movement assembly
1350

FIG. 13B

Providing a system comprising a motor
1370

Installing an acoustic sensor for detecting and/or adjusting an operation condition of the system
1380

Detecting a contact of a movement assembly to an object based on a change in a received acoustic signal
1480

Moving a movement assembly to approach an object
1482

Determining a position of the movement assembly when detecting a change in a received acoustic signal
1483

Detecting a contact of a first object having a vibrational assembly to a second object based on a change in a received acoustic signal
1580

Moving a first object having a vibrational assembly to approach a second object
1582

Determining a position of the first object when detecting a change in a received acoustic signal
1583

---

Leveling a platform using an acoustic sensing assembly
1680

---

Detecting offset values at different portions of a platform based on a change in a received acoustic signal at each portion
1682

↓

Leveling the platform using the offset values
1683

Installing an acoustic sensor to a 3D printer
1800

Detecting and/or adjusting an operation condition of the 3D printer based on a signal from the acoustic sensor
1810

*FIG. 18A*

Zeroing a distance between a print head and a platform of a 3D printer based on a signal from an acoustic sensor
1830

*FIG. 18B*

Leveling a platform of a 3D printer based on a signal from an acoustic sensor
1850

*FIG. 18C*

Detecting and/or adjusting an operation condition of a motor in a D printer based on a signal from an acoustic sensor
1870

*FIG. 18D*

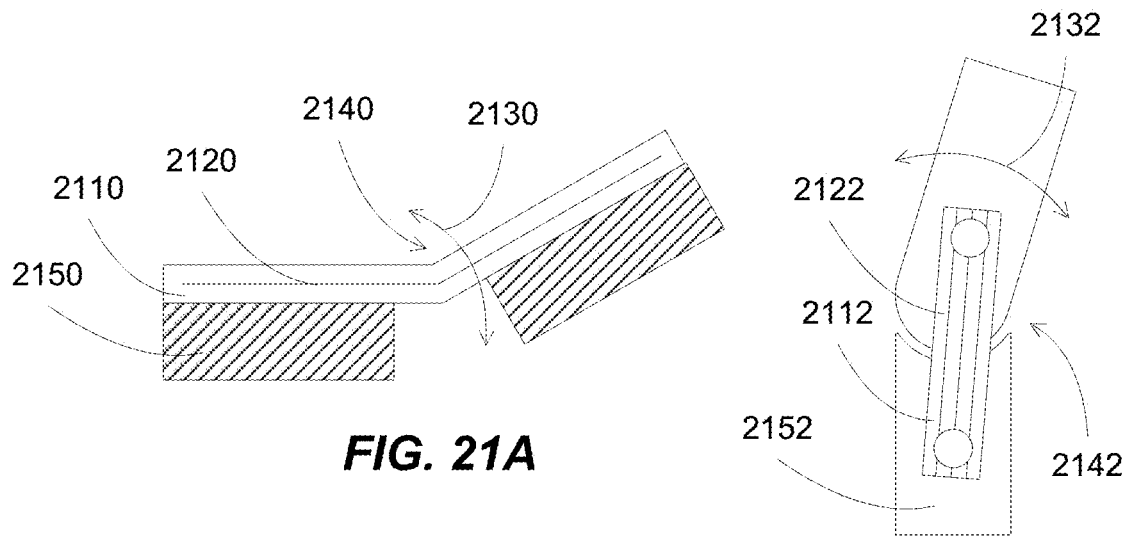
FIG. 21A
FIG. 21B
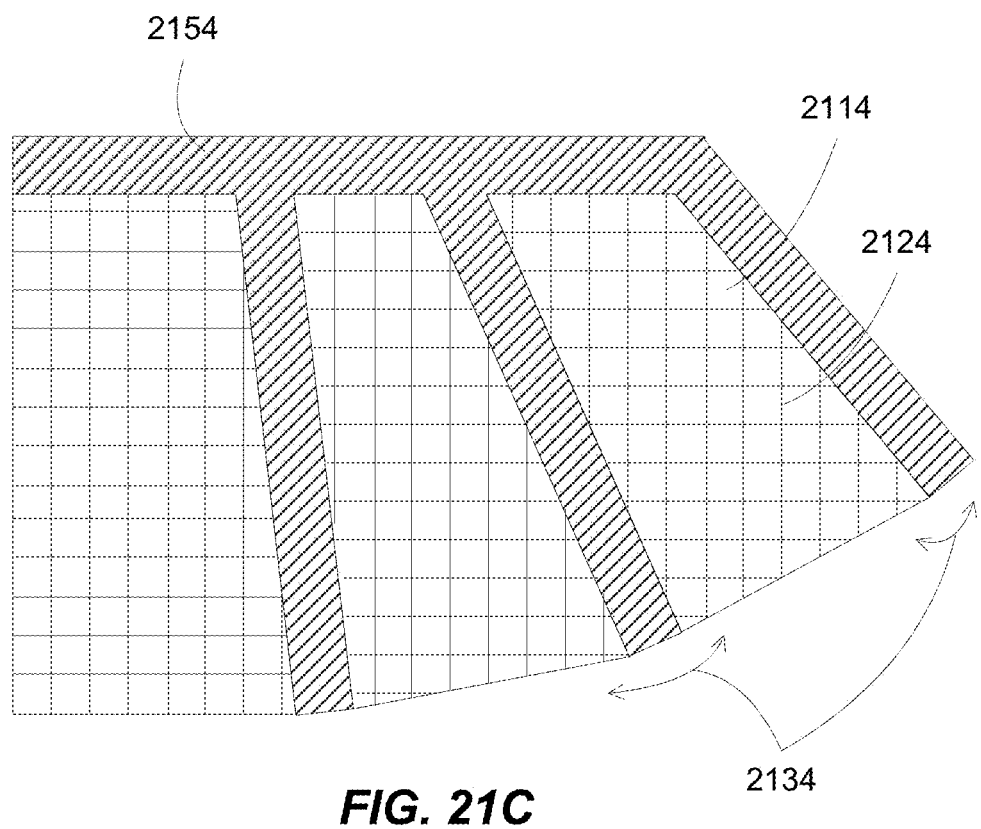
FIG. 21C

Adding a carbon fiber mesh to a flexible layer to increase durability
2200

FIG. 22A

Incorporating a carbon fiber mesh to a flexible layer
2220

Reinforcing the flexible layer with a rigid layer
2230

Trimming the carbon fiber mesh using a laser
2240

FIG. 22B

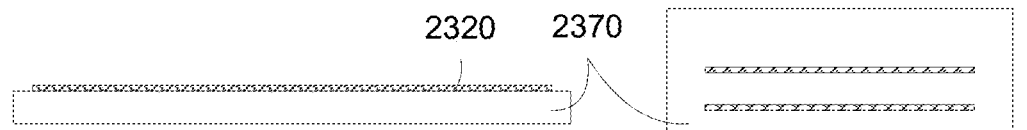
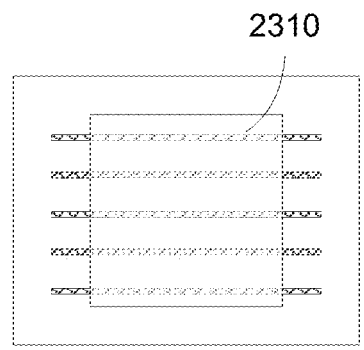 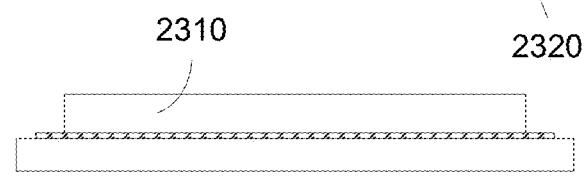
FIG. 23A
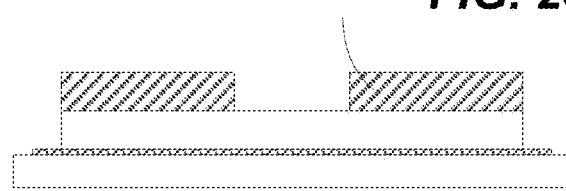 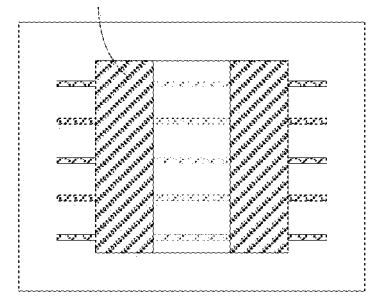
FIG. 23B
FIG. 23C
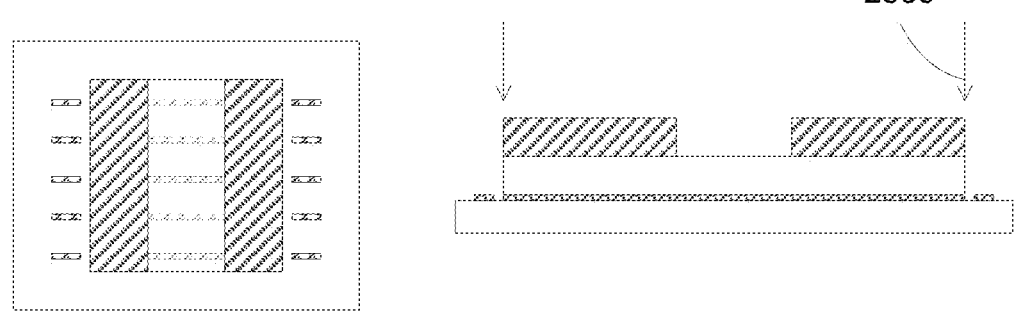
FIG. 23D
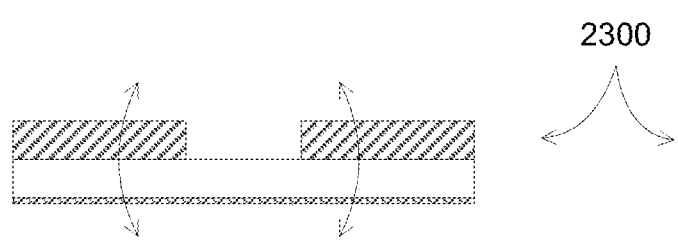 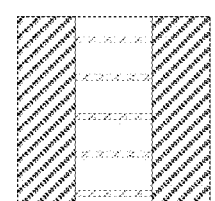
FIG. 23E

```
┌─────────────────────────────────────────────────┐
│ Forming a rigid joint structure with movable components │
│                       3000                      │
└─────────────────────────────────────────────────┘
                         ↓
┌─────────────────────────────────────────────────┐
│ Optionally forming a flexible coupling for the rigid joint │
│ structure , wherein the flexible coupling is configured for │
│        moving the rigid joint structure         │
│                       3010                      │
└─────────────────────────────────────────────────┘
                         ↓
┌─────────────────────────────────────────────────┐
│  Disposing a carbon fiber mesh on the flexible coupling  │
│                       3020                      │
└─────────────────────────────────────────────────┘
                         ↓
┌─────────────────────────────────────────────────┐
│ Optionally forming a flexible layer on a portion of the carbon │
│                    fiber mesh                   │
│                       3030                      │
└─────────────────────────────────────────────────┘
                         ↓
┌─────────────────────────────────────────────────┐
│ Optionally forming a rigid layer on a portion of the second │
│  flexible layer or on a portion of the carbon fiber mesh │
│                       3040                      │
└─────────────────────────────────────────────────┘
                         ↓
┌─────────────────────────────────────────────────┐
│        Trimming the carbon fiber mesh using a laser      │
│                       3050                      │
└─────────────────────────────────────────────────┘
```

*FIG. 30*

Forming a system comprising a first head for 3D printing and a second head for surface conditioning
3200

FIG. 32A

Forming at least a portion of an object using a 3D printer head
3220

Conditioning a surface of the object using a surface conditioning head
3230

Optionally repeating printing and surface conditioning
3240

FIG. 32B

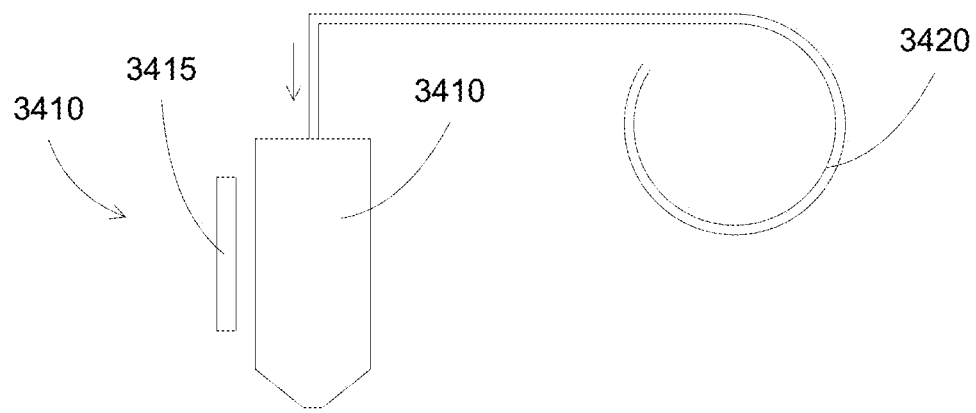
FIG. 34A
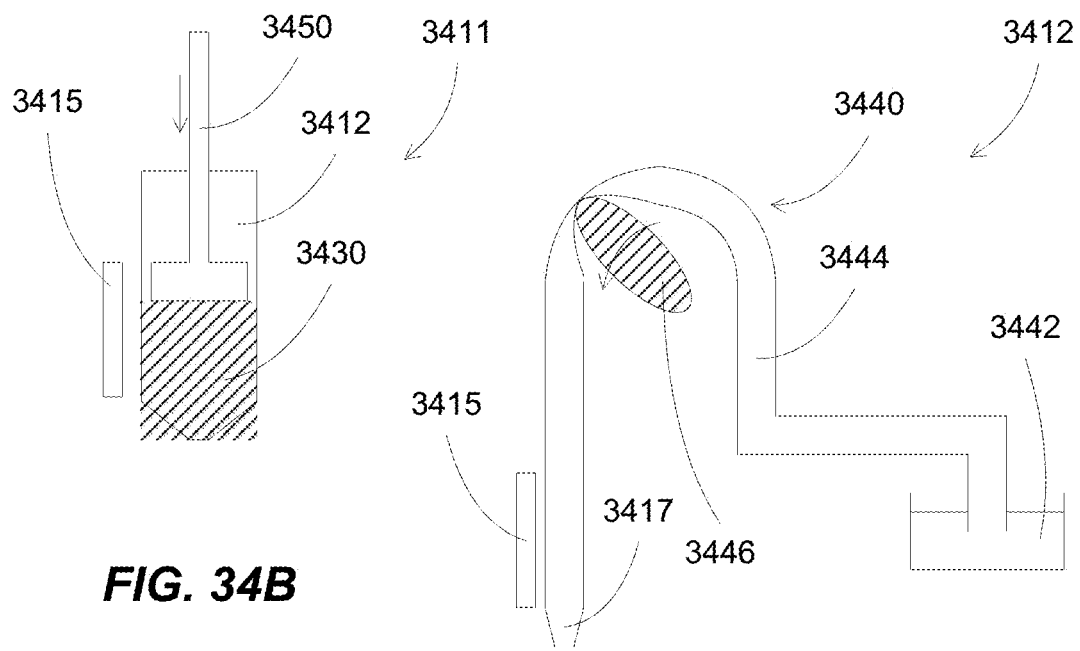
FIG. 34B
FIG. 34C

Forming an object using a 3D printing process and a surface conditioning process
3600

Forming a cast object using the object as a mold
3610

*FIG. 36A*

Forming an object using a 3D printer assembly
3630

Conditioning a surface of the object using a surface conditioning assembly
3640

Casting a second object using the surface conditioning object
3650

*FIG. 36B*

3D PRINTER SYSTEMS AND METHODS

The present application claims priority from U.S. Provisional Patent Application Ser. No. 62/310,816, filed on Mar. 21, 2016 entitled: "3D printer systems and methods", which is incorporated herein by reference.

BACKGROUND OF THE INVENTION 3D printers can be used to build solid objects by printing layers by layers of building materials. The building materials can be in liquid or semi liquid form at the 3D printer head, for example, a solid material can be heated and then extruded from a 3D printer nozzle. The layers of building materials can be solidified on a substrate.

3D printer systems can use a fused filament fabrication (FFF) process (sometimes called fused deposition modeling (FDM) process) in which a filament is moved, e.g., by a filament moving mechanism, toward a heated zone. The filament can be melted, and extruded on a platform to form a 3D object. The melted filament can adhere to the walls of the heated printer head, resulting in a deformed printed lines.

It would therefore be advantageous to have advanced 3D printing systems and methods that have improved printing mechanisms.

SUMMARY OF THE DESCRIPTION

In some embodiments, the present invention discloses a print head for a 3D printer for printing a structure using a filament. The print head can include two hobbed shafts disposed in opposite sides of the filament and contacting the filament. The shafts can be configured to rotate in opposite directions for driving the filament, for example to a heated chamber. The heated chamber can be configured to heat the filament to a melting temperature, so that the print head can deliver a molten material.

In some embodiments, one shaft of the two shafts can be coupled to a motor, e.g., to be actively driven by the motor. The other shaft can be coupled to the one shaft by a coupling mechanism, such as by a gear set or by a belt.

In some embodiments, each shaft can be coupled to one motor, e.g., two shafts can be coupled to two independent motors. The motors can be independent, e.g., the filament can be actively driven by the two independent motors. The motors can be driven at a same speed or at different speeds, for example, to ensure an appropriate delivering of material to the heated chamber.

In some embodiments, an assembly, such as a spring assembly, can be coupled to the print head to adjust the distance between the two shafts. The adjustment can be used to change a friction with the filament, e.g., a driving force to the filament. For example, a soft filament might need a smaller distance to ensure an appropriate force to the filament to drive the filament.

The print head can be coupled to a 3D printer, such as movably coupled, e.g., the print head can be securely coupled to the 3D printer and can be removed from the 3D printer.

In some embodiments, the print head can include a conduit having a channel for guiding the filament. The diameter of the channel can be about the size of the filament, so that the filament can easily move within the channel. Further, the conduit can include a low friction material, such as Teflon, which can assist in the movements of the filament.

The print head can include two motors with each motor having a shaft. The motors are configured to drive the filament along the channel by contact, e.g., the motor shafts can be in contact with the filament, so that the motors turn, the friction with the filament can drive the filament. The contact can be a direct contact, e.g., the motor shafts can directly contact the filament. To increase a friction force, a portion of the surface of the shafts can be hobbed, e.g., roughened. The hobbed surfaces can then contact the filament for driving the filament.

The contact can be an indirect contact, e.g., the motor shafts can contact the filament through an element fixedly coupled to the shafts. For example, a gear or a disc with an irregular circumference surface can be coupled to a shaft. The teeth of the gear of the irregular surface can increase a friction while in contact with the filament. The high friction can assist in moving the filament along the guiding channel.

In some embodiments, the conduit can include two cut portions for accepting the two shafts or the gears (e.g., a gear or a disc) fixedly coupled to the shafts. The cut portions can be at two opposite side of the conduit, cut through the conduit until reaching the channel. Each cut portion can expose a portion of the channel. A shaft can pass through the cut portion, with a portion of the shaft surface, e.g., the hobbed surface, contacting the filament through the corresponded exposed portion. Alternatively, a shaft can pass through the cut portion, with a gear surface contacting the filament through the corresponded exposed portion. With the conduit having the cut portions, the filament is constrained in the intended path, e.g., along the channel direction. The conduit can ease the insertion of the filament to the print head, since the filament just need to enter the conduit. Subsequent movements of the filament can be guided by the conduit. The conduit can also prevent the accumulation of filament in the area under the shafts, especially if the downstream of the filament path is blocked. Essentially, the conduit almost completely covers the filament, e.g., the cut portions can expose sections of the filament, but the exposed sections are blocked by the shafts or the gears.

In some embodiments, the shafts can be disposed in parallel with each other and perpendicular to the conduit. The shafts can be configured to be in opposite sides of the filament and contacting the filament. The motors can be disposed in opposite directions with respect to the conduit. The shafts can be configured to rotate in opposite directions for driving the filament along the channel.

In some embodiments, an assembly can be coupled to one shaft or one motor or one motor mount, for example, for pushing the one shaft to the other shaft, e.g. for adjusting a distance between the two shafts. The assembly can be spring loaded.

In some embodiments, the motors can be coupled to separate motor mounts. The separate motor mounts can be coupled to each other so that one motor mount of the two motor mounts is configured to move with respect to the other motor mount. The movement can be linear movements, e.g., one motor mount can be linearly translated with respect to the other motor mount, to adjust a distance between the two motor shafts. The movement can be rotation movements, e.g., one motor mount can be rotated with respect to the other motor mount, to adjust a distance between the two motor shafts.

In some embodiments, the print head can be coupled to a 3D printer, such as removably coupled. For example, the print head can be coupled to the 3D printer for printing a soft material. The print head can then be removed from the 3D printer, and another print head can be installed for printing a different material.

In some embodiments, an acoustic sensor can be included for detecting a condition of the two motors. The acoustic sensor can be coupled to the print head or to the 3D printer. The acoustic sensor can detect a normal sound, e.g., the amplitude and the frequency of the sound, of the motors when running, and can report that things are running properly. The acoustic sensor can detect an abnormal sound, e.g., from a change in the amplitude and/or the frequency of the sound, of the motors when running, and can report that there seems to be a problem. A controller can decide to stop the printing process, or can automatically adjust an operating condition of the motors, such as changing a speed or changing an acceleration of the motors.

In some embodiments, an acoustic sensor can be included for detecting a contact of the print head with an object. The acoustic sensor can be coupled to the print head or to the 3D printer. For example, the print head can move downward to contact a platform of the 3D printer. Before the contact, the acoustic sensor can detect a normal sound of the motors. After the contact, the sound can change, e.g., changing in the amplitude and/or the frequency of the sound. A controller can determine the location that the print head contact the platform, and can set the location to be a reference point for the platform with respect to the print head.

In some embodiments, an acoustic sensor can be included for leveling a platform of a 3D printer. The acoustic sensor can be coupled to the print head or to the 3D printer. For example, the print head can move to a first point, and then find a first contacting location of the print head with the platform. The print head can move to another point, and can repeat the process to find a second contacting location. With three contacting locations, the 3D printer can level the platform. For example, the platform can be adjusted so that the contacting locations are located in a plane perpendicular to the print head. Alternatively, a software correction algorithm can be used so that the print head can print on a non-perpendicular plane (if the contacting locations are on a plane) or on an irregular surface (if the contacting locations do not form a planar surface).

In some embodiments, the present invention discloses a method to use the print head with two independent motors driving a filament. The method can include activating the two motors to rotate in opposite direction, wherein each motor comprises a shaft, wherein the two shafts are configured to drive a filament along a channel of a conduit to a heated chamber for delivering a molten material. The method can also include moving the motors to print an object with the molten material.

BRIEF DESCRIPTION OF THE DRAWINGS

FIG. 2A-2E illustrate a configuration for a filament delivery assembly according to some embodiments.

FIGS. 3A-3C illustrate flow charts for filament delivering according to some embodiments.

FIG. 4A-4E illustrate a configuration for a filament delivery assembly according to some embodiments.

FIG. 5A-5E illustrate a configuration for a filament delivery assembly according to some embodiments.

FIG. 6 illustrates a flow chart for filament delivering according to some embodiments.

FIG. 7A-7D illustrate a configuration for a filament delivery assembly according to some embodiments.

FIGS. 8A-8B illustrate flow charts for filament delivering according to some embodiments.

FIG. 9A-9D illustrate a configuration for a filament delivery assembly according to some embodiments.

FIGS. 10A-10C illustrate configurations for a filament delivery assembly according to some embodiments.

FIGS. 11A-11B illustrate flow charts for filament delivering according to some embodiments.

FIGS. 12A-12C illustrate acoustic sensor configurations according to some embodiments.

FIGS. 13A-13C illustrate flow charts for acoustic signal configurations according to some embodiments.

FIGS. 14A-14D illustrate contact sensing configurations using an acoustic sensor assembly according to some embodiments.

FIGS. 18A-18D illustrate configurations for 3D printers according to some embodiments.

FIGS. 21A-21C illustrate configurations for flexible layers with support structures according to some embodiments.

FIGS. 22A-22B illustrate flow charts for reinforcing flexible layers with carbon fiber mesh according to some embodiments.

FIGS. 23A-23E illustrate a process for forming a carbon fiber mesh reinforce flexible layer according to some embodiments.

FIG. 30 illustrates a flow chart for forming carbon fiber mesh reinforced flexible layers according to some embodiments.

FIGS. 32A-32B illustrate flow charts for forming surface conditioning objects for casting according to some embodiments.

FIGS. 34A-34C illustrate different print heads according to some embodiments.

FIGS. 36A-36B illustrate flow charts for casting objects using surface conditioning printed objects according to some embodiments.

DETAILED DESCRIPTION OF THE EMBODIMENTS

Additive manufacturing processes generally fabricate 3D objects by depositing layers by layers in patterns corresponding to the shape of the objects. At each layer, a print head can deposit building materials at locations corresponded to the pattern of the object for that layer.

3D printing processes can include inkjet printing, stereolithography and fused filament fabrication. In inkjet printing processes, liquid material are released from an inkjet print head, and solidified on the substrate surface, e.g., on the model being formed. In stereolithography processes, a UV light can crosslink layers of photopolymer. In fused filament fabrication processes, a continuous filament of thermoplastic can be softened or melted and then re-solidified on a previously deposited layer. Alternatively, paste-like materials can be used for printing, for example, through a pressure extrusion device such as a piton/cylinder.

Various polymers are used, including acrylonitrile butadiene styrene (ABS), polycarbonate (PC), polylactic acid (PLA), high density polyethylene (HDPE), PC/ABS, and polyphenylsulfone (PPSU). Other materials can be used, such as clay or ceramic materials.

Figure 1:
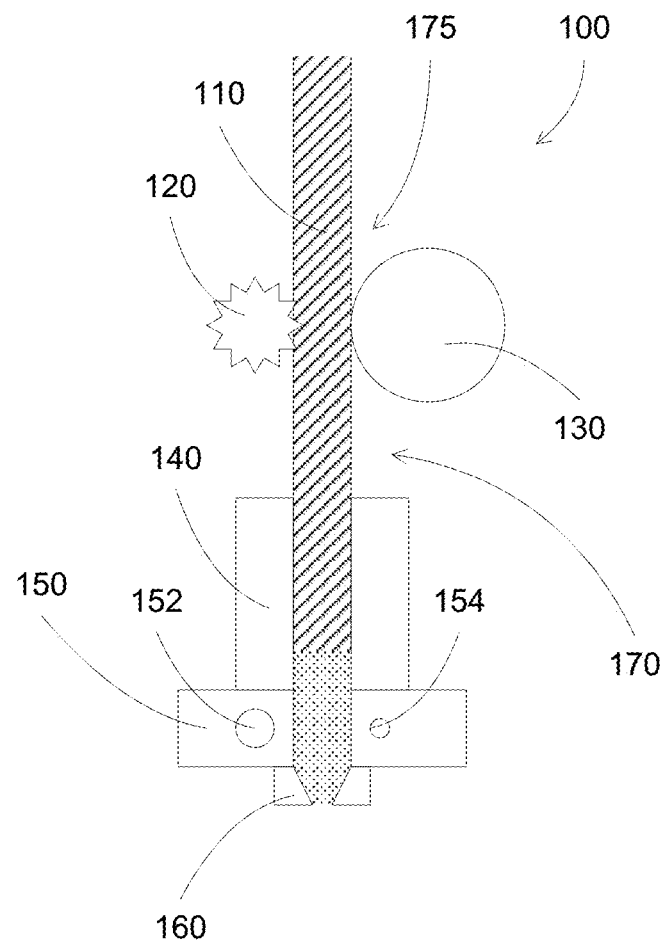
FIG. 1 illustrates a prior art 3D print head according to some embodiments.

FIG. 1 illustrates a prior art 3D print head according to some embodiments. The print head 100 can be used in a 3D printer system, which can print objects on a platform. The platform can include a heater, which can heat the platform surface. The print head can be moved relative to the platform, in horizontal and vertical directions, for example, by computer controlled mechanisms using stepper or servo motors. For example, the printer head can move in a horizontal direction, such as x. The platform can move in a horizontal direction such as y, together with a vertical direction such as z. Other movement configurations can be used to provide complete 3D movements of the printer head relative to the platform.

The print head 100 can accept a filament 110, such as a thermoplastic filament. The print head 100 can include a delivery mechanism to regulate the flow of the filament 110. For example, a motor rotating a gear 120 can be used to push the filament into a heated chamber 150 at a controlled rate. There can be bearing 130, disposed on an opposite side of the rotating gear 120 for supporting the filament against the rotating gear 120.

The heated chamber 150 can include a heater 152, which can heat the filament 110 to a temperature that can melt or soften the filament material, for example, to a temperature higher than the glass transition temperature of the filament material. A temperature sensor 154 can be used to regulate the temperature of the heated chamber 150. A nozzle 160 can be used to control the size of the molten filament, outputted from the print head.

The print head can be thermally isolated from the delivery assembly, for example, by a low thermal conductivity material. For example, a thermal isolation element 140 can be disposed between the heated chamber 150 and the rotating gear 120, for example, to prevent heating other components of the print head. The thermal isolation element 140 can also be function as a guide, which can serve for guiding the filament 110, from the rotating gear 120 to the heated chamber 150.

There can be a gap 170 between the rotating gear 120 and the guiding element 140. The filament can escape through the gap 170, for example, if there is a blockage at the guiding element 140 or at the heated chamber 150.

In addition, the there might not be enough force for the rotating gear 120 to push the filament 110. Since there can be only one rotating gear 120 pushing the filament against the rotating bearing 130, if there is a blockage, the rotating gear 120 can be slipped. Further, if the filament includes a soft material, such as an elastic material or a deformable material, the single rotating gear 120 might deform the filament without actually moving it toward the guiding element 140.

In some embodiments, the present invention discloses a novel filament delivery assembly to deliver a filament. The filament delivery assembly can be used in a print head of a 3D printer system. The novel filament delivery assembly can include a filament guiding assembly and a filament driving assembly, which can include an active drive element, such as a motor rotating a hobbed shaft, for driving a filament in the filament guiding assembly toward a heated chamber.

In some embodiments, the present invention discloses a print head for use, for example, in a 3D printer system. The print head can include a novel filament delivery assembly.

The filament delivery assembly can include a hollow conduit, which can enclose a filament therein for guiding the filament. The hollow conduit can include an opening at an end, which can operate as an input for accepting the filament. The other end of the hollow conduit can be coupled to the heated chamber, e.g., for guiding the filament along the hollow conduit toward the heated chamber. The hollow conduit can be extended from the heated chamber to pass a filament driving assembly, such as a hobbed shaft of a motor or a tooth gear coupled to a shaft of a motor. The filament driving assembly can be located between the input of the hollow conduit and the heated chamber.

The hollow conduit can be configured for supporting the filament against the filament driving assembly, e.g., against the hobbed shaft or a gear shaft of a motor. The hollow conduit can eliminate spaces after the filament driving assembly, e.g., between the filament driving assembly and the heated chamber, thus can reduce potential filament mis-guiding problems. In addition, the hollow conduit can simplify the print head construction, for example, by eliminating the bearing assembly that is used as a support the filament driving assembly.

FIG. 2A-2E illustrate a configuration for a filament delivery assembly according to some embodiments. A filament delivery assembly 200 can be used in a print head, which can include coupling elements for coupling to movement assemblies, e.g., for moving in x, y, or z directions, of a 3D printer system. The print head can include a heated chamber 250, which can accept a filament input from the filament delivery assembly, and deliver molten filament to a nozzle 260 for printing on a platform. The heated chamber 250 can include a heater 252 and a temperature sensor 254, for regulating a temperature of the heated chamber.

A filament delivery assembly 200 can include a filament driving assembly 220, which can include a motor 222 driving a hobbled shaft or a gear shaft. For example, FIG. 2D shows a motor 270 having a shaft 271 coupled with a gear 272. The uneven surface of the gear can touch the filament, and when the shaft is rotated, the gear is also rotated, and the uneven surface of the gear can move the filament. FIG. 2E shows a motor 275 having a shaft 276 hobbed 272 277, e.g., forming a rough or uneven surface or teeth on a surface of the shaft. For example, the hobbing action can form marking on the shaft, which can generate a rough surface. The rough surface of the hobbed portion of the shaft can touch the filament, and when the shaft is rotated, the rough surface of the shaft can catch the filament to move the filament.

A filament delivery assembly 200 can be include a filament guiding assembly, which can include a hollow conduit 240. The hollow conduit can include a material with low friction, such as Teflon. The hollow conduit can include a material with low thermal conductivity for thermal isolation, e.g., reducing the amount of heat that can reach the filament driving assembly from the heated chamber.

The hollow conduit 240 can include an input opening at one end for accepting a filament 210. The hollow conduit 240 can include an opening at an opposite end for coupling with the heated chamber, e.g., to guide the filament toward the heated chamber. The hollow conduit 240 can include a cut portion 225, which can allow the motor shaft 220 to pass through for contacting the filament. When the motor rotates, the filament can be pulled into the hollow conduit from the input opening. The motor can also push the filament, along the hollow conduit, toward the heated chamber.

The hollow conduit can cover, e.g., guide, the filament before the filament reaches the filament driving assembly 220, such as the rotating gear or hobbed portion of the motor shaft. The filament can be guided after the pushing action of the filament driving assembly, thus the filament delivery assembly can prevent or eliminate spilling of the filament, such as preventing the filament from being driven to another location when the heated chamber is blocked.

In some embodiments, the hollow conduit can include holes 245, for example, to increase a thermal isolation from the heated chamber to the motor shaft. A fan can be included, for blowing passing the holes and the hollow conduit, further reducing a temperature at the motor shaft.

In some embodiments, a force can be applied to push the hollow conduit 240 relative to the motor shaft 220. The force can be used to increase a friction between the motor shaft and the filament, which can prevent slippage of the filament. As shown, a force 233 can be used to push the hollow conduit against the motor shaft. Alternatively, a force can be applied to the motor to push the motor shaft against the hollow conduit.

FIGS. 3A-3C illustrate flow charts for filament delivering according to some embodiments. In FIG. 3A, operation 300 guides a filament between a filament driving assembly and a filament heating assembly. The filament can also be guided before and/or during the filament driving assembly. The complete filament guidance can prevent mis-directing of the filament, for example, in unexpected events such as a blockage in the filament heating assembly.

In FIG. 3B, operation 320 provides a hollow conduit for accepting a filament. Operation 340 330 forms a cut in the conduit for passing a filament driving assembly, wherein the filament driving assembly is coupled to the filament for driving the filament along the conduit. The cut can be formed by drilling a hole through the hollow conduit. The hole can be configured to expose a portion of the filament to an outside ambient, e.g., the hole diameter can be larger than a thickness of the hollow conduit, and after formed, the hole can expose the hollow portion of the hollow conduit to the outside ambient. The hole diameter can be slightly larger than a diameter of the hobbed portion of a motor shaft, or slightly larger than a diameter of a gear coupled to a motor shaft.

In some embodiments, holes can be formed on the hollow conduit. A spring assembly can be incorporated for pushing the hollow conduit against the filament driving assembly. Support elements can be added around the hollow conduit, for example, for supporting the hollow conduit and/or supporting the filament driving assembly, such as a motor.

In FIG. 3C, operation 350 uses a hollow conduit to guide a filament with a filament driving assembly driving the filament along the conduit. The filament driving assembly can include a motor having a motor shaft. A gear can be fixed coupled to the motor shaft. Alternatively, the motor shaft can be hobbed for forming rough surface on a portion of the motor shaft. The rough surface can contact the filament, and can move the filament along the hollow portion of the hollow conduit.

In some embodiments, the present invention discloses a novel filament delivery assembly to deliver a filament, together with a print head incorporating the filament delivery assembly. The filament delivery assembly can include a filament driving assembly, which can include an active drive element, such as a motor rotating a hobbed shaft, and a follower element, such as a rotatable bearing that can be pressed against the active drive element.

The filament delivery assembly can include a hollow conduit, which can enclose a filament therein for guiding the filament. The hollow conduit can be extended from the heated chamber to pass a filament driving assembly, such as a hobbed shaft of a motor or a tooth gear coupled to a shaft of a motor. The filament driving assembly can be located between the input of the hollow conduit and the heated chamber. The hollow conduit can eliminate spaces after the filament driving assembly, e.g., between the filament driving assembly and the heated chamber, thus can reduce potential filament mis-guiding problems.

The filament delivery assembly can include a rotatable element, such as a bearing, which can assist in pushing the filament toward active drive element, such as a hobbed portion of a motor shaft. The bearing can also be hobbed, for example, to reduce slippage to the filament.

FIG. 4A-4E illustrate a configuration for a filament delivery assembly according to some embodiments. A filament delivery assembly 400 can be used in a print head, which can include coupling elements for coupling to movement assemblies, e.g., for moving in x, y, or z directions, of a 4D printer system. The print head can include a heated chamber 450, which can accept a filament 410 input from the filament delivery assembly, and deliver molten filament to a nozzle 460 for printing on a platform. The heated chamber 450 can include a heater 452 and a temperature sensor 454, for regulating a temperature of the heated chamber.

A filament delivery assembly 400 can include a filament driving assembly 420, which can include an active drive element such as a motor 422 driving a hobbled shaft or a gear shaft. The filament driving assembly can include a follower element, such as a rotatable element such as a bearing 430. The active drive element and the follower element can be pushed against the filament, such as pushing in opposite directions. The active drive element can drive the filament along a filament guiding assembly, and the follower element can assist in maintaining appropriate friction between the active element and the filament.

A filament delivery assembly 400 can be include a filament guiding assembly, which can include a hollow conduit 440. The hollow conduit can include a material with low friction, such as Teflon. The hollow conduit can include a material with low thermal conductivity for thermal isolation, e.g., reducing the amount of heat that can reach the filament driving assembly from the heated chamber.

The hollow conduit 440 can include a cut portion 425, which can allow the motor shaft 420 to pass through for contacting the filament. The hollow conduit 440 can include another cut portion 435, which can allow the rotatable bearing 430 having a bearing shaft 437 to pass through for contacting the filament. The cut portions 425 and 435 can be slightly larger than a diameter of the hobbed motor shaft 420 and the bearing 430, respectively, for allowing the motor shaft and the bearing to drive the filament along the hollow conduit. The cut portions can cut through the hollow conduit, e.g., by a drill bit.

When the motor rotates, the filament can be pulled into the hollow conduit from the input opening. The movement of the filament can rotate the rotatable bearing. The motor can also push the filament, along the hollow conduit, toward the heated chamber.

In some embodiments, the hollow conduit can include holes, for example, to increase a thermal isolation from the heated chamber to the motor shaft. A fan can be included, for blowing passing the holes and the hollow conduit, further reducing a temperature at the motor shaft.

In some embodiments, a force can be applied to push the follower element, e.g., the rotatable bearing 430 relative to the motor shaft 420. The force can be used to increase a friction between the motor shaft and the filament, which can prevent slippage of the filament. As shown, a force 433 can be used to push the rotatable bearing against the motor shaft. Alternatively, a force can be applied to the motor to push the motor shaft against the rotatable bearing.

FIG. 5A-5E illustrate a configuration for a filament delivery assembly according to some embodiments. A filament delivery assembly 500 can be used in a print head, including a heated chamber 550.

A filament delivery assembly 500 can include a filament driving assembly 520, which can include an active drive element such as a motor 522 driving a hobbled shaft or a gear shaft. The filament driving assembly can include a follower element, such as a rotatable element such as a bearing 530.

A filament delivery assembly 500 can be include a filament guiding assembly, which can include a hollow conduit 540. The hollow conduit 540 can include a cut portion 525, which can allow the motor shaft 520 to pass through for contacting the filament. The hollow conduit 540 can include a partial cut portion 535, which can accept the rotatable bearing 530 having a bearing shaft 537 for contacting the filament. The cut portions 525 and 535 can be slightly larger than a diameter of the hobbed motor shaft 520 and the bearing 530, respectively, for allowing the motor shaft and the bearing to drive the filament along the hollow conduit. The cut portion 525 for the motor shaft can cut through the hollow conduit, e.g., by a drill bit. The cut portion 535 for the motor shaft can be a partial cut, e.g., not cutting through as the cut portion 525, but cutting only a part of the hollow conduit. The partial cut 535 can have flanges 539, formed due to the partial cut, e.g., not cutting through the hollow conduit. The flanges 539 can assist in keeping the rotatable bearing in place, e.g., not sliding along the shaft 537 to positions away from the filament 510.

In some embodiments, the hollow conduit can include holes, for example, to increase a thermal isolation from the heated chamber to the motor shaft. A fan can be included, for blowing passing the holes and the hollow conduit, further reducing a temperature at the motor shaft.

In some embodiments, a force can be applied to push the follower element, e.g., the rotatable bearing 530 relative to the motor shaft 520. The force can be used to increase a friction between the motor shaft and the filament, which can prevent slippage of the filament. As shown, a force 533 can be used to push the rotatable bearing against the motor shaft. Alternatively, a force can be applied to the motor to push the motor shaft against the rotatable bearing.

FIG. 6 illustrates a flow chart for filament delivering according to some embodiments. Operation 600 provides a hollow conduit for accepting a filament. Operation 610 forms a first cut in the conduit for passing a filament driving assembly, wherein the filament driving assembly is coupled to the filament for driving the filament along the conduit. The first cut can be a through cut, for example, by drilling through the hollow conduit at a side. The first cut can cut to the hollow portion of the hollow conduit, exposing the hollow interior, or exposing a portion of the filament if the filament is placed in the hollow conduit. The first cut can be slightly larger than a diameter of the hobbed portion of a motor shaft, or slightly larger than a diameter of a gear coupled to a motor shaft.

Operation 620 forms a second cut in the conduit for passing a rolling assembly, wherein the rolling assembly is coupled to the filament for rolling the filament along the conduit. The second cut can be a through cut, for example, by drilling through the hollow conduit at a side. The second cut can cut to the hollow portion of the hollow conduit, exposing the hollow interior, or exposing a portion of the filament if the filament is placed in the hollow conduit.

The second cut can be a partial cut, for example, by cutting at a side of the hollow conduit, while leaving flanges around the partial cut. For example, the rolling assembly can include a rotatable bearing having a bearing thickness less than an outside diameter of the hollow conduit. The second cut can be a cut having a width slightly larger than the bearing thickness. Since the bearing thickness is smaller than the outside diameter of the hollow conduit, the second cut can leave flanges in the hollow conduit around the bearing.

The second cut can cut to the hollow portion of the hollow conduit, exposing the hollow interior, or exposing a portion of the filament if the filament is placed in the hollow conduit.

Operation 630 pushes the rolling assembly toward the filament. For example, a spring assembly can be used for pushing the rolling assembly toward the filament. Alternatively, the filament can be pushed toward the rolling assembly.

Operation 640 wherein the roller assembly is optionally configured to be constrained by the conduit.

In some embodiments, holes can be formed on the hollow conduit. A spring assembly can be incorporated for pushing the hollow conduit against the filament driving assembly. Support elements can be added around the hollow conduit, for example, for supporting the hollow conduit and/or supporting the filament driving assembly, such as a motor.

In some embodiments, the present invention discloses a novel filament delivery assembly to deliver a filament, together with a print head incorporating the filament delivery assembly. The filament delivery assembly can include a filament driving assembly, which can include an active drive element, such as a motor rotating a hobbed shaft, and an actively follower element, such as a rotatable bearing or a rotatable hobbed shaft or gear that can be coupled to the active drive element for moving in synchronization with the active drive element.

FIG. 7A-7D illustrate a configuration for a filament delivery assembly according to some embodiments. A filament delivery assembly 700 can be used in a print head, including a heated chamber 750.

A filament delivery assembly 700 can include a filament driving assembly 720, which can include an active drive element such as a motor 722 driving a hobbled shaft or a gear shaft. The filament driving assembly can include a coupled follower element, such as a rotatable element such as a bearing, a hobbed shaft or a gear 730. The follower element can be coupled to the active drive element, for example, by a belt 780. The active drive element can drive the filament 710 along a filament guiding assembly. The active drive element can also drive the follower element, which can assist in driving the filament in a same direction as the active drive element. If the follower element has a rough surface, there can be less slippage, and the follower element 730 can be considered as actively driving the filament, with the power derived from the active drive element 920.

A filament delivery assembly 700 can be include a filament guiding assembly, which can include a hollow conduit 740. The hollow conduit 740 can include a cut portion 725, which can allow the motor shaft 720 to pass through for contacting the filament. The hollow conduit 740 can include another cut portion 735, which can allow the rotatable follower element 730 to pass through for contacting the filament. The cut portions 725 and 735 can be slightly larger than a diameter of the hobbed motor shaft 720 and the bearing 730, respectively, for allowing the motor shaft and the bearing to drive the filament along the hollow conduit. The cut portions can cut through the hollow conduit, e.g., by a drill bit.

When the motor rotates, the filament can be pulled into the hollow conduit from the input opening. The movement of the filament can rotate the rotatable bearing. The motor can also push the filament, along the hollow conduit, toward the heated chamber. When the motor rotates, the motor can drive the belt, which can rotate the follower element to further drive the filament.

In some embodiments, the hollow conduit can include holes, for example, to increase a thermal isolation from the heated chamber to the motor shaft. A fan can be included, for blowing passing the holes and the hollow conduit, further reducing a temperature at the motor shaft.

In some embodiments, a force can be applied to push the follower element, e.g., the rotatable follower element 730 relative to the motor shaft 720. The force can be used to increase a friction between the motor shaft and the filament, which can prevent slippage of the filament. As shown, a force 733 can be used to push the rotatable follower element against the motor shaft. Alternatively, a force can be applied to the motor to push the motor shaft against the rotatable follower element.

FIGS. 8A-8B illustrate flow charts for filament delivering according to some embodiments. In FIG. 8A, operation 800 actively drives a filament in two or more locations. For example, two active drive elements can be used to drive the filament in two opposite locations. One active drive element can be coupled to the other active drive element, e.g., there can be one motor driving two active drive elements. Each of the two active drive elements can include a rough surface contacting the filament, thus when rotating, the active drive elements can move the filament by gripping the filament.

Two active drive elements can be independent of each other, e.g., there can be two motors, each motor driving a hobbed shaft or a gear shaft.

In FIG. 8B, operation 820 provides a hollow conduit for accepting a filament. Operation 830 forms a first cut in the conduit for passing a filament driving assembly, wherein the filament driving assembly is coupled to the filament for driving the filament along the conduit. The first cut can be a through cut, for example, by drilling through the hollow conduit at a side. The first cut can cut to the hollow portion of the hollow conduit, exposing the hollow interior, or exposing a portion of the filament if the filament is placed in the hollow conduit. The first cut can be slightly larger than a diameter of the hobbed portion of a motor shaft, or slightly larger than a diameter of a gear coupled to a motor shaft.

Operation 840 forms a second cut in the conduit for passing another filament driving assembly, or an actively follower element, e.g., a follower element that is coupled to an active drive element, and the follower element can be configured to actively driving the filament. The actively follower element is coupled to the filament for driving the filament along the conduit. The second cut can be a through cut, for example, by drilling through the hollow conduit at a side. The second cut can cut to the hollow portion of the hollow conduit, exposing the hollow interior, or exposing a portion of the filament if the filament is placed in the hollow conduit.

The second cut can be a partial cut, for example, by cutting at a side of the hollow conduit, while leaving flanges around the partial cut. For example, the actively follower element can include a rotatable gear having a gear thickness less than an outside diameter of the hollow conduit. The second cut can be a cut having a width slightly larger than the gear thickness. Since the gear thickness is smaller than the outside diameter of the hollow conduit, the second cut can leave flanges in the hollow conduit around the gear.

The second cut can cut to the hollow portion of the hollow conduit, exposing the hollow interior, or exposing a portion of the filament if the filament is placed in the hollow conduit.

Operation 850 couples the first filament driving assembly with the second filament driving assembly, or couples the filament driving assembly with the actively follower element. The coupling is configured so that the filament driving assemblies are configured to drive the filament in a same direction. In some embodiments, the coupling is configured to drive the filament is a same speed.

In some embodiments, the active drive element and the actively follower element can be pushed against each other with the filament in between. For example, a spring assembly can be used for pushing the active drive element and/or the actively follower element toward the filament.

In some embodiments, holes can be formed on the hollow conduit. A spring assembly can be incorporated for pushing the hollow conduit against the filament driving assembly. Support elements can be added around the hollow conduit, for example, for supporting the hollow conduit and/or supporting the filament driving assembly, such as a motor.

In some embodiments, the present invention discloses a novel filament delivery assembly to deliver a filament, together with a print head incorporating the filament delivery assembly. The filament delivery assembly can include a filament driving assembly, which can include two or more independent active drive elements, such as motors rotating a hobbed shaft or gear. The two active drive elements can be pushed together for an optimal friction to the filament.

FIG. 9A-9D illustrate a configuration for a filament delivery assembly according to some embodiments. A filament delivery assembly 900 can be used in a print head, including a heated chamber 950.

A filament delivery assembly 900 can include a first filament driving assembly 920, which can include an active drive element such as a motor 922 driving a hobbled shaft or a gear shaft. The filament driving assembly can include a second filament driving assembly 930, which can include an active drive element such as a motor 932 driving a hobbled shaft or a gear shaft. The first and second active drive elements can be independent of each other, e.g., each one with its own motor driving a hobbed or gear shaft. The active drive elements 920 and 930 can drive the filament 910 along a filament guiding assembly, such as driving the filament in a same direction and/or same speed. As shown, motors 922 and 932 can be arranged in opposite direction, with the shafts facing each other. Thus the two shafts can be placed close to each other, such as closer than the diameter of the filament, which can be 1.75 mm or 3 mm.

A filament delivery assembly 900 can be include a filament guiding assembly, which can include a hollow conduit 940. The hollow conduit 940 can include a cut portion 925, which can allow the motor shaft 920 to pass through for contacting the filament. The hollow conduit 940 can include another cut portion 935, which can allow the motor shaft 930 to pass through for contacting the filament. The cut portions 925 and 935 can be slightly larger than a diameter of the hobbed motor shafts 920 and 930, for allowing the motor shafts to drive the filament along the hollow conduit. The cut portions can cut through the hollow conduit, e.g., by a drill bit.

When the motors rotates, the filament can be pulled into the hollow conduit from the input opening. The motors can also push the filament, along the hollow conduit, toward the heated chamber.

In some embodiments, the hollow conduit can include holes, for example, to increase a thermal isolation from the heated chamber to the motor shaft. A fan can be included, for blowing passing the holes and the hollow conduit, further reducing a temperature at the motor shaft.

In some embodiments, a force can be applied to push the active drive elements together, e.g., the first active drive element 920 relative to the second active drive element 930. The force can be used to increase a friction between the motor shafts and the filament, which can prevent slippage of the filament.

In some embodiments, the present invention discloses systems and methods having an applied force on two active drive elements of a filament delivery assembly. Two active drive elements can be linearly or rotatably pushing together against a filament.

FIGS. 10A-10C illustrate configurations for a filament delivery assembly according to some embodiments. In FIG. 10A, a filament delivery assembly can include a first filament driving assembly 1020, which can include an active drive element such as a motor 1020A driving a hobbled shaft or a gear shaft. The filament driving assembly can include a second filament driving assembly 1030, which can include an active drive element such as a motor 1030A driving a hobbled shaft or a gear shaft. The first and second active drive elements can be independent of each other, and can be configured to face each other, with a filament guiding assembly 1040 and a filament 1010 located in between. A force 1070 can be applied to either filament drive assembly, for example, to maintain an optimal friction between the filament drive assemblies and the filament.

FIG. 10B shows a configuration for linearly controlling a relative position of the two active drive elements. A first motor 1022A can have a hobbed or gear shaft 1022. The motor 1022A can be mounted to a support 1052. A second motor 1032A can have a hobbed or gear shaft 1032. The motor 1032A can be mounted to a support 1062. Flexible elements, or resilient elements, or spring elements 1082 can be placed between the supports 1052 and 1062, which sandwich a filament 1012 and hollow conduit 1042, e.g., a filament guiding assembly. For example, a hollow conduit 1042 can be loosely place between the two supports 1052 and 1062. Alternatively, the hollow conduit 1042 can be fixed coupled to one support, and can move inside the other support.

Forces 1072, such as screws, can be applied to the two supports for securing the two supports together. The force can be adjusted, since the two supports can resist the applied forces through the flexible elements, or resilient elements, or spring elements 1082. Optimal forces can be used, to provide appropriate driving force on the filament.

FIG. 10C (a)-(b) show a configuration for rotatingly controlling a relative position of the two active drive elements. A first motor 1024A can have a hobbed or gear shaft 1024. The motor 1024A can be mounted to a support 1054. A second motor 1034A can have a hobbed or gear shaft 1034. The motor 1034A can be mounted to a support 1064.

A hinge element 1086 can couple the two supports, for example, to form a pivot point so that one support can rotate 1076 relative to the other support.

A flexible element, or resilient element, or spring element 1084 can be placed between the supports 1054 and 1064, which sandwich a filament 1014 and hollow conduit 1044, e.g., a filament guiding assembly. For example, a hollow conduit 1044 can be loosely place between the two supports 1054 and 1064. Alternatively, the hollow conduit 1044 can be fixed coupled to one support, and can move inside the other support.

A force 1074, such as screws, can be applied to the two supports for securing the two supports together. The force can be adjusted, since the two supports can resist the applied forces through the flexible elements, or resilient elements, or spring elements 1084. Optimal forces can be used, to provide appropriate driving force on the filament.

FIGS. 11A-11B illustrate flow charts for filament delivering according to some embodiments. In FIG. 11A, operation 1100 actively drives a filament in two or more locations using two independent movement mechanisms. For example, two active drive elements can be used to drive the filament in two opposite locations. An active drive element can include a rough surface contacting the filament, such as a hobbed shaft or a gear shaft of a motor, together with a driving component, such as a motor. Thus when the motor runs, the rough surface of the shaft can move the filament by gripping the filament. Two active drive elements can be independent of each other, e.g., there can be two motors, each motor driving a hobbed shaft or a gear shaft.

In FIG. 11B, operation 1120 provides a hollow conduit for accepting a filament. Operation 1130 forms a first cut in the conduit for passing a filament driving assembly, wherein the filament driving assembly is coupled to the filament for driving the filament along the conduit. The first cut can be a through cut, for example, by drilling through the hollow conduit at a side. The first cut can cut to the hollow portion of the hollow conduit, exposing the hollow interior, or exposing a portion of the filament if the filament is placed in the hollow conduit. The first cut can be slightly larger than a diameter of the hobbed portion of a motor shaft, or slightly larger than a diameter of a gear coupled to a motor shaft.

Operation 1140 forms a second cut in the conduit for passing another filament driving assembly, or an actively follower element, e.g., a follower element that is coupled to an active drive element, and the follower element can be configured to actively driving the filament. The actively follower element is coupled to the filament for driving the filament along the conduit. The second cut can be a through cut, for example, by drilling through the hollow conduit at a side. The second cut can cut to the hollow portion of the hollow conduit, exposing the hollow interior, or exposing a portion of the filament if the filament is placed in the hollow conduit.

The second cut can cut to the hollow portion of the hollow conduit, exposing the hollow interior, or exposing a portion of the filament if the filament is placed in the hollow conduit.

The two filament driving assemblies can be independent of each other. For example, a first motor and a second motor can be used to drive a first hobbed shaft and a second hobbed shaft, respectively, for independently driving the filament.

Operation 1150 optionally adjusts a position of the first filament driving assembly with respect to the second filament driving assembly. The two filament driving assemblies can be pushed against each other with the filament in between, e.g., the first filament driving assembly can contact the filament at one location, and the second filament driving assembly can contact the filament at an opposite location. The pushing force can be adjusted, for example, by a flexible element, a resilient element, or a spring element.

In some embodiments, holes can be formed on the hollow conduit. A spring assembly can be incorporated for pushing the hollow conduit against the filament driving assembly. Support elements can be added around the hollow conduit, for example, for supporting the hollow conduit and/or supporting the filament driving assembly, such as a motor.

In some embodiments, the two active drive elements can significantly increase the driving force for pulling the filament from the filament roll and for pushing the filament through the heated chamber. Not only the driving force increase due to the doubling of the active drive elements, the force can further increase due to the pressing of the hobbed shafts, which can increase the friction force, leading to an increase in the driving force.

The increase in driving force can be beneficial for soft filament materials, such as rubber. For soft filaments, one active driving force can deform the filament, leading to slippage. Two active driving forces can increase the grip of the rough motor shafts with the soft filament, leading to securely moving the soft filaments toward the heated chamber.

The increase in driving force can be beneficial for irregular filaments, such as filaments having variable in diameter dimension. For portions of the filament having smaller diameter, one active driving force can slip, since the gap between the hobbed shaft and the support bearing can be constant, but the filament diameter is reduced. Two active driving forces can increase the grip of the rough motor shafts with the filament, even at the smaller diameter portions, leading to securely moving the irregular filaments toward the heated chamber.

In some embodiments, the present invention discloses methods and systems having an acoustic sensor assembly for detecting and/or correcting conditions of a system having a moving mechanism. For example, a motor, under normal operating conditions, can generate certain sound signals. Under abnormal conditions, such as having too high a load or running too high a speed, the motor can generate different sound signals. Thus by receiving and analyzing the acoustic signals emitted by the motor, such as intensity and frequency of the emitted sound, a controller can detect errors, e.g., conditions in which the motor does not operate normally or optimally. Upon detecting, the controller can correct the errors, such as by changing an operating condition of the motor, to return the motor to the normal or optimal operating conditions.

In some embodiments, the moving mechanism can generate different sound characteristics when contacting an object. Thus the acoustic sensor assembly can be used to detect contact conditions of a moving mechanism, such as detecting when the moving mechanism reaches an obstacle or when the moving mechanism reaches a boundary. The contact detection process can be used for a zeroing operation, e.g., a distance between two objects can be set to zero when the acoustic sensor assembly detects a different acoustic signal, signifying that the two objects are in contact. The zeroing operation can be used in zeroing a print head to a platform, or to leveling a platform in a 3d printer system.

In some embodiments, the moving mechanism can include a motor, a hydraulic cylinder, a pneumatic cylinder, a fan or a blower. The moving mechanism can also include a vibrating assembly, such as a piezo assembly or a sound generating assembly, such as a speaker.

FIGS. 12A-12C illustrate acoustic sensor configurations according to some embodiments. In FIG. 12A, a system can include a moving mechanism 1220, such as a motor assembly, a piezo assembly, or a speaker assembly, which can be in operation, and can emit acoustic signals 1230. The moving mechanism 1220 can include a sound amplifier, for example, to amplify any sound emitted by the moving mechanism.

An acoustic sensor assembly can include an acoustic sensor 1210, which can receive the acoustic signals 1230 and send the acoustic signals to a controller 1240. The controller can analyze the acoustic signals, such as determining the amplitude, frequency, cyclic nature of the signals, and other information. The analyzed information can be used to determine a condition of the system, such as an abnormal operating condition of the moving mechanism, or a contact information of a moving mechanism to an object. The analyzed information can be used as inputs to other components of the system, for example, to a motor to adjust a speed if the analyzed information concludes that the speed of the motor is improper, which is the cause of the received acoustic signals. The analyzed information can be used as inputs to identify that a print head has touched a platform, and a controller can initialize the position of the print head, e.g., setting the position of the print head to zero. The analyzed information can be used as inputs to leveling a platform, for example, by changing a height of the platform so that a print head can contact the platform at multiple places.

In some embodiments, a system can include multiple sound generators, such as multiple motors, piezo assemblies, or fan components. Thus multiple acoustic sensors can be disposed in a system, for example, to identify the source of the sound emission.

In FIG. 2B, sensors can be placed near the potential sound generators. For example, a sensor 1211 can be placed near a motor 1221, and a sensor 1212 can be placed near a motor 1222. The sensors can be shielded from other sound generators, for example, to receive mostly signals from the intended sound generators.

When a controller 1241 receives a signal, it can identify the source of the signal by knowing the sound generator located near the sensor. For example, if the controller receives a signal from sensor 1211, the source of the emitted signal can be the motor 1221. In some cases, signals from nearby motors can reach other sensors. For example, sensor 1211 can receive signals from motor 1222. A threshold cut off can be used to remove the erroneous information. A comparison of signals can be used to determine the threshold value. For example, a signal amplitude from motor 1211 can be compared with a signal amplitude from motor 1222, and a threshold can be set to, for example, a value between the two signal amplitudes. Thus if a signal received by sensor 1211 is lower than the threshold value, the signal can be ignored.

In FIG. 12C, multiple sensors can be placed around the system, and the sound sources can be identified by relative intensities received by the multiple sensors, such as by a triangulation process. A system can include multiple sound sources, such as motors 1225 and 1226. Multiple sensors 1215 and 1216 can be placed around the system. When a controller 1245 receives signals from these sensors 1215 and 1216, the source of the sound can be calculated by the relative intensities of the received signal. For example, if the motor 1225 is the sound source, sensor 1215 can receive a signal 1235, which can be higher, e.g., stronger or louder, than the signal 1236 received by the sensor 1216.

FIGS. 13A-13C illustrate flow charts for acoustic signal configurations according to some embodiments. In FIG. 13A, operation 1300 senses an acoustic signal from a movement assembly. The movement assembly can include a motor, a hydraulic assembly, a pneumatic assembly, a fan, or a vibration assembly such as a piezo component. The signal can be analyzed, for example, calculating a frequency spectrum from the received time evolution sound intensity. Operation 1310 detects an operation condition of the movement assembly. The intensity and frequency of the signal can be used to determine a cause of the signal. For example, a high pitch sound can be caused by a motor having high load, such as a mill bit stuck in a cut material. Or a loud noise can indicate that a fan can be broken. A sudden change in intensity can indicate a contact condition, such as a moving print head contacting a platform, or a moving platform contacting a print head.

In FIG. 13B, operation 1330 senses an acoustic signal. Operation 1340 determines a movement assembly that emits the acoustic signal. The identification of the sound source can be by proximity, e.g., locating the source that is closest to the sensor, or by triangulation, e.g., calculating the location of the source by the signal intensities received by multiple sensors placed at different locations. Operation 1350 adjusts an operation condition of the identified movement assembly.

In FIG. 13C, operation 1370 provides a system comprising a motor. The system can be a mill machine, a lathe machine, a router system, or a system having a hydraulic or pneumatic component. Operation 1380 installs an acoustic sensor for detecting and/or adjusting an operation condition of the system.

In some embodiments, an acoustic sensor assembly can be used for detecting a contact condition of a system. For example, a moving object can approach a stationary object. An acoustic sensor assembly can be used for detecting when the moving object contacts the stationary object. The moving object can generate certain sound signals, which can transmit through an air ambient to reach the acoustic sensor. Upon reaching the stationary object, the sound signal can transmit through the stationary object, which can have different characteristics, such as higher intensity or higher frequency. The change in the received signal characteristics can signify that a contact condition is reached, e.g., the moving object has contacted the stationary object.

In some embodiments, the moving object can include a motor, such as a print head having an integrated motor for driving the filament. The moving object can include a motor such as a mill head having a rotate mill bit. When rotating, the motor can emit sound.

A print head of a 3D printer can be the moving object, and a platform of the 3D printer can be the stationary object. A mill head of a mill machine can be the moving object, and an object to be milled of the mill machine can be the stationary object.

In some embodiments, the motor can be turned on at special conditions to generate a noise that can be good for detection by the sensor, or good for a distinction when the motor contacts the object. For example, the motor can rotate back and forth at a high speed, which can generate a high pitch sound.

In some embodiments, a sound generator can be coupled to the moving object, for example, in the case that the moving object does not produce any sound, such as a remote print head having a filament delivery motor placed at a remote location. Thus the remote print head can include a heated chamber and a nozzle, together with an input coupling for receiving a filament. A sound generator, such as a piezo dielectric component, can be coupled to the silent moving object, e.g., the moving object that does not generate any sound.

In some embodiments, a sound generator, such as a piezo element, a speaker or an amplifier, can be coupled to the stationary object, for example, in the case that the moving and stationary objects do not produce any sound.

In some embodiments, the acoustic sensor can be placed on the object that does not produce the sound, such as on the stationary object. The moving object can generate a sound, transmitting through the air to reach the sensor. When contacting the stationary object, the sound can transmit through the stationary object to reach the sensor, thus the sound signal can have a detectable change.

Figures 14C, 14D:
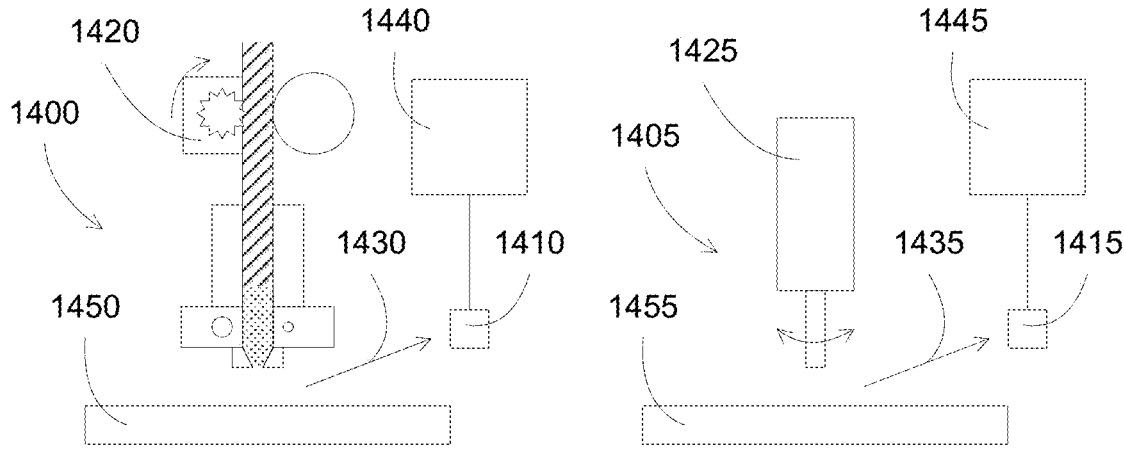

FIGS. 14A-14D illustrate contact sensing configurations using an acoustic sensor assembly according to some embodiments. In FIG. 14A, a print head 1400 of a system, such as a 3D printer system, can be placed facing a platform 1450. The print head can include a motor 1420 rotating a hobbed shaft or a gear shaft, e.g., a shaft with a rough surface. The rough surface can be in contact with a filament, for driving the filament into a heated chamber for delivering to the platform for printing objects.

The print head can be coupled to a z moving mechanism for moving the print head in a perpendicular direction with respect to the platform. The print head can be coupled to other moving mechanisms, such as xy moving mechanisms to move the print head in directions parallel to the platform. A relative position of the print head to the platform can be used for locating the print head at correct z positions. The print head can undergo a zeroing operation, e.g., zeroing the distance between the print head and the platform. For example, the print head can move toward the platform. When the print head contacts the platform, the distance between the print head and the platform can be zero.

In some embodiments, an acoustic sensor assembly can be used to assist in the zeroing operation, such as determining the position when the print head contacts the platform. An acoustic sensor 1410 can be provided to the 3D printer. The acoustic sensor can be coupled to a controller 1440, for example, by wire connection or wireless connection. The acoustic sensor 1410 can be placed in different locations in the 3D printer system, for example, at a location near the platform, at a location near a floor space, at a location near a ceiling space, at a location near a wall space. In some embodiments, the acoustic sensor can be placed at the platform, e.g., in contact with the platform, so that the acoustic signal can transfer through the platform to the acoustic sensor. Sound can travel better in solid ambient, thus higher signals can be achieved when the print head contacts the platform with the sensor also contacting the platform.

In operation, the print head 1400 can approach the platform 1450, for example, by commands from a controller. The controller can keep track of the positions of the print head. The print head can generate an acoustic signal 1430, e.g., a sound, which can be received by the acoustic sensor 1410. When the print head is separated from the platform, the acoustic signal can travel through air to reach the acoustic sensor. When the print head touches the platform, a different acoustic signal can be received by the acoustic sensor, for example, due to the contact of the print head and the platform, which can change the characteristics of the emitted sound. Also, the acoustic signal can travel through the platform to reach the sensor, thus the received signal can be different than a same signal transmitted through air.

The difference in the received signal can identify the position that the print head contacts the platform. The controller then can set the position of the print head to be zero, which can served as a reference for other positions of the print head, relative to the platform.

In some embodiments, the print head can be configured to generate an acoustic signal, e.g., generating noise or sound. The print head can have a motor, such as the motor 1420 that can be used for filament delivery, e.g., for pushing a filament into a heated chamber for melting the filament. The motor can be configured or operated in a vibratory mode, which can generate an acoustic signal. For example, the motor can rotate back and forth at a high frequency.

In some embodiments, a motor in a print head can operate in a vibratory mode or an oscillation mode. The motor can receive commands from a controller to continue turning back and forth, e.g., turning clockwise and then turning counterclockwise, or to turn clockwise or counterclockwise at a high speed. The selection can depend of whether a filament is present. For example, if there is a filament in the print head, then turning back and forth can be used, for not running the filament through the print head. The angle of turning in one direction can be small, such as less than 30 degrees, in order not to push or pull the filament for a large distance. If there is no filament, then one direction turning can be used.

In FIG. 14B, a rotating head 1405 of a system, such as a mill head of a CNC milling system or a router head of a router system, can be placed above an object to be processed 1455. The rotating head can include a motor 1425 rotating a bit, such as a mill bit for milling, or a drill bit for drilling. The rotating bit can contact object, and sharp edges of the rotating bit can cut into the object, such as the drill bit can drill a hole in the object, or the mill bit can mill a pattern on the objects.

The rotating head can be coupled to a z moving mechanism for moving the rotating head in a perpendicular direction with respect to the object. The rotating head can be coupled to other moving mechanisms, such as xy moving mechanisms to move the rotating head in directions parallel to the object. A relative position of the rotating head to the object can be used for locating the rotating head at correct z positions. The rotating head can undergo a zeroing operation, e.g., zeroing the distance between the rotating head and the object. For example, the rotating head can move toward the object. When the rotating head contacts the object, the distance between the rotating head and the object can be zero.

In some embodiments, an acoustic sensor assembly can be used to assist in the zeroing operation, such as determining the position when the rotating head contacts the object. An acoustic sensor 1415 can be provided to the system. The acoustic sensor can be coupled to a controller 1445, for example, by wire connection or wireless connection. The acoustic sensor 1415 can be placed in different locations in the system, for example, at a location near the object, at a location near a floor space, at a location near a ceiling space, at a location near a wall space. In some embodiments, the acoustic sensor can be placed at the object, e.g., in contact with the object, so that the acoustic signal can transfer through the object to the acoustic sensor. Sound can travel better in solid ambient, thus higher signals can be achieved when the rotating head contacts the object with the sensor also contacting the object.

In operation, the rotating head 1405 can approach the object 1455, for example, by commands from a controller. The controller can keep track of the positions of the rotating head. The rotating head can generate an acoustic signal 1435, e.g., a sound, which can be received by the acoustic sensor 1415. When the rotating head is separated from the object, the acoustic signal can travel through air to reach the acoustic sensor. When the rotating head touches the object, a different acoustic signal can be received by the acoustic sensor, for example, due to the contact of the rotating head and the object, which can change the characteristics of the emitted sound. Also, the acoustic signal can travel through the object to reach the sensor, thus the received signal can be different than a same signal transmitted through air.

The difference in the received signal can identify the position that the rotating head contacts the object. The controller then can set the position of the rotating head to be zero, which can served as a reference for other positions of the rotating head, relative to the object.

In some embodiments, the rotating head can be configured to generate an acoustic signal, e.g., generating noise or sound. The rotating head can have a motor, such as the motor 1425 that can be used for rotating the rotating head, e.g., for cutting the object. The motor can be configured or operated in a vibratory mode, which can generate an acoustic signal. For example, the motor can rotate back and forth at a high frequency.

In some embodiments, a motor in a rotating head can operate in a vibratory mode or an oscillation mode. The motor can receive commands from a controller to continue turning back and forth, e.g., turning clockwise and then turning counterclockwise, or to turn clockwise or counterclockwise at a high speed. The angle of turning in one direction can be small, such as less than 30 degrees.

In FIG. 14C, operation 1480 detects a contact of a movement assembly to an object based on a change in a received acoustic signal. The movement assembly can include an assembly having a movable component, such as a motor, a fan, or a vibration element. The movement assembly can generate noise, e.g., acoustic signal, for example, due to the movable component. In some embodiments, the movable component can be configured to make noise, such as receiving commands from a controller to run back and forth at a high frequency, e.g., the number of running back and forth cycles can be high, such as more than 10 per minute, more than 50, 100, 500, or 1000 per minutes. A change in the noise characteristics, such as intensity change or frequency change, can indicate that the movement assembly has contacted the object.

In FIG. 14D, operation 1482 moves a movement assembly to approach an object. The movement assembly can include a movable component. In some embodiments, the movable component can move in a certain way, e.g., moving in order to increase, maximize or optimize a change in the acoustic signal when the movement assembly contacts the object. The movement of the movable component can be controlled by a controller, e.g., the movement is generated by commands from the controller, for the contacting process, and may not be a normal movement of the movable component. For example, the movement can be configured to vibrate the movable component, such as by moving back and forth, rotating clockwise and counterclockwise, or rotating at a speed that can generate a sound.

Operation 1483 determines a position of the movement assembly when detecting a change in a received acoustic signal.

Figures 15A, 15B, 15C:
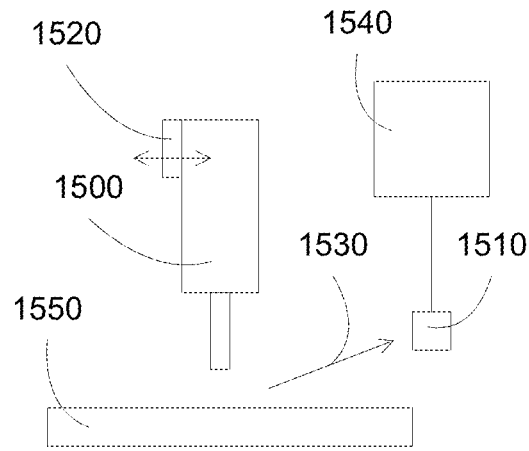
FIGS. 15A-15C illustrate contact sensing configurations using an acoustic sensor assembly according to some embodiments.

FIGS. 15A-15C illustrate contact sensing configurations using an acoustic sensor assembly according to some embodiments. In FIG. 15A, a component 1500 of a system, such as a print head of a 3D printer system, can be positioned facing an object 1550, such as a platform.

An acoustic sensor assembly can be used to assist in a zeroing operation, such as determining the position when the component contacts the platform. An acoustic sensor 1510 can be provided to the system. The acoustic sensor can be coupled to a controller 1540, for example, by wire connection or wireless connection. The acoustic sensor 1510 can be placed in different locations in the system, including at the platform, e.g., in contact with the platform.

A sound generator 1520, such as a vibration assembly having a piezo element, or an amplifier having an oscillator circuit, can be coupled to the component 1500.

In operation, the component 1500 can approach the platform 1550, for example, by commands from a controller. An acoustic signal 1530, e.g., a sound can be generated, which can be received by the acoustic sensor 1510. When the component touches the platform, a different acoustic signal can be received by the acoustic sensor.

The difference in the received signal can identify the position that the component contacts the platform. The controller then can set the position of the component to be zero, which can served as a reference for other positions of the component, relative to the platform.

In FIG. 15B, operation 1580 detects a contact of a first object having a sound generator to a second object based on a change in a received acoustic signal.

The first object can include an assembly having a sound generator, such as a motor, a fan, a vibration element, or a sound circuit, e.g., a circuit that can transmit sound, such as an oscillator circuit coupled to a speaker.

In FIG. 15C, operation 1582 moves a first object having a sound generator to approach a second object. The first object can include an assembly having a sound generator, such as a motor, a fan, a vibration element, or a sound circuit, e.g., a circuit that can transmit sound, such as an oscillator circuit coupled to a speaker.

Operation 1583 determines a position of the first object when detecting a change in a received acoustic signal.

In some embodiments, the present invention discloses methods and systems for leveling an object based on an acoustic sensor assembly. A system, such as a 3d printer, a cnc machine, or a router machine can have a platform level with respect to a head. For example, a platform of a 3d printer can be positioned so that a print head can be at a same height, e.g., having a same z position, when the print head moves in parallel directions, e.g., in x and y directions. The platform parallel can be make leveling with the print head, e.g., raising or lowering portions of the platform so that the platform plane is parallel with the plane in which the print head is movable.

Figures 16A, 16B, 16C:
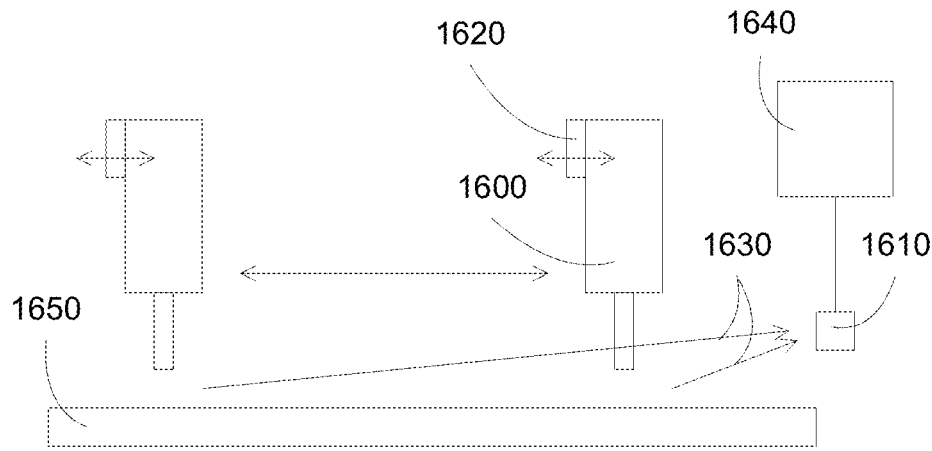
FIGS. 16A-16C illustrate a leveling configuration using an acoustic sensor assembly according to some embodiments.

FIGS. 16A-16C illustrate a leveling configuration using an acoustic sensor assembly according to some embodiments. In FIG. 16A, a component 1600 of a system, such as a print head of a 3D printer system, can be positioned facing an object 1650, such as a platform.

An acoustic sensor assembly can be used to assist in a zeroing operation, such as determining the position when the component contacts the platform. An acoustic sensor 1610 can be provided to the system. The acoustic sensor can be coupled to a controller 1640, for example, by wire connection or wireless connection. The acoustic sensor 1610 can be placed in different locations in the system, including at the platform, e.g., in contact with the platform.

A sound generator 1620, such as a vibration assembly having a piezo element, or an amplifier having an oscillator circuit, can be optionally coupled to the component 1600. Alternatively, a movable component of the component 1600 can be configured to generate sound, such as a motor rotating back and forth at a high frequency, or rotating with a speed to make noise.

In operation, the component 1600 can approach the platform 1650 to determine a z position that the component contacts the platform. The component 1600 can determine different z positions at different locations of the platform. If the z positions are not the same, then the platform is not leveled. Appropriate areas of the platform can be moved in the z direction, in appropriate amount so that the z positions are the same.

Alternatively, the component 1600 can approach the platform 1650 at a first location to determine a contact position. The z position of the component 1600 can be set to zero, e.g., a zeroing process. The component can move to a second location of the platform, e.g., moving in a parallel direction, such as x or y direction. A contact position at the second location can be determined. The platform can be adjusted at the second location, so that the contact position at the second location is zero. The process can continue for other locations, such as at least 3 locations, to leveling the platform with respect to the component 1600.

In FIG. 16B, operation 1680 levels a platform using an acoustic sensing assembly. The platform can be adjusted in height, e.g., in a direction perpendicular to the movements of the moving head, such as a print head or a mill head, so that the moving head can registered a zero position when contacting the platform, at multiple locations of the platform. The acoustic sensor can be used to determine the zero positions.

In FIG. 16C, operation 1682 detects offset values at different portions of a platform based on a change in a received acoustic signal 1630 at each portion. Operation 1683 levels the platform using the offset values.

Figure 17:
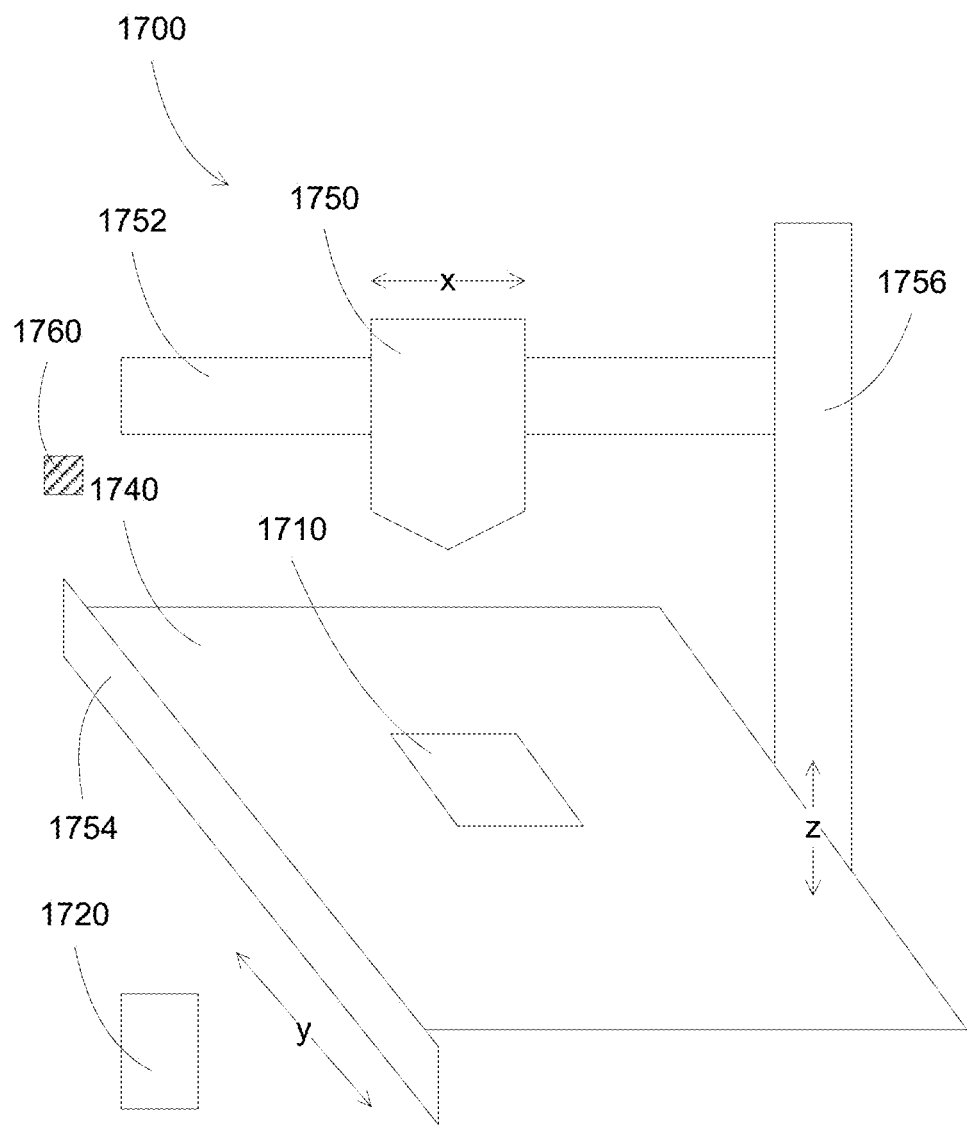
FIG. 17 illustrates a 3D printer configuration according to some embodiments.

FIG. 17 illustrates a 3D printer configuration according to some embodiments. A printer 1700 can include a platform 1740 for supporting a printed object 1710. The platform 1740 can move in a z direction, for example, up and down, to bring the platform 1740 closer to a printer head 1750. The printer head 1750 can move in a lateral direction, such as an x direction. For example, a moving mechanism 1752 can be configured to move the printer head 1750 in the x direction. The platform can be configured to move in another lateral direction, such as an y direction. For example, a moving mechanism 1752 can be configured to move the platform in the y direction.

Other moving mechanisms can be used, such as a x-y table configured to move the printer head. For example, a printer head can move in lateral directions, such as x and y directions. A first moving mechanism 1756 can be configured to move the printer head in the x direction. A second moving mechanism 1754 can be configured to move the first moving mechanism in the y direction. In addition, the platform can be stationary, with the printer head moves in the z direction.

A controller 1720 can be included to move the printer head according to a pattern for printing on the platform. Other components can be included, such as a filament reservoir.

An acoustic sensor 1760 can be included. The acoustic sensor can include an element that can receive an acoustic signal, such as a microphone. The acoustic sensor can be coupled to the controller, for example, to supply the received acoustic signals to the controller, for assist in running the 3D printer. For example, the acoustic sensor can be used for perform zeroing operation between the print head 1750 and the platform 1740. The acoustic sensor can also be used to level the platform, with respect to the print head.

FIGS. 18A-18D illustrate configurations for 3D printers according to some embodiments. In FIG. 18A, operation 1800 installs an acoustic sensor to a 3D printer. The acoustic sensor can be placed in a location in the 3D printer, such as at a location that can receive acoustic signals from movement mechanisms, e.g., motors, and from the print head of the 3D printer. The acoustic sensor can be installed in contact with the platform of the 3D printer. The acoustic sensor can be coupled with a controller of the 3D printer, with the controller controlling the movement mechanisms and other sensors.

Operation 1810 detects and/or adjusts an operation condition of the 3D printer based on a signal from the acoustic sensor. For example, the acoustic sensor can detect error conditions of the movement mechanisms, such as motors running with excessive load. The controller can correct the error conditions, for example, by changing operating conditions of the motors. The acoustic sensor can be used for zeroing the print head with respect to the platform. The acoustic sensor can be used for leveling the platform.

In FIG. 18B, operation 1830 zeros a distance between a print head and a platform of a 3D printer based on a signal from an acoustic sensor.

In FIG. 18C, operation 1850 levels a platform of a 3D printer based on a signal from an acoustic sensor In FIG. 18D, operation 1870 detects and/or adjusts an operation condition of a motor in a D printer based on a signal from an acoustic sensor In some embodiments, the present invention discloses methods and systems for novel flexible components, having a carbon fiber mesh coupling with a flexible membrane. A carbon fiber mesh can be incorporated in a 3D printed layer of a flexible material, and excess portions of the carbon fiber mesh can be trimmed, for example, by a laser.

In some embodiments, a carbon fiber mesh can be placed on a 3D printing platform, and a flexible layer can be printed on the carbon fiber mesh. A laser can be used to cut the carbon fiber mesh, for example, along a contour of the flexible layer. Other components can be added, such as a hard layer for supporting the flexible layer.

Other configurations to incorporate a carbon fiber mesh to a flexible layer can be used, such as providing a flexible layer before placing a carbon fiber mesh on the flexible layer. Another flexible layer can be added on the carbon fiber mesh, together with hard layers for support. Alternatively, a support structure can be provided, and a carbon fiber mesh can be placed at desired locations on the support structure. A flexible layer can be printed on the carbon fiber mesh. The carbon fiber mesh can be trimmed, for example, to conform to the shape of the flexible layer.

Figure 19A:
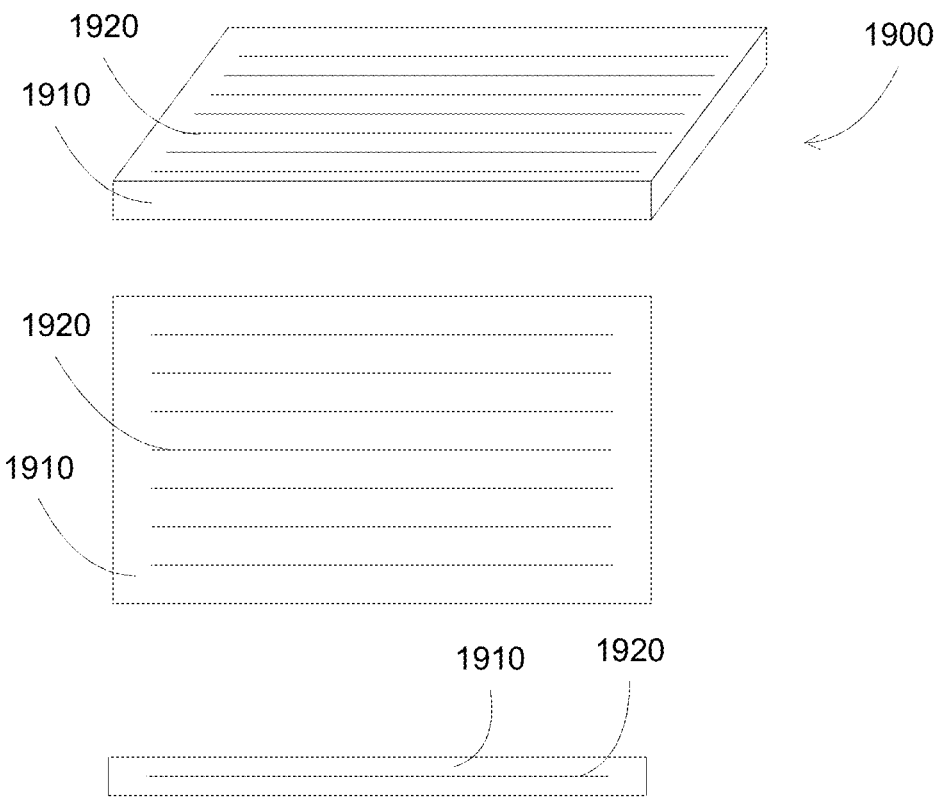
FIGS. 19A-19B illustrate a flexible layer having carbon fiber mesh according to some embodiments.
Figure 19B:
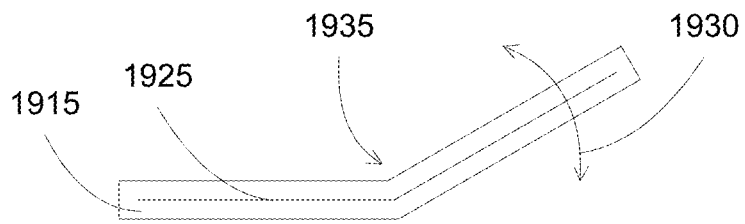

FIGS. 19A-19B illustrate a flexible layer having carbon fiber mesh according to some embodiments. A carbon fiber mesh reinforced flexible layer 1900 in FIG. 19A can include a flexible layer 1910 or 1915 having a carbon fiber mesh 1920 or 1925 incorporated therein. The carbon fiber mesh can include parallel lines disposed at an angle, for example, perpendicular as shown, with respect to a rotating line or point 1935. The reinforced layer 1900 can be bent 1930 or rotated, for example, around any fixed point 1935 in FIG. 19B.

Figure 20A:
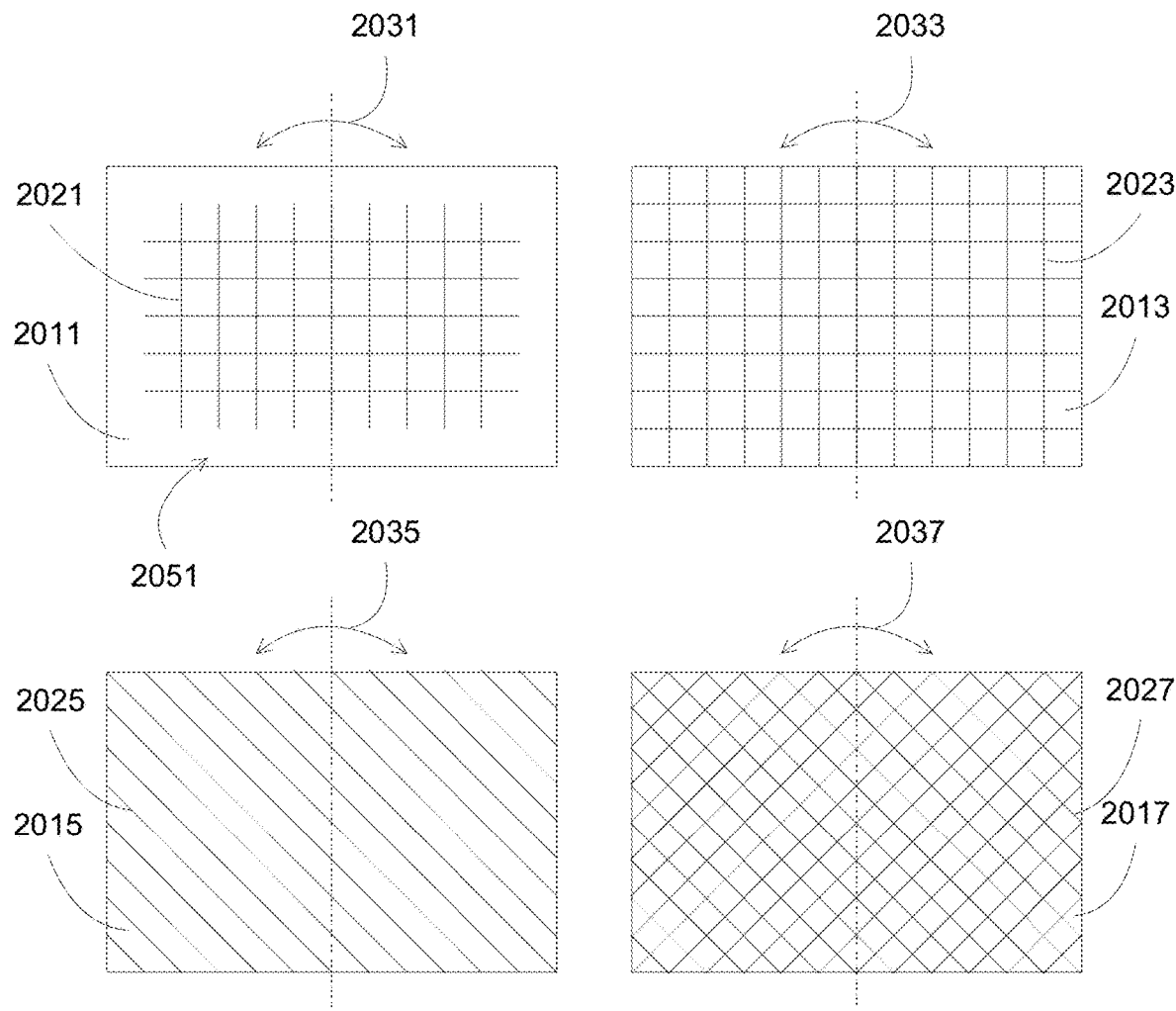
FIGS. 20A-20B illustrate configurations for carbon fiber mesh reinforced flexible layers according to some embodiments.
Figure 20B:
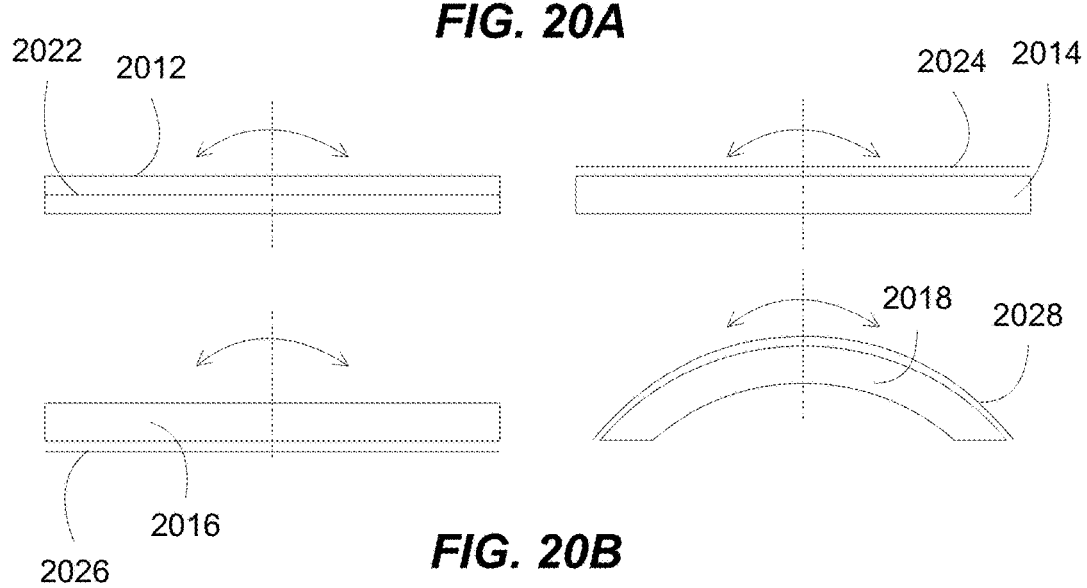

FIGS. 20A-20B illustrate configurations for carbon fiber mesh reinforced flexible layers according to some embodiments. FIG. 20A shows patterns of carbon fiber mesh, which can be incorporated in a flexible layer. A carbon fiber mesh 2021 can be used for reinforcing a flexible layer 2011. The carbon fiber mesh 2021 can have a square pattern inside the flexible layer, e.g., leaving a space 2051 at edges of the flexible layer. The reinforced flexible layer can flex 2031 around an axis parallel to a fiber line of the carbon fiber mesh.

In some embodiments, a carbon fiber mesh 2023 can be used for reinforcing a flexible layer 2013. The carbon fiber mesh 2023 can have a square pattern up to the edges of the flexible layer. The reinforced flexible layer can flex 2033 around an axis parallel to a fiber line of the carbon fiber mesh.

In some embodiments, a carbon fiber mesh 2025 can be used for reinforcing a flexible layer 2015. The carbon fiber mesh 2025 can include lines disposed at an angle with respect to an axis of rotation. The reinforced flexible layer can flex 2035 around an axis parallel to a fiber line of the carbon fiber mesh.

In some embodiments, a carbon fiber mesh 2027 can be used for reinforcing a flexible layer 2017. The carbon fiber mesh 2027 can have a square pattern, disposed at an angle with respect to an axis of rotation. The reinforced flexible layer can flex 2037 around an axis parallel to a fiber line of the carbon fiber mesh.

FIG. 20B shows configurations of carbon fiber mesh with respect to a flexible layer. The carbon fiber mesh 2022 can be disposed inside a flexible layer 2012, e.g., in an interior portion of the flexible layer or having flexible material surrounding the carbon fiber mesh. The carbon fiber mesh 2024 can be at one side of a flexible layer 2014, e.g., at a top exterior surface of the flexible layer. The carbon fiber mesh 2026 can be at one side of a flexible layer 2016, e.g., at a bottom exterior surface of the flexible layer. The carbon fiber mesh 2028 can be disposed at a curve surface a flexible layer 2018, for example, due to the flexible layer having a curve shape.

In some embodiments, the carbon fiber mesh reinforced flexible layer can include a hard layer for support. For example, the hard layer can form the basic structure of a component, and the flexible layer, together with the carbon fiber mesh, can form a flexible portion of the component.

FIGS. 21A-21C illustrate configurations for flexible layers with support structures according to some embodiments. In FIG. 21A, a hinge-like component can have a flexible layer 2110 with an embedded carbon fiber mesh 2120. The flexible layer can move 2130, e.g., flex, around an axis 2140 of movement. A hard layer 2140 can be coupled to the flexible layer, for example, to reinforce the flexible layer, covering the flexible layer while leaving only a portion of the flexible layer needed for the movement.

In FIG. 21B, a joint, such as a knee joint, can include movable components 2152 that can move 2132 around an axis of rotation 2142. A flexible layer 2112 can be coupled to the movable components 2152, such as coupled to both portions of the movable components 2152. A carbon fiber mesh 2122 can be embedded in the flexible layer. The flexible layer can constrain the movable components, in order to move only in intended directions. The carbon fiber mesh can reinforce the flexible layer, for example, against breakage of the flexible layer due to movements out of the intended directions.

In FIG. 21C, a wing structure, such as a bird wing, can include structural components 2154, which can include hard layers for acting like bones n the wing structure. A flexible layer 2114 can be coupled to the structural components 2154, which can allow movements in intended direction 2134. A carbon fiber mesh 2124 can be embedded in the flexible layer for increase strength of the flexible layer.

FIGS. 22A-22B illustrate flow charts for reinforcing flexible layers with carbon fiber mesh according to some embodiments. In FIG. 22A, operation 2200 adds a carbon fiber mesh to a flexible layer to increase durability. The mesh can have any configurations, such as straight lines, polygon mesh such as square mesh, triangle mesh, or diamond shape mesh. The mesh can be disposed in middle, on top, or at bottom of the flexible layer. The flexible layer can be elastic or inelastic.

In FIG. 22B, operation 2220 incorporates a carbon fiber mesh to a flexible layer. For example, a flexible layer can be formed, such as printing, on a carbon fiber mesh. Alternatively, a carbon fiber mesh can be applied to a flexible layer.

Operation 2230 reinforces the flexible layer with a rigid layer. For example, a rigid layer can be printed on a portion of the flexible layer. The rigid layer can be formed before, after or at a same time as flexible layer. The rigid layer can be formed on top of the flexible layer, or next to the flexible layer.

Operation 2240 trims the carbon fiber mesh using a laser. The trimming process can be performed before or after forming the rigid layer.

FIGS. 23A-23E illustrate a process for forming a carbon fiber mesh reinforce flexible layer according to some embodiments. In FIG. 23A, a carbon fiber mesh 2320 can be placed on a substrate 2370, such as a platform of a 3d printer. In FIG. 23B, a flexible layer 2310 can be printed on the carbon fiber mesh 2320. In FIG. 23C, a hard layer 2340 can optionally be printed on the flexible layer 2310. In FIG. 23D, the carbon fiber mesh 2320 can be trimmed, for example, to have the same size and shape as the flexible layer. The trimming process can be performed by a laser. In FIG. 23E, the complete carbon fiber mesh reinforced flexible layer 2300 can be removed from the substrate 2370. The flexible layer can be flexed, by the flexible layer and the carbon fiber mesh.

Figure 24A:
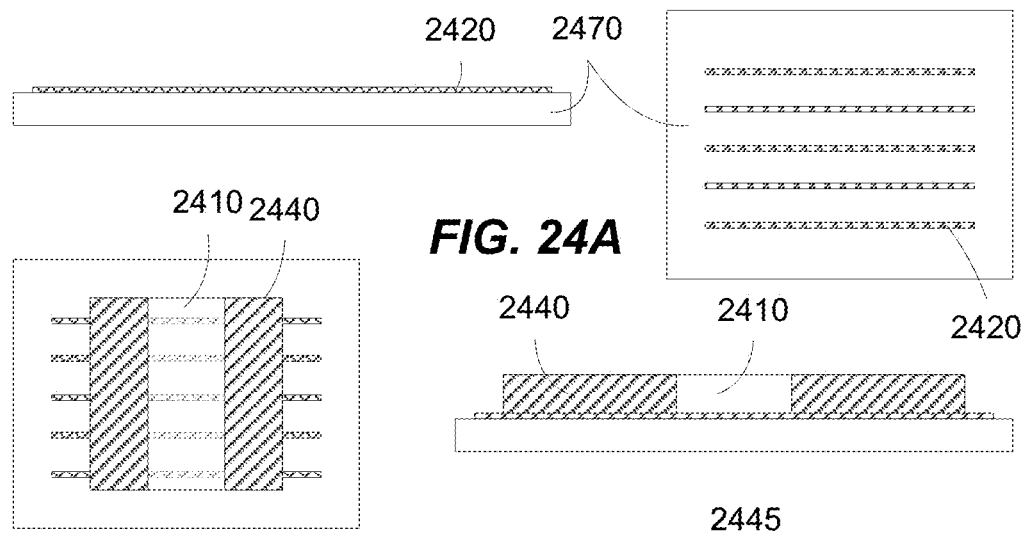
FIGS. 24A-24E illustrate a process for forming a carbon fiber mesh reinforce flexible layer according to some embodiments.
Figure 24B:
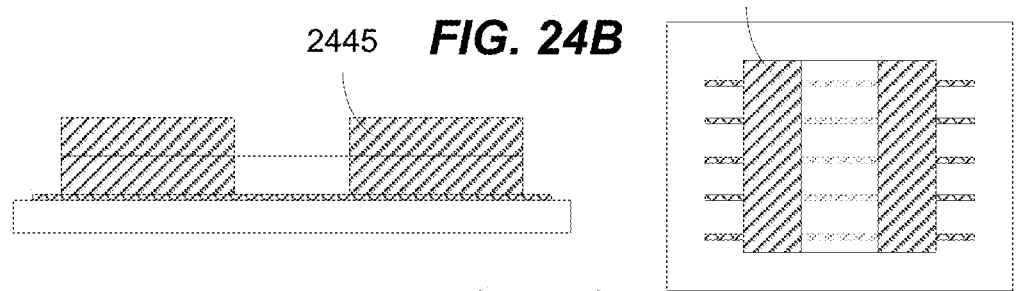
Figure 24C:
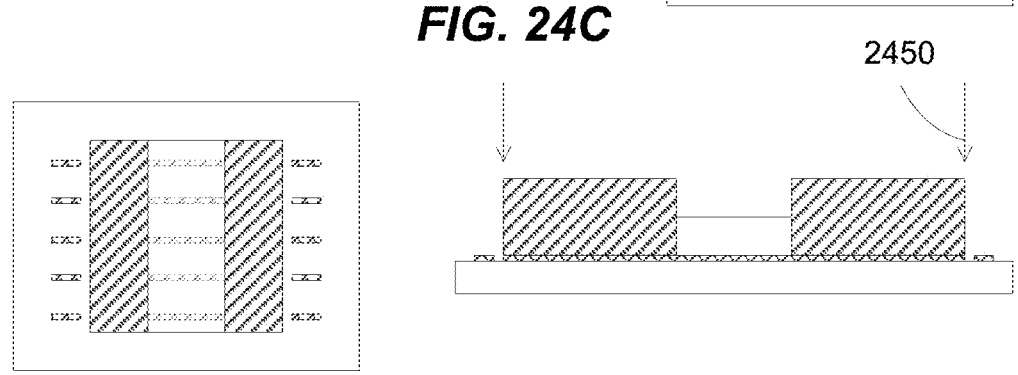
Figure 24D:
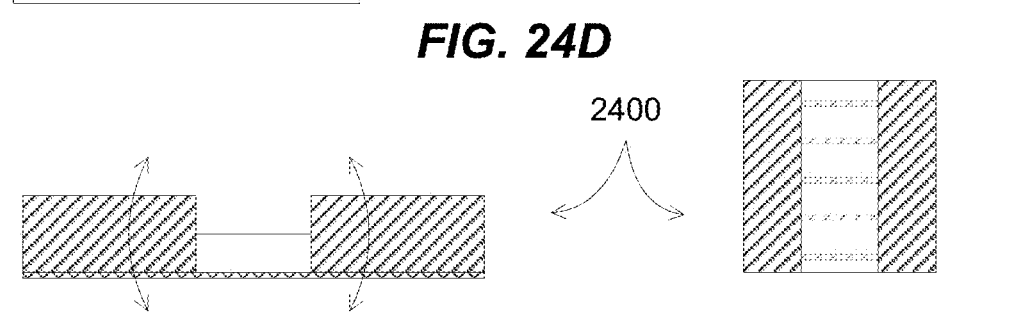
Figure 24E:

FIGS. 24A-24E illustrate a process for forming a carbon fiber mesh reinforce flexible layer according to some embodiments. In FIG. 24A, a carbon fiber mesh 2420 can be placed on a substrate 2470, such as a platform of a 3d printer. In FIG. 24B, a flexible layer 2410 and a portion of a hard layer 2440 can be printed on the carbon fiber mesh 2420. In FIG. 24C, another portion of the hard layer 2440 can optionally be further printed on the existing portion of the hard layer 2440. In FIG. 24D, the carbon fiber mesh 2420 can be trimmed, for example, to have the same size and shape as the flexible layer. The trimming process can be performed by a laser. In FIG. 24E, the complete carbon fiber mesh reinforced flexible layer 2400 can be removed from the substrate 2470. The flexible layer can be flexed, by the flexible layer and the carbon fiber mesh.

Figure 25A:
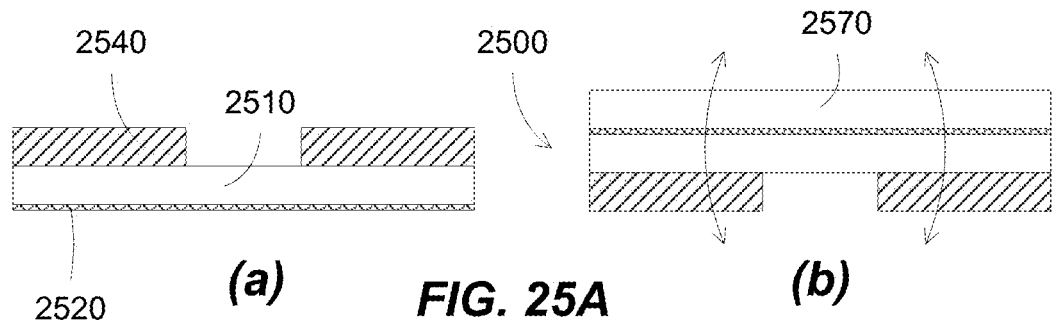
FIGS. 25A-25D illustrate configurations of carbon fiber mesh reinforced flexible layers according to some embodiments.

FIGS. 25A-25D illustrate configurations of carbon fiber mesh reinforced flexible layers according to some embodiments. In FIG. 25A, a carbon fiber mesh reinforced flexible layer 2500 can include a carbon fiber mesh 2520 placed between two flexible layers 2510 and 2570, together with a hard layer 2540. A fabrication process can include printing the flexible layer 2510 on the carbon fiber mesh 2520, and then the hard layer 2540 on the flexible layer 2510 (FIG. 25A (a)). The structure then can be flipped over, and the second flexible layer 2570 can be printed on the carbon fiber mesh 2520 (FIG. 25A (b)). A laser trimming process can be performed to trim the carbon fiber mesh to a desired shape and size, either before or after printing the second flexible layer 2570. Other configurations can be used, such as adding a hard layer on the flexible layer 2570.

Figure 25B:
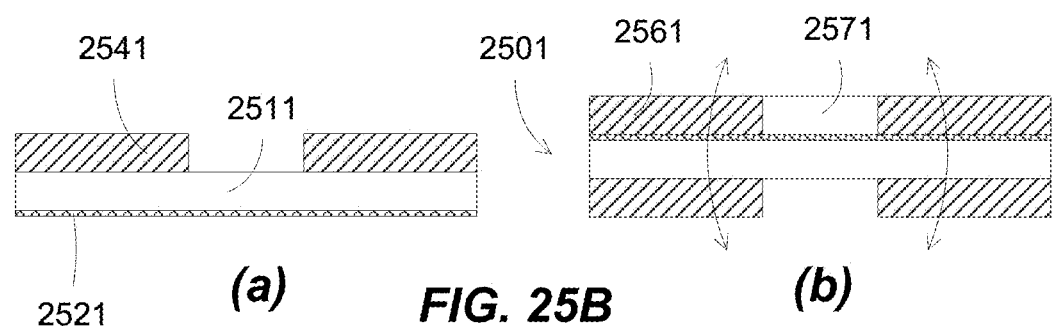

In FIG. 25B, a carbon fiber mesh reinforced flexible layer 2501 can include a carbon fiber mesh 2521 placed between two flexible layers 2511 and 2571, together with hard layers 2541 and 2561. A fabrication process can include printing the flexible layer 2511 on the carbon fiber mesh 2521, and then the hard layer 2541 on the flexible layer 2511 (FIG. 25B (a)). The structure then can be flipped over, and the second flexible layer 2571 and the second hard layer 2561 can be printed on the carbon fiber mesh 2521 (FIG. 25B (b)). A laser trimming process can be performed to trim the carbon fiber mesh to a desired shape and size, either before or after printing the second flexible layer 2571 or the hard layer 2561. Other configurations can be used, such as without the second flexible layer 2571, or with a thicker hard layer 2561.

Figure 25C:
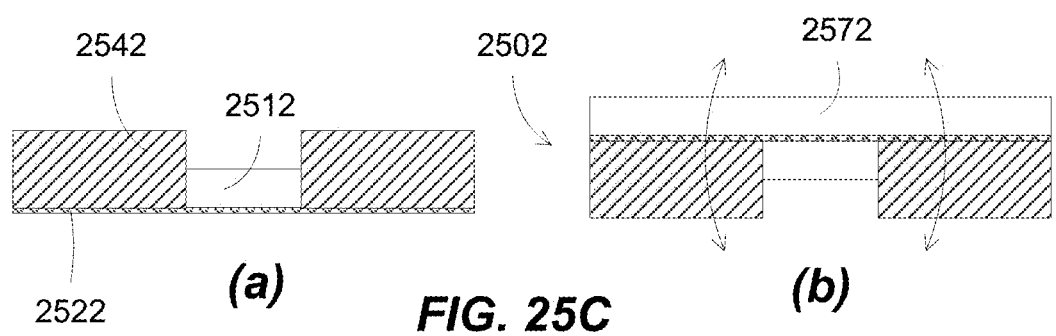

In FIG. 25C, a carbon fiber mesh reinforced flexible layer 2502 can include a carbon fiber mesh 2522 placed between two flexible layers 2512 and 2572, together with a hard layer 2542. A fabrication process can include printing the flexible layer 2512 and the hard layer 2542 on the carbon fiber mesh 2522 (FIG. 25C (a)). The structure then can be flipped over, and the second flexible layer 2572 can be printed on the carbon fiber mesh 2522 (FIG. 25C (b)). A laser trimming process can be performed to trim the carbon fiber mesh to a desired shape and size, either before or after printing the second flexible layer 2572. Other configurations can be used, such as adding a hard layer on the flexible layer 2572, or having a thin hard layer 2542.

Figure 25D:
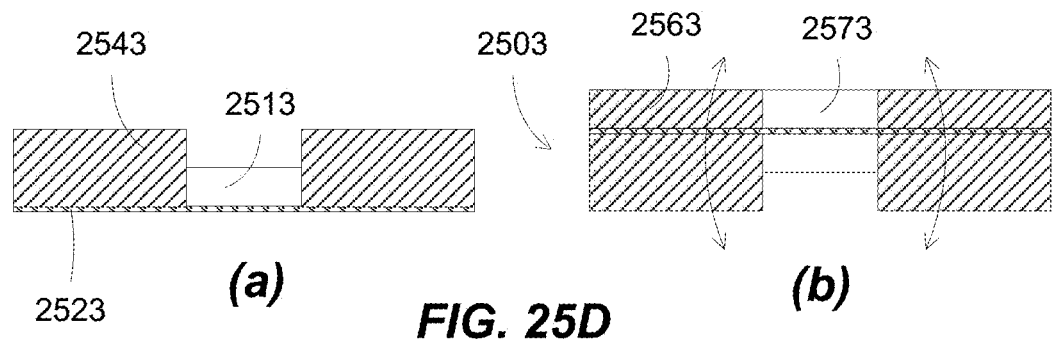

In FIG. 25D, a carbon fiber mesh reinforced flexible layer 2503 can include a carbon fiber mesh 2523 placed between two flexible layers 2513 and 2573, together with hard layers 2543 and 2563. A fabrication process can include printing the flexible layer 2513 and the hard layer 2543 on the carbon fiber mesh 2523 (FIG. 25D (a)). The structure then can be flipped over, and the second flexible layer 2573 and the second hard layer 2563 can be printed on the carbon fiber mesh 2523 (FIG. 25D (b)). A laser trimming process can be performed to trim the carbon fiber mesh to a desired shape and size, either before or after printing the second flexible layer 2573 or the hard layer 2563. Other configurations can be used, such as without the second flexible layer 2573, or with a thicker hard layer 2563.

Figure 26:
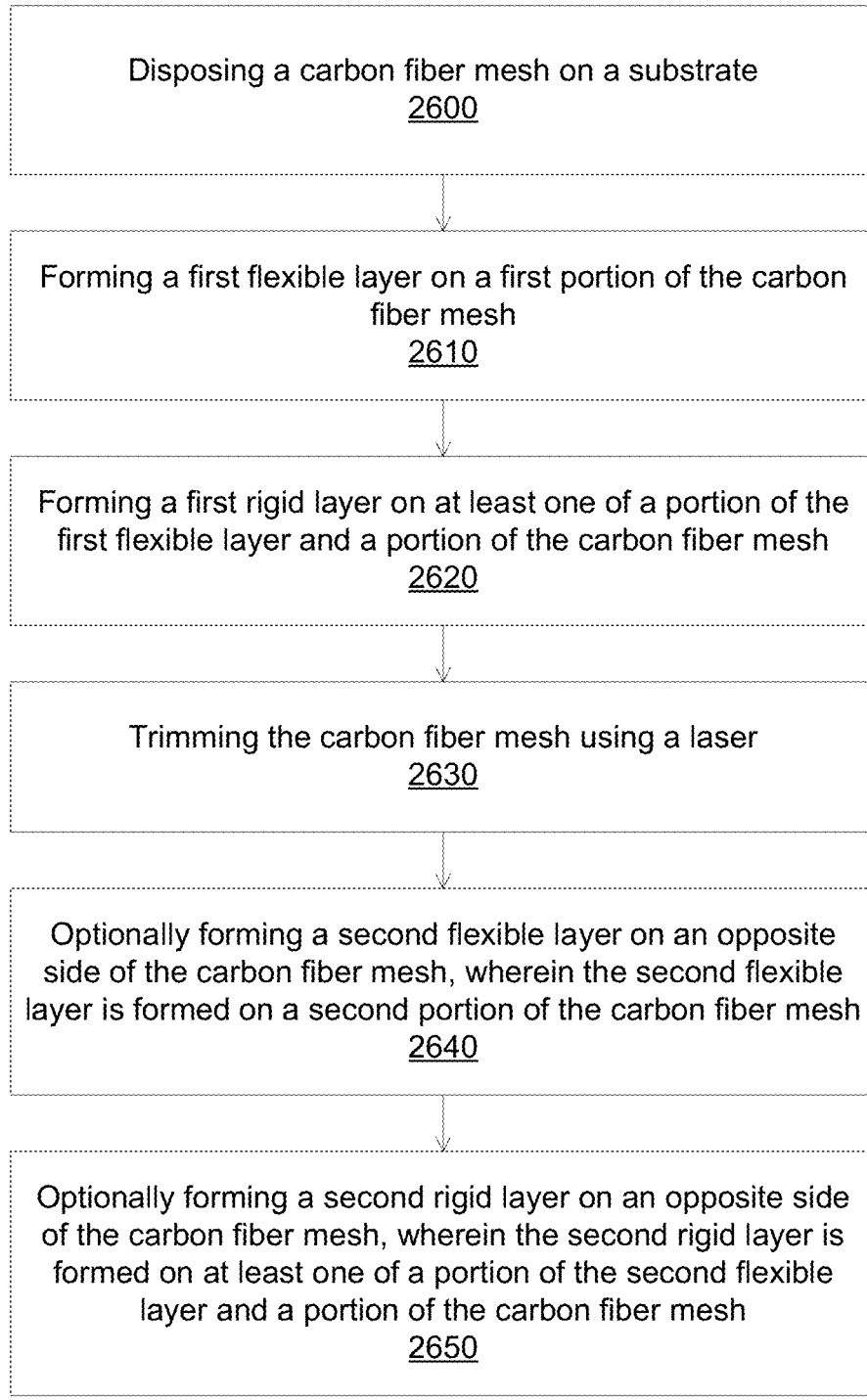
FIG. 26 illustrates a flow chart for forming carbon fiber mesh reinforced flexible layers according to some embodiments.

FIG. 26 illustrates a flow chart for forming carbon fiber mesh reinforced flexible layers according to some embodiments. Operation 2600 disposes a carbon fiber mesh on a substrate, such as on a platform of a 3D printer. The substrate can be another layer of a structure.

Operation 2610 forms a first flexible layer on a first portion of the carbon fiber mesh. The flexible layer can be printed on the carbon fiber mesh. The carbon fiber mesh can be larger than the flexible layer. The carbon fiber mesh can be configured so that the carbon fibers can form an angle, e.g., not parallel, to a movement axis of the complete structure, e.g., the flex movement can bend the carbon fibers. A portion of the flexible layer can be configured to cover the movement axis, e.g., the complete structure can flex around the movement axis using the flexible layer.

Operation 2620 forms a first rigid layer on at least one of a portion of the first flexible layer and a portion of the carbon fiber mesh. The mesh can be larger than the rigid and flexible layers. The rigid layer can be formed on a portion of flexible layer, e.g., excluding the movement axis so that the rigid layer does not hinder the movement of the complete structure. The rigid layer can be on a portion of the flexible layer, or the rigid layer can be formed directly on the carbon fiber mesh, e.g., the rigid layer can be adjacent to the flexible portion. The rigid layer can be thicker than the flexible layer, for example, to provide support to the structure.

Operation 2630 trims the carbon fiber mesh using a laser. Other tools or processes can be used to trim the carbon fiber mesh.

Operation 2640 optionally forms a second flexible layer on an opposite side of the carbon fiber mesh, wherein the second flexible layer is formed on a second portion of the carbon fiber mesh.

Operation 2650 optionally forms a second rigid layer on an opposite side of the carbon fiber mesh, wherein the second rigid layer is formed on at least one of a portion of the second flexible layer and a portion of the carbon fiber mesh.

Figure 27A:
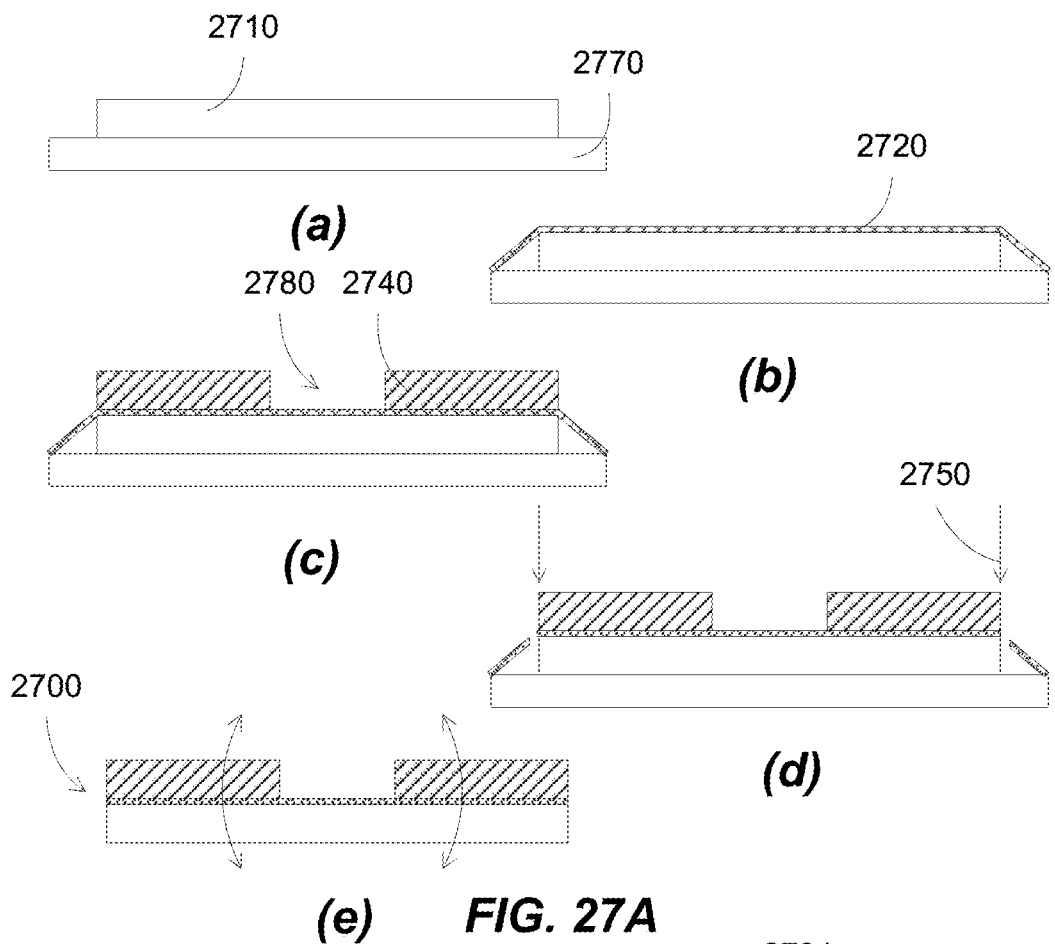
FIGS. 27A-27C illustrate processes for forming carbon fiber mesh reinforced flexible layers according to some embodiments.
Figure 27B:
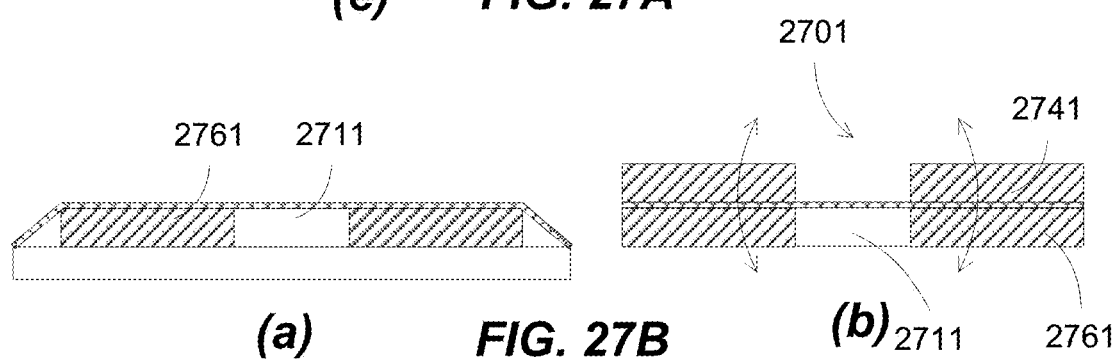
Figure 27C:
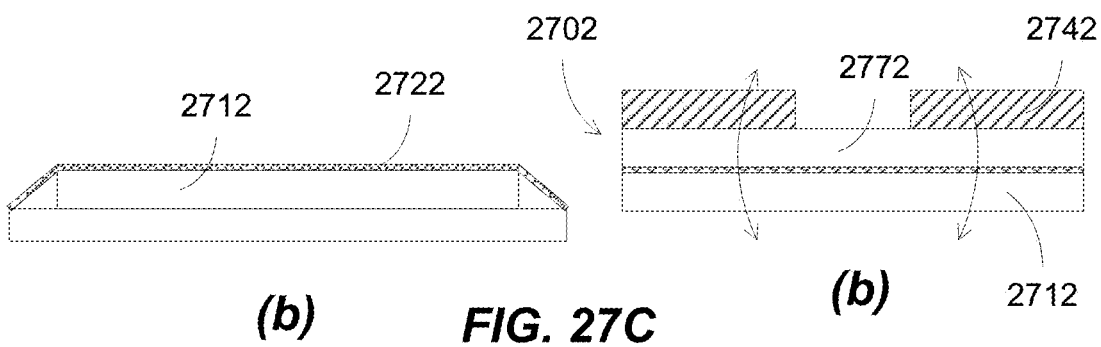

FIGS. 27A-27C illustrate processes for forming carbon fiber mesh reinforced flexible layers according to some embodiments. In FIG. 27A, a carbon fiber mesh reinforced flexible layer 2700 can include a carbon fiber mesh 2720 disposed between a flexible layer 2710 and a hard layer 2740. The hard layer can be configured to avoid a portion of the carbon fiber mesh that can affect the movement of the structure. In FIG. 27A (a), a flexible layer 2710 can be formed, such as printed, on a platform 2770. In FIG. 27A (b), a carbon fiber mesh 2720 can be placed on the flexible layer 2710. The carbon fiber mesh can be secured to the flexible layer, for example, by taping or gluing to the platform, or to the flexible layer.

In FIG. 27A (c), a hard layer 2740 can be formed, such as printed, on a portion of the carbon fiber mesh 2720. The hard layer can be formed around the carbon fiber mesh, to secure the carbon fiber mesh to the structure. The hard layer can be formed avoiding potential movement areas of the carbon fiber mesh, e.g., areas 2780 of the carbon fiber mesh that can undergo movement.

In FIG. 27A (d), the excess carbon fiber mesh can be trimmed 2750, for example, by a laser. In FIG. 27A (e), a complete structure 2700 of a carbon fiber mesh reinforced flexible layer is shown, which can flex for a portion of the flexible layer without the hard layer. Other configurations can be used, such as having another flexible layer on the carbon fiber mesh between the hard layer, so that the carbon fiber mesh is placed between two layers of flexible material.

In FIG. 27B, a carbon fiber mesh reinforced flexible layer 2701 can include a carbon fiber mesh 2721 disposed between a flexible layer 2711 and two hard layers 2741 and 2761. The hard layers can be configured to avoid a portion of the carbon fiber mesh that can affect the movement of the structure. In FIG. 27B (a), a flexible layer 2711 and a hard layer 2761 can be formed, such as printed, on a platform. The flexible layer can be formed at areas needing the flexibility. The hard layer can be formed at areas needing structural support. In FIG. 27A (b), a carbon fiber mesh 2721 can be placed on the flexible layer 2711, and optionally on the hard layer 2761. The carbon fiber mesh can be secured to the flexible layer or to the hard layer, for example, by taping or gluing to the platform, to the flexible layer, or to the hard layer.

A second hard layer 2741 can be formed, such as printed, on a portion of the carbon fiber mesh 2720 and on the hard layer 2761. The excess carbon fiber mesh can be trimmed, for example, by a laser.

In FIG. 27B (b), a complete structure 2701 of a carbon fiber mesh reinforced flexible layer is shown, which can flex for a portion of the flexible layer without the hard layer. Other configurations can be used, such as having another flexible layer on the carbon fiber mesh between the hard layer, so that the carbon fiber mesh is placed between two layers of flexible material.

In FIG. 27C, a carbon fiber mesh reinforced flexible layer 2702 can include a carbon fiber mesh 2722 disposed between two flexible layers 2712 and 2772 and a hard layer 2742. The hard layer can be configured to avoid a portion of the carbon fiber mesh that can affect the movement of the structure. In FIG. 27C (a), a flexible layer 2712 can be formed, such as printed, on a platform. A carbon fiber mesh 2722 can be placed on the flexible layer 2712. The carbon fiber mesh can be secured to the flexible layer, for example, by taping or gluing to the platform, or to the flexible layer.

A second flexible layer 2772 and a hard layer 2742 can be formed, such as printed, on the carbon fiber mesh 2722. The excess carbon fiber mesh can be trimmed, for example, by a laser.

In FIG. 27C (b), a complete structure 2702 of a carbon fiber mesh reinforced flexible layer is shown, which can flex for a portion of the flexible layer without the hard layer. Other configurations can be used, such as having another hard layer on the bottom flexible layer.

Figure 28:
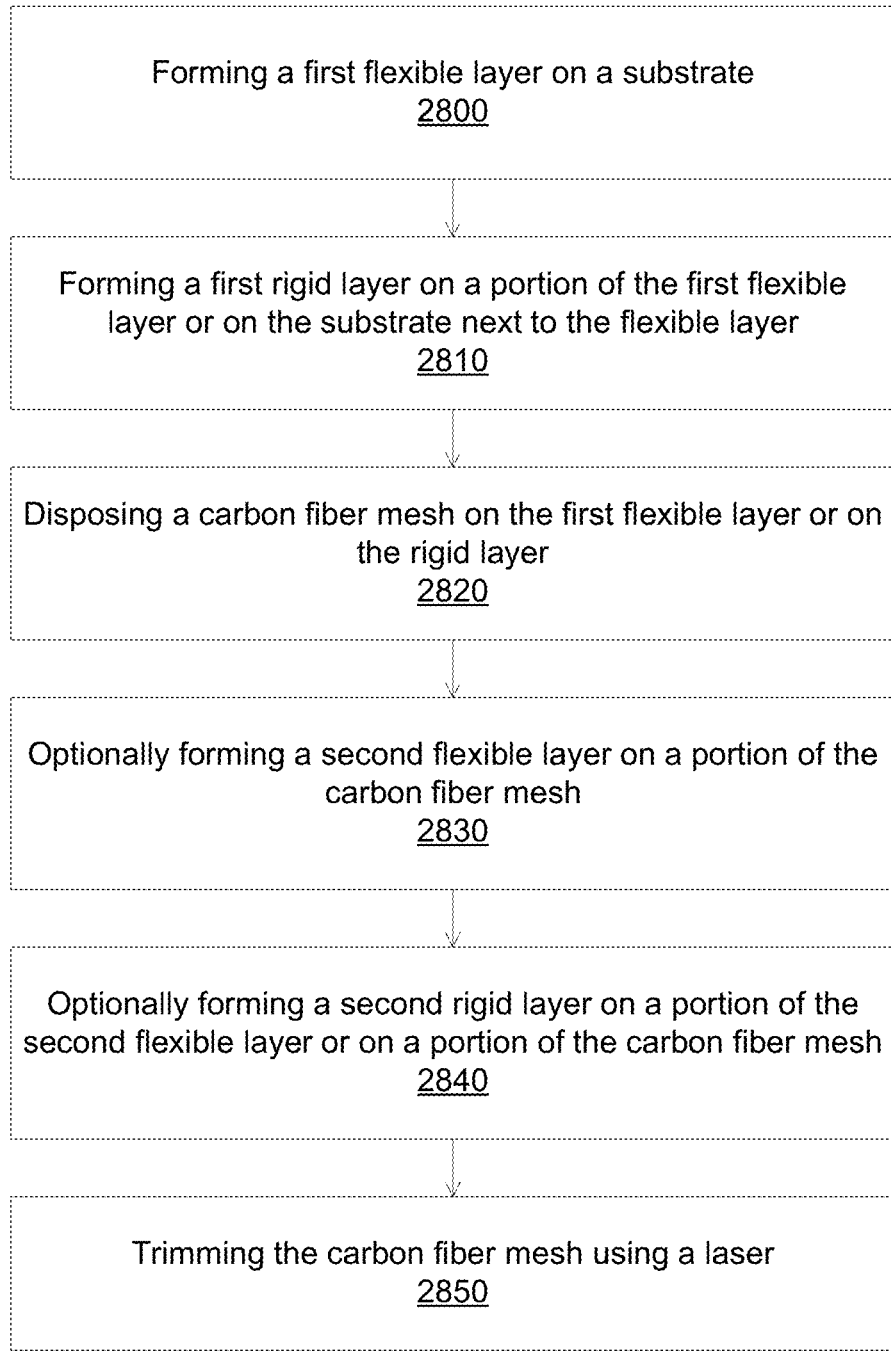
FIG. 28 illustrates a flow chart for forming carbon fiber mesh reinforced flexible layers according to some embodiments.

FIG. 28 illustrates a flow chart for forming carbon fiber mesh reinforced flexible layers according to some embodiments. Operation 2800 forms a first flexible layer on a substrate. The substrate can be another layer of a structure.

Operation 2810 forms a first rigid layer on a portion of the first flexible layer or on the substrate next to the flexible layer. Operation 2820 disposes a carbon fiber mesh on the first flexible layer or on the rigid layer. Operation 2830 optionally forms a second flexible layer on a portion of the carbon fiber mesh. Operation 2840 optionally forms a second rigid layer on a portion of the second flexible layer or on a portion of the carbon fiber mesh. Operation 2850 trims the carbon fiber mesh using a laser.

Figure 29A:
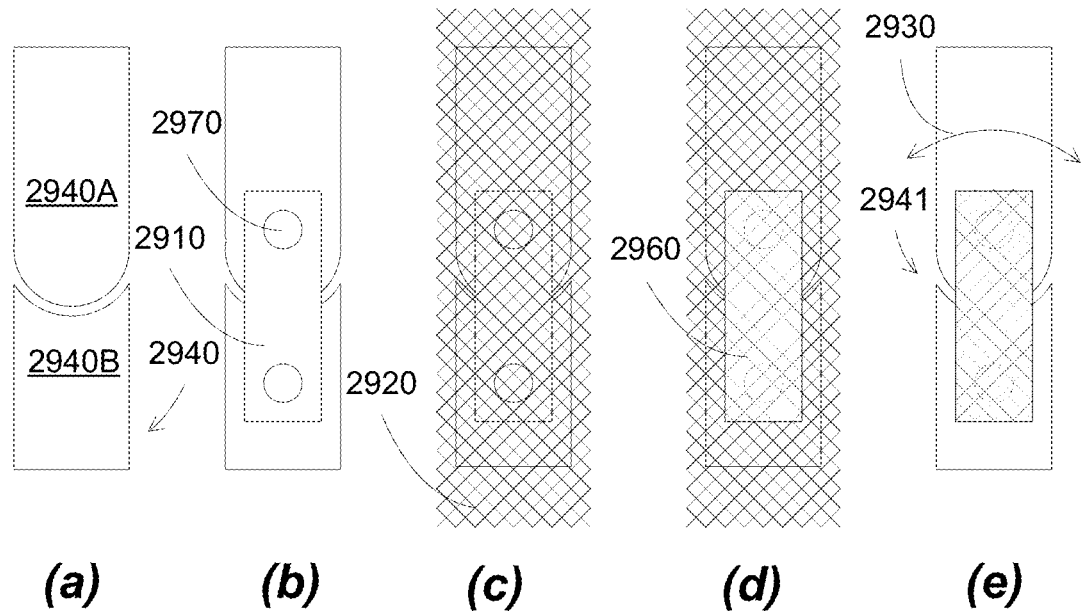
FIGS. 29A-29B illustrate processes for forming joints having a carbon fiber mesh reinforced flexible layer according to some embodiments.
Figure 29B:
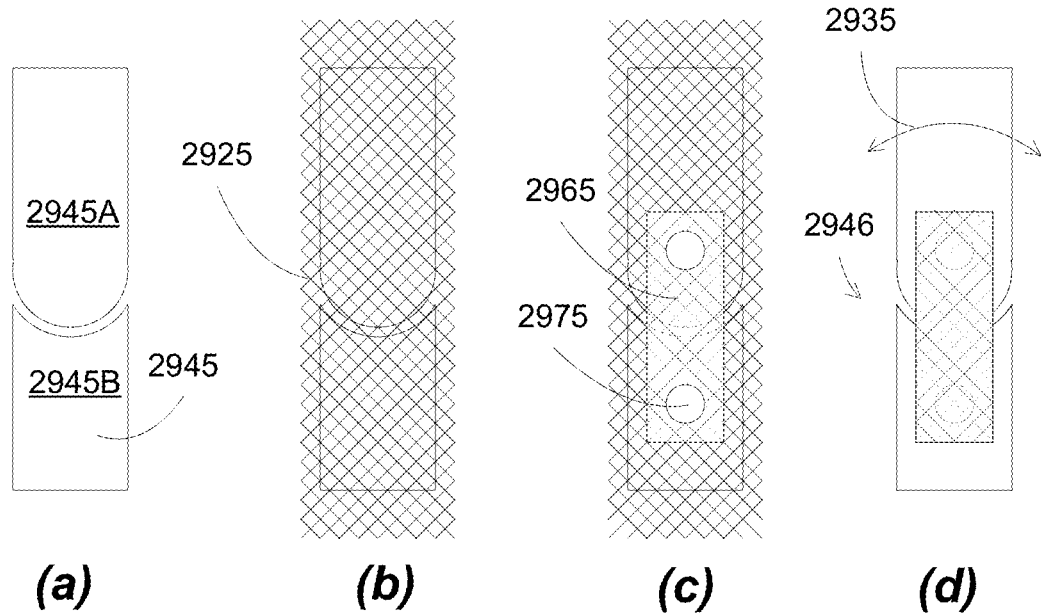

FIGS. 29A-29B illustrate processes for forming joints having a carbon fiber mesh reinforced flexible layer according to some embodiments. In FIG. 29A (a), a joint structure 2940 can be formed, including a component 2940A that can move with respect to another component 2940B. For example, the component 2940A can rotate 2930 with respect to component 2940B.

In FIG. 29A (b), a flexible layer 2910 can be formed, such as printed, on the joint structure 2940. Bonding elements 2970 can be added, to secure the flexible layer 2910 to both components 2940A and 2940B of the joint structure 2940.

In FIG. 29A (c), a carbon fiber mesh 2920 can be placed at least on a portion of the flexible layer 2910. The carbon fiber mesh 2920 can be large enough to cover the flexible layer, together with a portion of the joint structure. The carbon fiber mesh can be secured to the flexible layer, for example, by taping or gluing to the joint structure, or to the flexible layer.

In FIG. 29A (d), a second flexible layer 2960 can be formed, such as printed, on the carbon fiber mesh 2920 on the flexible layer 2910. In FIG. 29A (e), the excess carbon fiber mesh can be trimmed, for example, by a laser to form a complete joint structure 2941. The complete joint structure 2941 can have the component 2940A rotating around the component 2940B, together with having a carbon fiber mesh reinforced flexible layer for constraining the two components. This can be applied to a built bone structure, with the carbon fiber mesh reinforced flexible layer acting as a tendon or ligament binding the bones together or binding the bone with the muscle.

In FIG. 29B (a), a joint structure 2945 can be formed, including a component 2945A that can move with respect to another component 2945B. For example, the component 2945A can rotate 2935 with respect to component 2945B.

In FIG. 29B (b), a carbon fiber mesh 2925 can be placed at least on a portion of the joint structure. The carbon fiber mesh can be secured to the joint structure, for example, by taping or gluing to the joint structure.

In FIG. 29B (c), a flexible layer 2965 can be formed, such as printed, on the carbon fiber mesh 2925. Bonding elements 2975 can be added, to secure the flexible layer 2965 to both components 2945A and 2945B of the joint structure 2945.

In FIG. 29B (d), the excess carbon fiber mesh can be trimmed, for example, by a laser to form a complete joint structure 2946. The complete joint structure 2946 can have the component 2945A rotating around the component 2945B, together with having a carbon fiber mesh reinforced flexible layer for constraining the two components.

FIG. 30 illustrates a flow chart for forming carbon fiber mesh reinforced flexible layers according to some embodiments. Operation 3000 forms a rigid joint structure with movable components. Operation 3010 optionally forms a flexible coupling for the rigid joint structure, wherein the flexible coupling is configured for moving the rigid joint structure. Operation 3020 disposes a carbon fiber mesh on the flexible coupling. Operation 3030 optionally forms a flexible layer on a portion of the carbon fiber mesh. Operation 3040 optionally forms a rigid layer on a portion of the second flexible layer or on a portion of the carbon fiber mesh. Operation 3050 trims the carbon fiber mesh using a laser In some embodiments, the present invention discloses surface conditioning a 3D printed object for used in a casting process. A 3D printer process can form rough surfaces, for example, due to the layer-by-layer formation. If the 3D printed object is used in a casting process, the rough surfaces can result in cast objects having also similar rough surfaces. By surface conditioning, the object can have desired surface, such as smooth surfaces, suitable for casting.

In some embodiments, an object can be 3D printed. The surfaces of the 3D printed object, e.g., external surfaces and internal surfaces, can be conditioned, such as smoothing or to removing the line features caused by the 3D printing process. The surface conditioning process can be applied to all surfaces of the 3D printed object, or to selected surfaces, such as to surfaces requiring smoothness due to appearance or due to mating with other components. The conditioned 3D printed object can be used as a mold for casting, such as using as a mold in a sand casting process or in a lost wax casting process.

In some embodiments, the present invention discloses systems and methods for surface conditioning a 3D printed object, for example, for used as a mold for casting objects. The system can include a 3D printer head for printing the object, and a surface conditioning head for conditioning a surface of the 3D printed object. The methods can include 3D printing an object, and then surface conditioning the object. Alternatively, the methods can include 3D printing a portion of the object, surface conditioning the printed portion, and then repeating the printing and conditioning processes until the object is complete. The multiple sequences of printing and conditioning can allow surface conditioning areas of the object that can be difficult to reach after the object is completely printed.

Figure 31A:
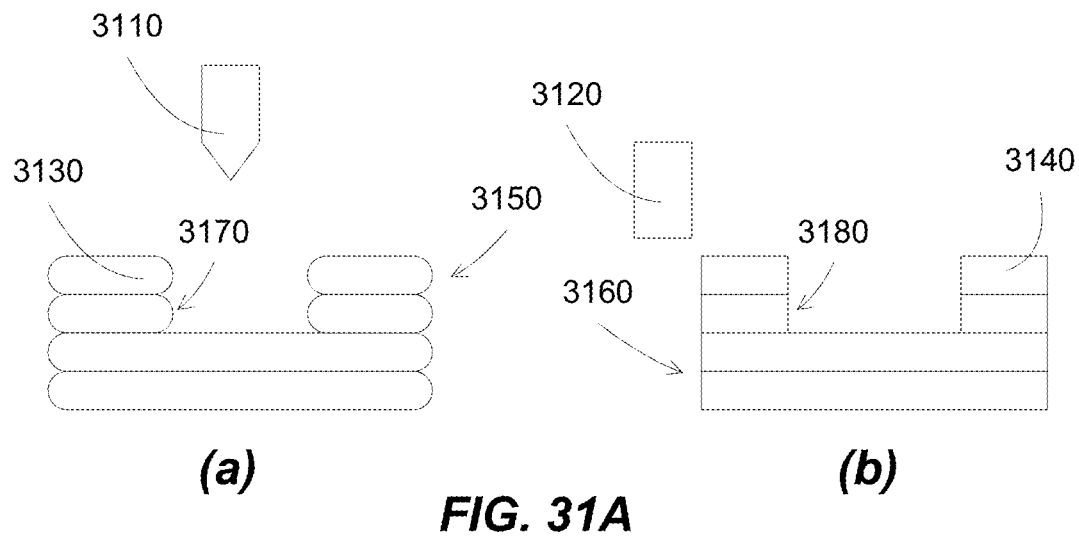
FIGS. 31A-31B illustrate processes for forming surface conditioning 3D printed objects according to some embodiments.
Figure 31B:
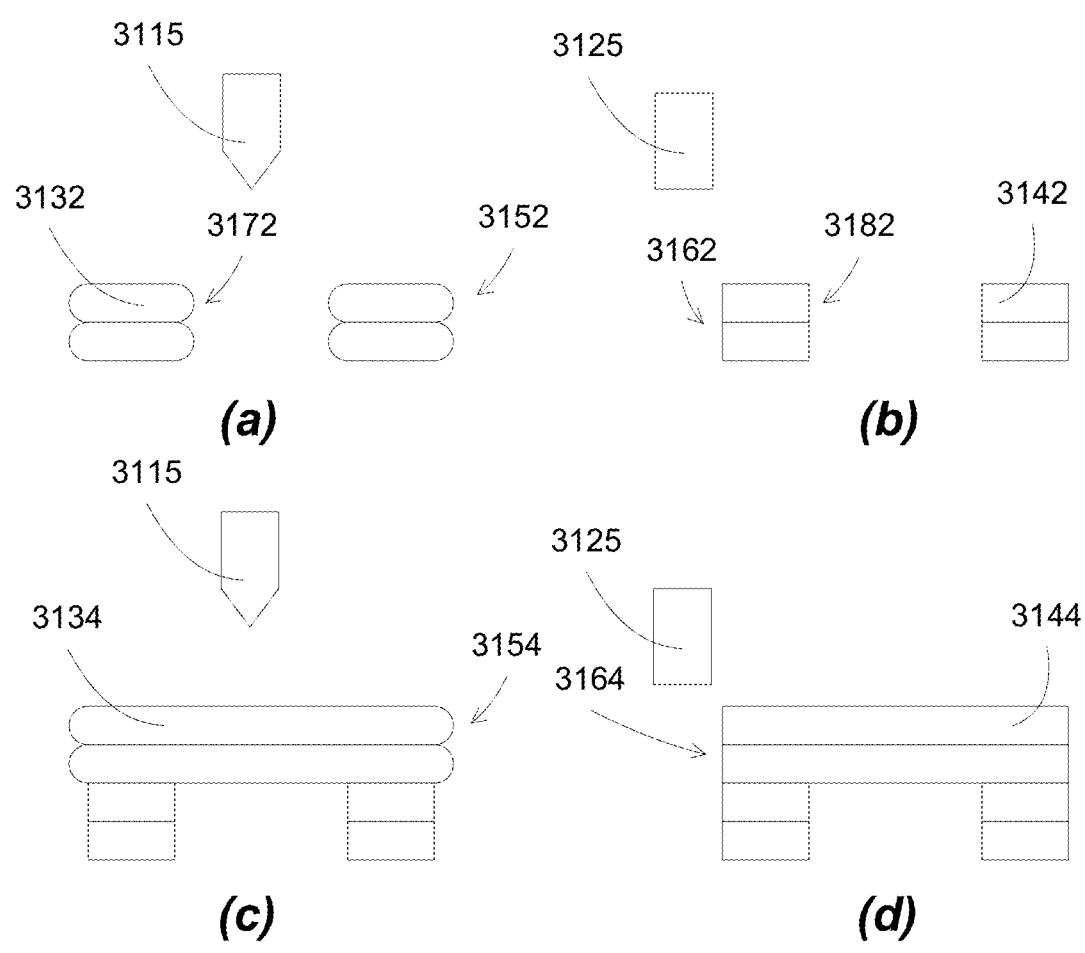

FIGS. 31A-31B illustrate processes for forming surface conditioning 3D printed objects according to some embodiments. In FIG. 31A, an object 3130 can be fully printed before subjected to a surface conditioning process to form a surface conditioning 3D printed object 3140. In FIG. 31A (a), a 3D print head 3110 can be used to print an object 3130, for example, by printing lines by lines to form a layer, and by printing layer by layer to form the printed object. Due to the line by line and layer by layer processes, the surfaces of the printed object 3130, such as internal surface 3170 and external surface 3150, can be rough, such as having a line by line texture. In FIG. 31A (b), a surface conditioning head 3120 can be used to conditioning the 3D printed object 3130 to form a surface conditioning 3D printed object 3140. The surface conditioning head 3120 can be a milling head, a sand paper head, a heated head, a flame head or a chemical head, which can be used to conditioning the surfaces, such as smoothing the external rough surface 3150 to become a smooth surface 3160, and smoothing the internal rough surface 3170 to become a smooth surface 3180.

In FIG. 31B, multiple sequences of 3D printing and surface conditioning can be used, e.g., a sequence of 3D printing and surface conditioning can be repeated until the object is fully printed and conditioned. A process sequence can include printing a portion of the object, and then surface conditioning the printed portion, for example, to smooth the surfaces of the printed portion. The sequence can be repeated until the object is fully printed and surface conditioned.

In FIG. 31B (a), a 3D print head 3115 can be used to print a first portion 3132 of an object. Due to the line by line and layer by layer processes, the surfaces of the printed portion 3132, such as internal surface 3172 and external surface 3152, can be rough, such as having a line by line texture. In FIG. 31B (b), a surface conditioning head 3125 can be used to conditioning the printed portion 3132 to form a surface conditioning printed portion 3142. The surface conditioning head 3125 can be a milling head, a sand paper head, a heated head, a flame head or a chemical head, which can be used to conditioning the surfaces, such as smoothing the external rough surface 3152 to become a smooth surface 3162, and smoothing the internal rough surface 3172 to become a smooth surface 3182.

The sequence can be repeated. In FIG. 31B (c), the 3D print head 3115 can be used to print a second portion 3134 on top of the first portion 3132. The surfaces of the printed portion 3134, such as external surface 3154, can be rough. In FIG. 31B (d), the surface conditioning head 3125 can be used to conditioning the printed portion 3134 to form a surface conditioning printed portion 3144. The surface conditioning head 3125 can be used to conditioning the surfaces, such as smoothing the external rough surface 3154 to become a smooth surface 3164.

The sequence can also be repeated, for example, by printing a third portion on the second portion 3134, and the subjecting the printed third portion to a surface conditioning process.

By performing multiple sequences of printing and conditioning, inner surfaces of the object, such as as-printed surface 3172, can be surface conditioned to form smooth surface 3182. The inner surfaces can be difficult to conditioned, if the object is fully printed.

FIGS. 32A-32B illustrate flow charts for forming surface conditioning objects for casting according to some embodiments. In FIG. 32A, operation 3200 forms a system comprising a first head for 3D printing and a second head for surface conditioning. The first head can be a filament extruder head, for printing using polymer filament materials. The first head can be a paste printing head, for printing using paste materials or solid materials. The first head can be a liquid printing head, for printing using liquid materials. The second head can be a mill head, for conditioning such as milling surfaces. The second head can be a head having a sand paper coverage, for conditioning such as sanding the object surfaces. The second head can be a heated head, for conditioning such as smoothing object surfaces by melting. The second head can be a flame head, for conditioning such as smoothing surfaces using open flames. The second head can be a chemical head, for conditioning such as smoothing, surfaces using chemical reactions, such as acetone vapor. Other head configurations can be used for the second head, such as a laser head, or an infrared head.

The two heads can be configured to process a same part, e.g., having same process coordinates for printing and conditioning a same object. The two heads can be coupled together, e.g., to a moving mechanism such as an xyz motion or an articulated robot, so that one head can be operate and the other head non-operate. The two heads can be separately coupled, e.g., one head coupled to a first moving mechanism and the other head coupled to another moving mechanism. Additional heads can be included, such as an additional print head, an additional conditioning head, or other heads such as a laser head, or an infrared head. The two heads can be coupled to two separate xyz motions, coupled to two articulated robots, or to one yz motion and one articulated robot.

In FIG. 32A, operation 3220 forms at least a portion of an object using a 3D printer head. Operation 3230 conditions a surface of the object using a surface conditioning head. Operation 3240 optionally repeats printing and surface conditioning.

In some embodiments, the whole object can be printed before conditioning. Alternatively, a portion of the object can be printed, then conditioning, before repeating, e.g., repeating printing and conditioning.

In some embodiments, the present invention discloses molding systems for sequentially forming objects for used in a casting process. The molding systems can include a 3D print head for forming the objects, and a surface conditioning head for conditioning the surfaces of the objects. The molding systems can include a controller for controlling the two heads for processing a same objects, e.g., the controller can supply the coordinates of the objects to the two heads, for example, so that the surface conditioning head can condition a same point on the objects that the print head can print. Additional heads can be included.

Figure 33A:
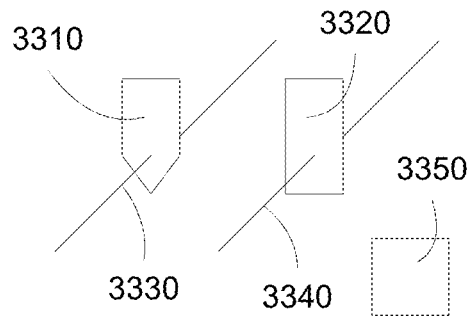
FIGS. 33A-33E illustrate configurations of a molding system according to some embodiments.

FIGS. 33A-33E illustrate configurations of a molding system according to some embodiments. In FIG. 33A, a molding system can include a print head 3310, a surface conditioning head 3320, and an optional controller 3350. The two heads can be coupled to separate linear moving mechanisms, e.g., motions in xyz coordinates, such as the print head 3310 is coupled to moving mechanism 3330, and conditioning head 3320 is coupled to moving mechanism 3340. The two heads can be synchronized, e.g., offset coordinates of the two heads can be measured. Thus the two heads can process a same point, such as by adding or subtracting the offset coordinates. For example, the print head can print an object at a first coordinate. The controller can add or subtract the offset coordinates from the first coordinate and send the new coordinates to the conditioning head, so that the conditioning head can work on the same object at the first coordinate.

Alternatively, each head can have its own set of coordinates, such that the zero coordinates of both heads can be pointed to a same point. Thus a same coordinate can mean a same point for the two heads.

Figure 33B:
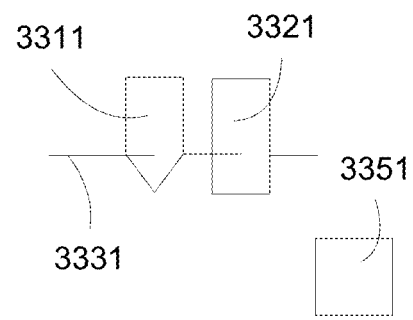

In FIG. 33B, a molding system can include a print head 3311, a surface conditioning head 3321, and an optional controller 3351. The two heads can be coupled to a same moving mechanisms, such as motions in xyz coordinates, e.g., both print head 3311 and conditioning head 3321 are coupled to a xyz moving mechanism 3331. The two heads can be coupled to each other, and thus can move together. Offset coordinates between the two heads can be measured. Thus the two heads can process a same point, such as by adding or subtracting the offset coordinates. For example, the print head can print an object at a first coordinate. The controller can add or subtract the offset coordinates from the first coordinate and move the motion mechanism to the new coordinates, thus setting the conditioning head to the same coordinates that the print head just printed, so that the conditioning head can work on the same object at the first coordinate. Other moving mechanisms can be used, such as an articulated robot that is coupled to both heads.

Figure 33C:
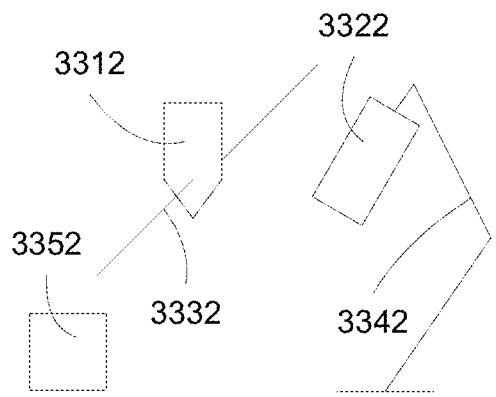

In FIG. 33C, a molding system can include a print head 3312, a surface conditioning head 3322, and an optional controller 3352. The two heads can be coupled to separate moving mechanisms, such as the print head 3312 is coupled to an xyz linear moving mechanism 3332, and conditioning head 3322 is coupled to an articulated robot moving mechanism 3342. The two heads can be synchronized, e.g., offset coordinates of the two heads can be measured. Thus the two heads can process a same point, such as by adding or subtracting the offset coordinates. For example, the print head can print at an origin, e.g., (0,0,0) coordinate. The conditioning head can access the same (0,0,0) coordinate by using (xoffset, yoffset, zoffset) coordinate, e.g., the (xoffset, yoffset, zoffset) coordinate for the conditioning head is the same point as the (0,0,0) coordinate for the print head.

Alternatively, each head can have its own set of coordinates, such that the zero coordinates of both heads can be pointed to a same point. Thus the (0,0,0) coordinate can be the same point for the print head and for the conditioning head.

Figure 33D:
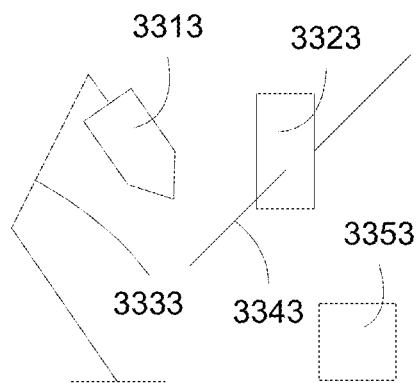

In FIG. 33D, a molding system can include a print head 3313, a surface conditioning head 3323, and an optional controller 3353. The two heads can be coupled to separate moving mechanisms, such as the print head 3313 is coupled to an articulated robot moving mechanism 3333, and conditioning head 3323 is coupled to an xyz linear moving mechanism 3343. The two heads can be synchronized so that the two heads can process a same point.

Figure 33E:
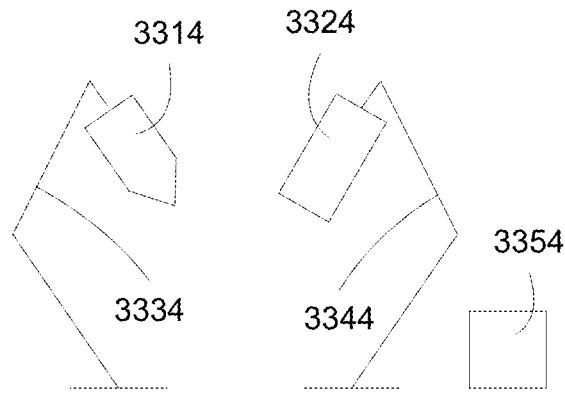

In FIG. 33E, a molding system can include a print head 3314, a surface conditioning head 3324, and an optional controller 3354. The two heads can be coupled to separate moving mechanisms, such as the print head 3314 is coupled to a first articulated robot moving mechanism 3334, and conditioning head 3324 is coupled to a second first articulated robot moving mechanism 3344. The two heads can be synchronized so that the two heads can process a same point.

In some embodiments, different print heads can be used to print different materials. Solid materials can be extruded from a heated extrusion chamber. Paste materials can be extruded from a squeeze chamber. Liquid materials can be delivered by a liquid pump such as a peristaltic pump.

FIGS. 34A-34C illustrate different print heads according to some embodiments. In FIG. 34A, a solid material 3420 in the form of a wire can be provided to a print head 3410. The print head can be heated, for example, by a heater 3415. The melted or softened material can be extruded out of the print head to be delivered on a support surface, such as a support table or a previously printer surface.

In FIG. 34B, paste material 3430 can be provided to a print head 3412. A plunger 3450 can be used to extrude the material out of the print head. Optional heater 3415 can be used to heat the paste material. In FIG. 34C, liquid material 3442 can be provided to a print head. A peristaltic liquid pump 3440 can be used to deliver the liquid material. For example, a rotatable mechanism 3446 can be used to squeeze delivering tube 3444, to move the liquid from a reservoir to the nozzle 3417. The peristaltic pump can prevent contamination of the printed material, and can allow the use of different materials for printing without being contaminated by the pump.

A peristaltic pump can deliver a liquid material from a reservoir to a nozzle. A mechanism can be configured to change the tilted angle of the nozzle, forming a print head having a tilted nozzle. Another mechanism can be configured to rotate the nozzle. For example, the peristaltic pump can be rotated through a rotatable seal. In some embodiments, a solidify mechanism, such as a cooler, can be coupled to the print head to solidify the liquid material. The liquid material can be in a paste form, and when delivered on a cold substrate, can be further solidify into solid form.

A peristaltic pump can be used to print a liquid object, which can be solidified on a cold platform. A print head can include a peristaltic pump to a nozzle. An optional heater can be used to regulate the temperature of the liquid. The temperature of the environment of the print head can be regulated to allowing printing liquid materials. For example, a cooling system can be coupled to a support platform 5020 to keep the delivered materials at a solid state. Further, the print head can be placed in a controlled environment, which can regulate the temperature of the printed materials.

In some embodiments, a liquid printhead, e.g., a printhead having a liquid pump (such as a peristaltic pump) for delivering a liquid, can be used in conjunction with a non-liquid printhead, e.g., a printhead non configured to deliver a liquid, such as a solid printhead (e.g., a printer hear configured for delivering a soften or melted solid material that can be solidified after leaving the printhead) or a paste printhead (e.g., a printer hear configured for delivering a paste material that can be solidified after leaving the printhead). Two or more printheads can be used in a 3D printing system with at least one printhead being a liquid printhead.

In some embodiments, the liquid printhead can be used to separate the solid layers. For example, two objects can be printed together. The two objects can be prevented from adhering to each other by a layer of liquid in between, such as a layer of lubricant materials, such as an oil layer delivered by a liquid printhead configured to deliver oil. A layer of the first object can be printed, followed by a layer of liquid, such as oil. The liquid layer can printed on a portion of the first layer or on the whole first layer. A layer of the second object can be printed on the liquid layer. The process can be repeated until the two objects are printed.

In some embodiments, the liquid printhead can be used to improve the adhesion of two layers. For example, two layers can be printed with an addition liquid adhesion layer in between to improve the adhesion of these two layers. In some embodiments, a paste printhead can be configured to deliver a layer of lubricant or a layer of adhesion.

Two printheads can be installed in a 3D printing system. In some embodiments, at least one of the printheads is a liquid printhead.

A 3D printing system can include a solid printhead and a liquid printhead. In the solid printhead, a solid material in the form of a wire can be provided to a print head. The print head can be heated, for example, by a heater. The melted or softened material can be extruded out of the print head to be delivered on a support surface, such as a support table or a previously printer surface. In the liquid printhead, a liquid material can be provided to a nozzle head. A peristaltic liquid pump can be used to deliver the liquid material. Other liquid pump can also be used. The operation of a peristaltic pump is shown, in which a rotatable mechanism can be used to squeeze delivering tube, to move the liquid from a reservoir to the nozzle head.

A 3D printing system can include a paste printhead and a liquid printhead. In the solid printhead, paste material can be provided to a print head. A plunger can be used to extrude the material out of the print head. Optional heater can be used to heat the paste material. In the liquid printhead, a liquid material can be provided to a nozzle head. A peristaltic pump is shown, but other liquid pump can be used. Other configurations for a printing system can be used, such as a solid printhead and a paste printhead.

A 3D printing system can include multiple printheads. In some embodiments, at least one of the printheads is a liquid printhead, which is configured to deliver a liquid layer, such as a lubricant layer or a non-stick layer. In some embodiments, the liquid printhead can be configured to deliver an adhesion layer, such as a glue layer, to bond to adjacent layers. For example, multiple solid or paste printheads can be used with one or more liquid printheads.

In some embodiments, a paste printhead can be used in place of the liquid printhead to deliver a separation layer (such as a lubricant layer), or an adhesion layer (such as a glue layer). In some embodiments, at least one of the printheads is a paste printhead, which is configured to deliver a paste layer, such as a lubricant layer, a non-stick layer, or an adhesion layer. For example, multiple solid or paste printheads can be used with one or more paste printheads.

In some embodiments, a paste printhead can be used in place of the liquid printhead to deliver a separation layer (such as a lubricant layer), or an adhesion layer (such as a glue layer).

In some embodiments, a mist can be delivered, instead of a liquid or paste layer. A printhead can be configured to deliver a fine mist over a first layer before printing a second layer, to either prevent sticking or to increase adhesion.

In some embodiments, a brush of layer can be delivered, instead of a liquid or paste layer. A printhead can be configured to brush a layer over a first layer before printing a second layer, to either prevent sticking or to increase adhesion.

In some embodiments, different conditioning heads can be used to condition the surfaces of the printed objects. The conditioning head can use physical conditioning, such as cutting, milling, or sanding. The conditioning head can use thermal conditioning, such as heating by conduction, e.g., heating by contacting the surfaces of the printed objects, or heating by radiation, e.g., heating by infrared radiation on the object surfaces, or heating by open flame. The conditioning head can use chemical conditioning, such as exposing the object surfaces to a chemical, such as acetone vapor can smooth the surfaces of ABS objects.

Figures 35A, 35B, 35C:
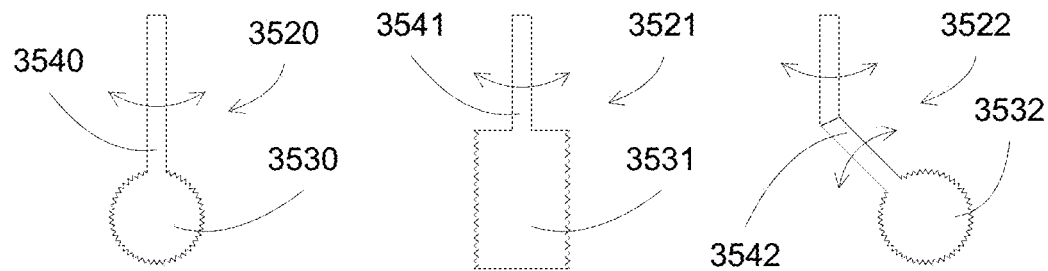
FIGS. 35A-35I illustrate different conditioning heads according to some embodiments.

FIGS. 35A-35I illustrate different conditioning heads according to some embodiments. FIG. 35A shows a ball cutter tool 3520, e.g., a milling cutter having a ball shape, which includes cutter tools for performing milling operations, e.g., removing materials by the movement within the machine (such as a ball nose mill) or directly from the cutter shape. The ball cutter tool 3520 can include a shaft 3540, together with a ball shape cutter 3530 at one end of the shaft. Other cutters with different shapes, such as oval or rounded cylinder, can be used.

FIG. 35B shows a cutter tool 3521, e.g., a milling cutter having a cylindrical shape. The cutter tool 3521 can include a shaft 3541, together with a cylindrical shape cutter 3531 at one end of the shaft. Other cutters with different shapes, such as taper cylinder, can be used.

FIG. 35C shows a cutter tool 3522, e.g., a milling cutter having a ball shape. The cutter tool 3522 can include a shaft 3542, forming an angle with a ball shape cutter 3532. Other cutters with different shapes and angles, such as oval, rounded cylinder, taper cylinder, or acute or right angles, can be used. The angles can be adjustable.

Other cutter tools can be used, such as end mill tools, including flat bottomed cutters, rounded cutter, e.g., ball nosed cutters, and radiused cutters, e.g., bull nose or torus, side and face cutter tools, face mill cutter tools, and any other types. The cutter tools can be used to smooth a surface of the printed objects, for example, by cutting away the roughness of the surface.

Figures 35D, 35E, 35F:
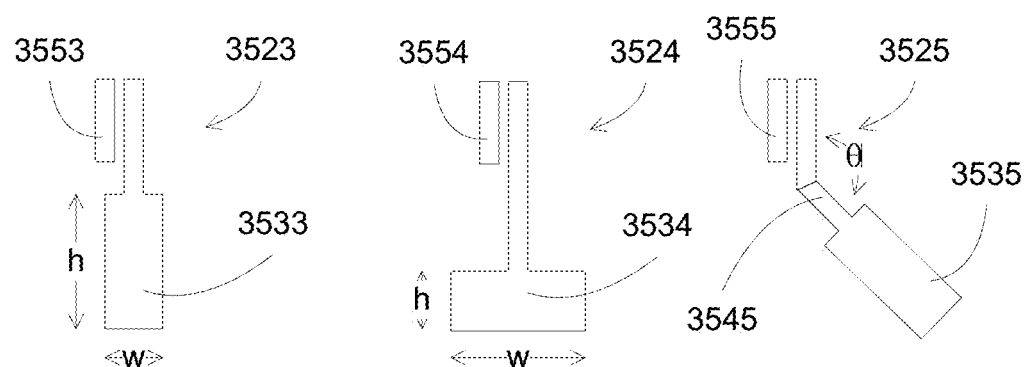

FIG. 35D shows a configuration for a heated conditioning head 3523. The heated conditioning head 3523 can include a heater 3553 for heating a heatable element 3533, which can include metal or alloy materials. The heatable elements can run across a surface, and the irregular surface elements can be smoothened, e.g., by melting the protruded portions and filling the recessed portions. The heatable elements 3533 can have a height h larger than a width w. The larger height can be used for running along a vertical surface, which can smooth the vertical surface. Similarly, the width can be used for running along a horizontal surface. The larger height can allow the conditioning head to process a vertical surface faster than a horizontal surface. Tilted surfaces can be conditioned, for example, by using a corner of the heatable element 3533.

FIG. 35E shows another configuration for a heated conditioning head 3524. The heated conditioning head 3524 can include a heater 3554 for heating a heatable element 3534. The heatable elements 3534 can have a height h smaller than a width w. The larger width can allow the conditioning head to process a horizontal surface faster than a vertical surface. Tilted surfaces can be conditioned, for example, by using a corner of the heatable element 3534.

FIG. 35F shows another configuration for a heated conditioning head 3525. The heated conditioning head 3525 can include a heater 3555 for heating a heatable element 3535. The heated conditioning head 3525 can have a tilted shaft 3545 forming an angle θ with a vertical shaft. The tilted shaft can allow conditioning tilted surfaces.

Other heated conditioning heads can be used, such as heated conditioning heads having rotatable shafts, thus allowing a fast conditioning of tilted surfaces. Further, the heated conditioning heads can have the heatable elements rotatable, e.g., around the shaft of the heated conditioning heads.

Figures 35G, 35H, 35I:
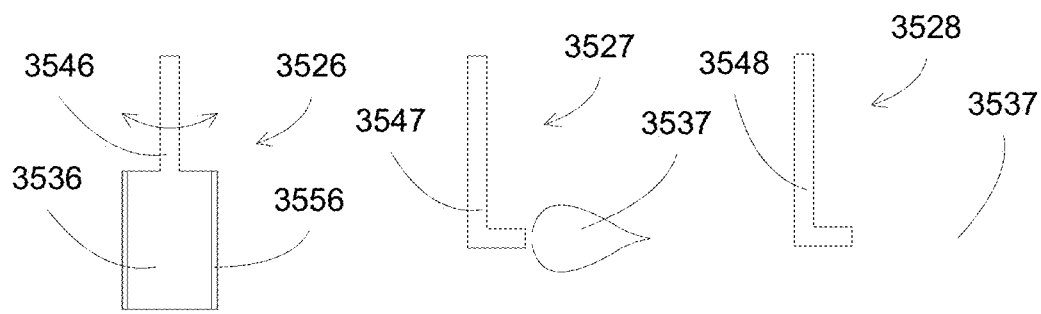

FIG. 35G shows a conditioning head 3526 for sanding, for example, by having a sand paper 3556 covering a support element 3536. The conditioning head 3526 can rotate around a shaft 3546, and can smooth surfaces of printed objects. Other configurations can be used, such as tilted support elements, or rotatable support elements, e.g., for forming an angle with respect to the shaft 3546.

FIG. 35H shows a conditioning head 3527 for flame conditioning a surface, for example, by providing an open flame 3537 to the surface for smoothing the irregularities or roughness of the surface. The conditioning head 3527 can rotate around a shaft 3547, and can smooth surfaces of printed objects. Other configurations can be used, such as tilted support elements, or rotatable support elements, e.g., for forming an angle with respect to the shaft 3547.

FIG. 35I shows a conditioning head 3528 for chemical conditioning a surface, for example, by providing a chemical vapor or liquid 3538 to the surface for smoothing the irregularities or roughness of the surface. The conditioning head 3528 can rotate around a shaft 3548, and can smooth surfaces of printed objects. Other configurations can be used, such as tilted support elements, or rotatable support elements, e.g., for forming an angle with respect to the shaft 3548.

FIGS. 36A-36B illustrate flow charts for casting objects using surface conditioning printed objects according to some embodiments. In FIG. 36A, an object can be formed by printing and surface conditioning, including using multiple sequences of printing and surface conditioning. The object can be used as a mold for casting, such as a sand casting process, or a lost wax casting process. The object can be a positive image of the cast object, which can be used to cast an object directly. The object can be a negative image of the cast object, which can be used to cast a mold. The mold is then used for casting the object.

Operation 3600 forms an object using a 3D printing process and a surface conditioning process. Operation 3610 forms a cast object using the object as a mold.

In FIG. 36B, operation 3630 forms an object or a portion of an object using a 3D printer assembly. Operation 3640 conditions a surface of the object or the portion of the object using a surface conditioning assembly. The process can be repeated until the object is completed. Operation 3650 casts a second object using the surface conditioning object.

What is claimed is:

1. A print head comprising
   a conduit,
      wherein the conduit comprises a channel for guiding a filament;
   two motors,
      wherein each motor comprises a shaft,
      wherein the conduit comprises two cut portions for accepting the two shafts,
      wherein each of the two cut portions expose a portion of the channel,
      wherein the two shafts are configured to rotate in opposite directions for driving the filament along the channel;
   a heated chamber,
      wherein the heated chamber is coupled to the conduit for receiving the filament driven by the two shafts,
      wherein the heated chamber is configured to deliver a molten material from the filament.

2. A print head as in claim 1
wherein the two shafts are disposed in parallel with each other and perpendicular to the conduit,
wherein the two shafts are configured to be in opposite sides of the filament and contacting the filament.

3. A print head as in claim 1
wherein at least one shaft of the two shafts contacts the filament through the exposed portion,
wherein the at least one shaft is hobbed at least in an area that the at least one shaft contacts the filament.

4. A print head as in claim 1
wherein the two shafts contacts the filament through the exposed portions,
wherein both shafts of the two shafts are hobbed at areas contacting the filament.

5. A print head as in claim 1
wherein a gear is coupled to at least one shaft of the two shaft,
wherein the gear contacts the filament through the exposed portion.

6. A print head as in claim 1
wherein the two motors are disposed in opposite directions with respect to the conduit.

7. A print head as in claim 1 further comprising
an assembly coupled to one shaft of the two shafts for pushing the one shaft to the other shaft of the two shafts.

8. A print head as in claim 1 further comprising
a spring assembly coupled to one shaft of the two shafts for adjusting a distance between the two shafts.

9. A print head as in claim 1 further comprising
an assembly coupled to one motor of the two motors for adjusting a distance between the two shafts.

10. A print head as in claim 1
wherein each motor is coupled to a motor mount,
wherein the print head further comprises an assembly coupled to one motor mount of the two motor mounts for adjusting a distance between the two shafts.

11. A print head as in claim 1
wherein each motor is coupled to a motor mount,
wherein the two motor mounts are coupled to each other so that one motor mount of the two motor mounts is configured to move with respect to the other motor mount,
wherein the print head further comprises an assembly coupled to one motor mount of the two motor mounts for adjusting a distance between the two shafts.

12. A print head as in claim 1
wherein the print head is configured to be coupled to a 3D printer.

13. A print head as in claim 1 further comprising
an acoustic sensor for detecting a condition of the two motors.

14. A print head as in claim 1 further comprising
an acoustic sensor for detecting a contact of the print head with an object.

15. A print head as in claim 1 further comprising
an acoustic sensor for leveling a platform.

16. A method comprising
activating two motors to rotate in opposite direction,
wherein each motor comprises a shaft,
wherein the two shafts are configured to drive a filament along a channel of a conduit to a heated chamber for delivering a molten material;
moving the two motors to print an object with the molten material.

* * * * *